US011900746B2

(12) United States Patent
Masood

(10) Patent No.: US 11,900,746 B2
(45) **Date of Patent: *Feb. 13, 2024**

(54) SYSTEM AND METHOD FOR PROVIDING CREDENTIAL ACTIVATION LAYERED SECURITY

(71) Applicant: Soloinsight, Inc., Chicago, IL (US)

(72) Inventor: Farhan Masood, Chicago, IL (US)

(73) Assignee: SOLOINSIGHT, INC., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/539,858

(22) Filed: Dec. 1, 2021

(65) Prior Publication Data

US 2022/0092901 A1 Mar. 24, 2022

Related U.S. Application Data

(63) Continuation of application No. 16/390,890, filed on Apr. 22, 2019, now Pat. No. 11,217,051.

(51) Int. Cl.

*G07C 9/25* (2020.01)
*G07C 9/27* (2020.01)
*G07C 9/28* (2020.01)

(52) U.S. Cl.

CPC ................. *G07C 9/25* (2020.01); *G07C 9/27* (2020.01); *G07C 9/28* (2020.01)

(58) Field of Classification Search

CPC ............... G07C 9/25; G07C 9/28; G07C 9/27
See application file for complete search history.

(56) References Cited

U.S. PATENT DOCUMENTS

| | | | |
|---|---|---|---|
| 5,245,329 A | 9/1993 | Gokcebay | |
| 5,337,043 A | 8/1994 | Gokcebay | |
| 9,886,721 B2 | 2/2018 | Ayedun | |
| 10,573,106 B1 * | 2/2020 | Brady | G06V 40/1365 |
| 2002/0031230 A1 | 3/2002 | Sweet et al. | |
| 2003/0058084 A1 | 3/2003 | O'Hara | |
| 2004/0054915 A1 | 3/2004 | Jong et al. | |
| 2004/0103324 A1 | 5/2004 | Band | |
| 2006/0005020 A1 | 1/2006 | Hardt | |
| 2006/0102717 A1 | 5/2006 | Wood et al. | |
| 2006/0193500 A1 | 8/2006 | Awatsu et al. | |
| 2009/0144450 A1 | 6/2009 | Kiester et al. | |
| 2009/0212902 A1 | 8/2009 | Haddock | |

(Continued)

*Primary Examiner* — Tuyen K Vo

(74) *Attorney, Agent, or Firm* — Greenberg Traurig, LLP; Mammen ("Roy") P. Zachariah

(57) ABSTRACT

A system for providing credential activation layered security is disclosed. In particular, the system adds a layer of additional security at ingress and egress points of a location, such as a building. When a user attempts to check in at the location, the user may provide a proof of physical presence, a proof of digital presence, or a combination thereof, such as at a device at the location. In order to activate a credential for accessing physical and/or logical access control systems of the location, the system may authenticate the proof of physical presence, the proof of digital presence, or both. If the system authenticates the user, the user may be checked-in and the credential may be activated so that the user may access the physical and/or logical access control systems of the location so as to gain access to the ingress point or exit via the egress point.

20 Claims, 45 Drawing Sheets

(56) References Cited

U.S. PATENT DOCUMENTS

| | | | | |
|---|---|---|---|---|
| 2009/0310828 | A1* | 12/2009 | Kakadiaris | G06V 40/168<br>382/118 |
| 2012/0060207 | A1* | 3/2012 | Mardikar | G06F 21/62<br>726/4 |
| 2013/0325704 | A1* | 12/2013 | Gorman | G06Q 10/06<br>705/325 |
| 2014/0266590 | A1* | 9/2014 | Guillaud | G07C 9/29<br>340/8.1 |
| 2015/0036893 | A1 | 2/2015 | Shinzaki et al. | |
| 2015/0040215 | A1* | 2/2015 | Blodgett | G06F 21/85<br>726/22 |
| 2015/0095077 | A1 | 4/2015 | Ruffolo | |
| 2015/0317852 | A1* | 11/2015 | McGeachie | G07C 9/257<br>340/5.6 |
| 2017/0103643 | A1* | 4/2017 | Powers, III | E05G 1/00 |
| 2017/0118204 | A1 | 4/2017 | Laine et al. | |
| 2017/0148241 | A1 | 5/2017 | Kerning et al. | |
| 2018/0166176 | A1 | 6/2018 | Flippen et al. | |
| 2018/0293580 | A1* | 10/2018 | Potadar | G06Q 20/385 |
| 2020/0162255 | A1 | 5/2020 | Hunt | |
| 2020/0213329 | A1* | 7/2020 | Simons | G06F 21/6254 |

* cited by examiner

SYSTEM AND METHOD FOR PROVIDING CREDENTIAL ACTIVATION LAYERED SECURITY

CROSS-REFERENCE TO RELATED APPLICATIONS

The present application is continuation of U.S. patent application Ser. No. 16/390,890, filed on Apr. 22, 2019, which is hereby incorporated by reference in its entirety.

FIELD OF THE INVENTION

The present application relates to credential activation and deactivation technologies, network security technologies, digital consent technologies, sensor technologies, mobile device technologies, token technologies, proximity card technologies, monitoring technologies, and more particularly, to a system and method for providing credential activation layered security.

BACKGROUND

In today's society, unauthorized access of buildings, computing systems, and computing networks is an ever-increasing problem, particularly considering the ever-increasing reliance of businesses on computing systems and networks to conduct day-to-day business. Such unauthorized access often leads to substantial data breaches, loss of privacy, data theft and espionage, losses in customers, losses in profits, lawsuits, and a myriad of other negative consequences. While many businesses employ the use of firewall systems, anti-hacking software, and building access control mechanisms to combat unauthorized access and intrusions, such existing technologies are often inefficient and incomplete methods of thwarting such unauthorized access. For example, proximity cards have been utilized by businesses as a primary secure access control method to enable individuals to obtain privileged access to critical infrastructure and manufacturing facilities for over two decades. Nevertheless, serious vulnerabilities in proximity cards have been identified and confirmed. In particular, it has been proven that a hacker within close range of a proximity card or badge of another user can easily extract the unique card number and encryption key wirelessly. The hacker can then use the unique card number and encryption key to read and clone any proximity cards that are in use.

While proximity cards are supposed to be utilized as the digital keys and secure credentials for access control systems that are deployed to secure doors and/or other ingress points of a building, the fact that hackers with hidden off-the-shelf proximity card readers can readily read and clone proximity cards within wireless range of such readers is of serious concern. For example, such hackers can readily use cloned proximity cards to discreetly obtain physical access to critical physical and computing infrastructure without being noticed, such as by utilizing hacking kits that are available online. As another example, hackers may utilize key copying kiosks that are installed at multitudes of retail stores that have the capabilities to clone a proximity card. Online services have also emerged that allow individuals to clone an existing card at a nominal cost. As a result, the very systems that were designed and placed primarily for secure access provisioning for a business have become a large threat themselves. While businesses often attempt to upgrade their systems and infrastructure, the cost of upgrading is often prohibitively high from monetary, labor, and time standpoints. Additionally, certain businesses have employed the use of biometrics and username/password combinations to further secure their physical structures and computing systems. Nevertheless, currently existing biometric systems and password-based systems are also considered to be vulnerable to hacks, and confidential data can be readily stolen and reused. For example, if a proximity card and/or password is comprised, it can be easily deleted from a business's computing system and a compromised user may be issued a new proximity card and/or password, however, if a biometric template is compromised, the authorized user cannot change his or her biometric features because the biometric features are unique to that specific authorized user. Another hurdle to securing existing access control systems with currently existing biometric technologies is that users do not have access and control over their individual biometric templates, which are considered to be personally-identifiable information. A further hurdle is that current forms of access control often do not comply with compliance requirements of the relevant industry of a business, its customers, and/or the buildings themselves.

While current technologies provide for many benefits and efficiencies, current technologies, such as currently existing proximity card and biometric systems, still have many shortcomings. In particular, current versions of such technologies often provide limited ways in which to authenticate users into various systems and networks associated with a business. Additionally, the threat and impact made possible through the exploitation of vulnerabilities of existing technologies is potentially catastrophic to businesses since malicious individuals can readily gain access to a building, steal intellectual property or assets, or even access digital assets internally without the need of hacking a firewall. As a result, current methodologies and technologies associated with authenticating users into various types of access control systems may be modified and/or enhanced so as to provide enhanced security and quality-of-service for users and businesses. Such enhancements and improvements to methodologies and technologies may provide for improved customer satisfaction, increased privacy, increased compliance, reduced incidence of data breaches, reduced costs, and increased ease-of-use.

SUMMARY

A system and accompanying methods for providing credential activation layered security are disclosed. In particular, the system and methods provide a software platform that adds a layer of additional security at the ingress and/or egress points of a location, such as, but not limited to, a building, a venue, a residence, any location, or a combination thereof. The software platform may be configured to integrate and work with existing physical and logical access control systems, and does not require the removal and replacement of existing hardware. Notably, the system and methods may cause previously issued credentials of user roles, such as, but not limited to, employees, tenants, contractors, consultants, delivery persons, visitors, and the like, to be activated in physical access control and/or logical access control systems only after retrieving and authenticating a user's proof of physical and/or digital presence at their arrival check-in at the location. In certain embodiments, the credentials may be automatically deactivated in the physical access control and/or logical access control systems after the user checks out (e.g. checking out of a user role of the user) and/or after a defined period of time in the event the user forgot to check out or otherwise. In essence, the system and methods utilize multi-factor and multi-model authentication, which involves the use of proof of physical presence, proof of digital presence, or a combination thereof, to make buildings, computers, and/or systems around the world safe, secure, and smart.

With regard to proof of physical presence, the system and methods may confirm the user's proof of physical presence through one or more authentication methodologies. Such one or more authentication methodologies may include, but are not limited to, biometric credentials, such as, three-dimensional (3D) face recognition, 3D Face and eyes recognition, two-dimensional (2D) face recognition, hand wave recognition, hand geometry recognition, palm vein recognition, palm print recognition, iris recognition, retina recognition, fingerprint recognition, finger vein recognition, voice print speaker recognition, voice pass phrase speaker recognition, gait recognition, beating-heart-scan recognition, ECG recognition, pulse recognition, DNA recognition, keystroke recognition, signature recognition, body odor recognition, ear shape recognition, lips shape recognition, any other physical presence and/or authentication technology, or a combination thereof. With regard to proof of digital presence, the system and methods may confirm the user's proof of digital presence through one or more authentication methodologies as well. Such one or more authentication methodologies may include, but are not limited to, passwords, pass phrases, active directory credentials, answers to secret questions, pin codes, digital tokens, proximity cards, radio frequency identification (RFID) tags, near-field communication (NFC) tags, mobile based NFC, infrared cards, debit and credit card numbers, card verification value (CVV), quick response (QR) codes, barcodes, driver's license number, passport number, visa number, government, military and/or law enforcement issued identity card number, Bluetooth™ proximity, mobile-application-based authentication, fingerprint, face and/or iris recognition on mobile devices, parking access, license plate recognition, internet protocol (IP) address, media access control (MAC) address, email address, phone number, date of birth, zip code, address, city, state, the user's current or defined location, any other digital presence and/or authentication technology, or a combination thereof.

Notably, in addition to facilitating credential activation and/or deactivation, the system and methods also provide the ability to obtain digital consents from users, such as at the time of enrollment into a system facilitating the functionality described in the present disclosure, a security system, a physical access control system, a logical access control system, any other system, or a combination thereof. Upon obtaining a digital consent from a user, the system and methods may hash, encrypt, and/or digitally sign the user's biometric template(s) and/or digital identities with the device identifiers of one or more devices that the user utilizes. In doing so, the functionality provided by the system and methods limits the use of submitted credentials, as per the user's consent, to only one, multiple, or all devices and/or networks. As a result, the system and methods further secure the user himself by causing data breaches of such credentials to be irrelevant and/or inconsequential because such credentials will not work by any means on any devices, networks, and/or systems that the user has not consented such credentials to be used on.

In certain embodiments, the system and methods may also provide functionality to allow users to control their credentials by activating the credentials and deactivating the credentials at their will. The system and methods may also provide users with the ability to revoke their consent for their credentials to be utilized with devices, networks, and/or systems, which would result in the system and methods removing the users' credentials from such previously consented devices, networks, and/or systems. In further embodiments, the system and methods may also include a custom proximity card that includes a wireless interface, which has an on-chip capability to be activated and/or deactivated. Proximity card numbers of the proximity card may be issued, replaced, and/or revoked by the functionality provided by the system and methods on the fly or at designed time periods. In certain embodiments, the proximity card numbers may be rotated from a pool of pre-stored proximity card and/or token numbers upon a request by a system of the present disclosure, a predefined period, and/or based on a request from a user. Based on the foregoing, the system and methods not only secure the existing physical and logical access control systems of an entity, such as a business, but also secure a user's credentials from data breaches and/or unauthorized uses.

In one embodiment, a system for providing credential activation layered security is provided. The system may include a memory that stores instructions and a processor that executes the instructions to perform various operations of the system. The system may perform an operation that includes receiving, for facilitating access to an ingress point of a location and when a user attempts to check in at the location, a first proof of physical presence from the user, a second proof of digital presence from the user, or a combination thereof. Additionally, the system may perform an operation that includes authenticating the first proof of the physical presence from the user, the second proof of the digital presence from the user, or a combination thereof, to check the user in. Furthermore, the system may perform an operation that includes activating a credential for accessing a physical access control system, a logical access control system, or a combination thereof, after authenticating the first proof of the physical presence, the second proof of the digital presence, or a combination thereof. Moreover, the system may perform an operation that includes enabling access to the ingress point of the location by utilizing the credential for accessing the physical access control system, the logical access control system, or a combination thereof.

In another embodiment, a method for providing credential activation layered security is provided. The method may include utilizing a memory that stores instructions, and a processor that executes the instructions to perform the various functions of the method. In particular, the method may include obtaining, for facilitating access to an ingress point of a location and when a user attempts to check in, a first proof of physical presence from the user, a second proof of digital presence from the user, or a combination thereof. Additionally, the method may include authenticating the first proof of the physical presence from the user, the second proof of the digital presence from the user, or a combination thereof, to check the user in. The method may proceed to include activating a credential for accessing a physical access control system, a logical access control system, or a combination thereof, after authenticating the first proof of the physical presence, the second proof of the digital presence, or a combination thereof. Furthermore, the method may include facilitating access to the ingress point of the location by utilizing the credential for accessing the physical access control system, the logical access control system, or a combination thereof.

According to yet another embodiment, a computer-readable device having instructions for providing credential activation layered security is provided. The computer instructions, which when loaded and executed by a processor, may cause the processor to perform operations including: monitoring, for facilitating access to an ingress point of a location and when a user attempts to check in, a first proof of physical presence from the user, a second proof of digital presence from the user, or a combination thereof authenticating the first proof of the physical presence from the user, the second proof of the digital presence from the user, or a combination thereof to check the user in; activating a credential for accessing a physical access control system, a logical access control system, or a combination thereof, after authenticating the first proof of the physical presence, the second proof of the digital presence, or a combination thereof and enabling access to the ingress point of the location by utilizing the credential for accessing the physical access control system, the logical access control system, or a combination thereof.

These and other features of the systems and methods for providing credential activation layered security are described in the following detailed description, drawings, and appended claims.

DETAILED DESCRIPTION OF THE DRAWINGS

Figure 1:
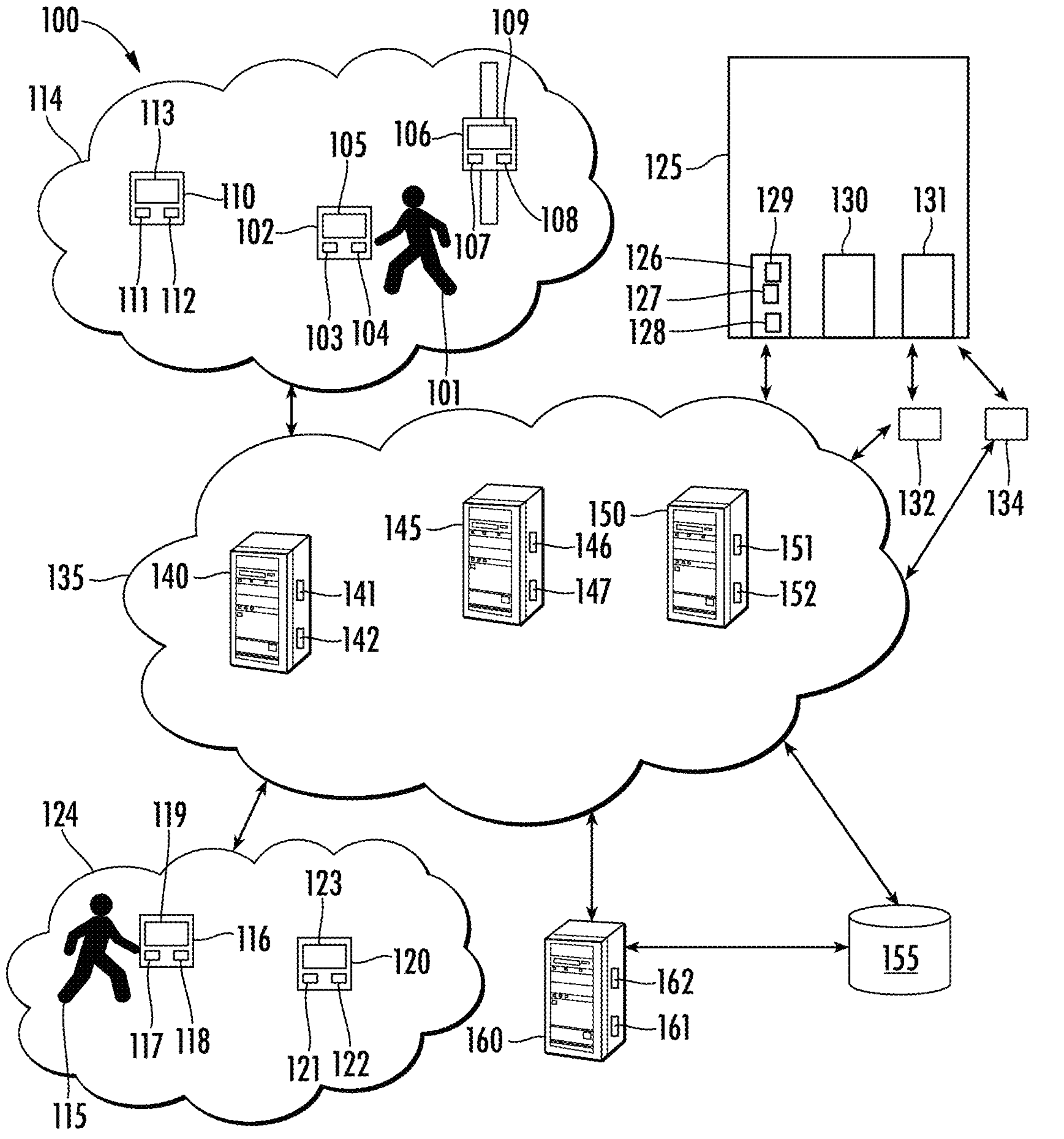
FIG. 1 is a schematic diagram of a system for providing credential activation layered security according to an embodiment of the present disclosure.

A system 100 and accompanying methods for providing credential activation layered security are disclosed. In particular, the system 100 and methods provide a software platform that adds a layer of additional security at the ingress and/or egress points of a location, such as, but not limited to, a building, a venue, a residence, any location, or a combination thereof. Notably, the system 100 and methods may cause previously issued credentials of user roles, such as, but not limited to, employees, tenants, contractors, consultants, delivery persons, visitors, and the like, to be activated in physical access control and/or logical access control systems only after retrieving and authenticating a user's proof of physical and/or digital presence at their arrival check-in at the location. In certain embodiments, the credentials may be automatically deactivated in the physical access control and/or logical access control systems after the user checks out and/or after a defined period of time in the event the user fails to check out. In essence, the system 100 and methods utilize multi-factor and multi-model (and multi-modal) authentication, which involves the use of proof of physical presence, proof of digital presence, or a combination thereof, to make buildings, computers, and/or systems around the world safe, secure, and smart.

With regard to proof of physical presence, the system 100 and methods may confirm the user's proof of physical presence through one or more authentication methodologies. Such one or more authentication methodologies may include, but are not limited to, methodologies associated with biometric credentials, such as, 3D face recognition, 3D Face and eyes recognition, 2D face recognition, hand wave recognition, hand geometry recognition, palm vein recognition, palm print recognition, iris recognition, retina recognition, fingerprint recognition, finger vein recognition, voice print speaker recognition, voice pass phrase speaker recognition, gait recognition, beating-heart-scan recognition, ECG recognition, pulse recognition, DNA recognition, keystroke recognition, signature recognition, body odor recognition, ear shape recognition, lips shape recognition, any other physical presence and/or authentication technology, or a combination thereof. With regard to proof of digital presence, the system 100 and methods may confirm the user's proof of digital presence through one or more authentication methodologies as well. Such one or more authentication methodologies and/or mechanisms may include, but are not limited to, passwords, pass phrases, active directory credentials, answers to secret questions, pin codes, digital tokens, proximity cards, RFID tags, NFC tags, mobile based NFC, infrared cards, debit and credit card numbers, CVV, QR codes, barcodes, driver's license number, passport number, visa number, government, military and/or law enforcement issued identity card number, Bluetooth™ proximity, mobile-application-based authentication, fingerprint, face and iris recognition on mobile devices, parking access, license plate recognition, IP address, MAC address, email address, phone number, date of birth, zip code, address, city, state, the user's current or defined location, any other digital presence and/or authentication technology, or a combination thereof.

In addition to facilitating credential activation and/or deactivation, the system 100 and methods also allow for the obtaining of digital consents from users, such as at the time of enrollment into a system 100 facilitating the functionality described in the present disclosure, a security system, a physical access control system, a logical access control system, any other system, or a combination thereof. Upon obtaining a digital consent from a user, the system 100 and methods may hash, encrypt, and/or digitally sign the user's biometric template(s) and/or digital identities with the device identifiers (e.g. any type of identifier that uniquely identifies a device) of one or more devices that the user utilizes. In doing so, the functionality provided by the system 100 and methods limits the use of submitted credentials, as per the user's consent, to only one, multiple, or all devices and/or networks. As a result, the system 100 and methods further secure the user because such credentials will not work by any means on any devices, networks, and/or systems that the user has not consented such credentials to be used on.

In certain embodiments, the system 100 and methods may also provide functionality to allow users to control their credentials by activating the credentials and deactivating the credentials at the user's will. The system 100 and methods may also provide users with the ability to revoke their consent for their credentials to be utilized with devices, networks, and/or systems, which would result in the system 100 and methods removing the users' credentials from such previously consented devices, networks, and/or systems. In further embodiments, the system 100 and methods may also include a custom proximity card (e.g. proximity card 129) that includes a wireless interface, which has an on-chip capability that can be activated and/or deactivated. Proximity card numbers of the proximity card may be issued, replaced, and/or revoked by the functionality provided by the system 100 and methods in real-time or at specified time periods. In certain embodiments, the proximity card numbers may be rotated from a pool of pre-stored proximity card and/or token numbers upon a request by the system 100, a predefined period, and/or based on a request from a user. Based on the foregoing, the system 100 and methods not only secure the existing physical and logical access control systems of an entity, such as a business, but also secure a user's credentials from data breaches and/or unauthorized uses.

As shown in FIG. 1, a system 100 for providing credential activation layered security is disclosed. The system 100 may be configured to support, but is not limited to supporting, authentication services, content delivery services, physical access control services, logical access control services, cloud computing services, satellite services, telephone services, voice-over-internet protocol services (VoIP), software as a service (SaaS) applications, platform as a service (PaaS) applications, gaming applications and services, social media applications and services, operations management applications and services, productivity applications and services, mobile applications and services, and any other computing applications and services. Notably, the system 100 may include a first user 101, who may utilize a first user device 102 to access data, content, and services, or to perform a variety of other tasks and functions. As an example, the first user 101 may utilize first user device 102 to transmit signals to access various online services and content, such as those available on an internet, on other devices, and/or on various computing systems. In certain embodiments, the first user 101 may be an individual that is seeking access to a building (e.g. building/location 125) and/or to various computing systems (e.g. physical access control system 132 and/or logical access control system 134) and/or networks associated with one or more businesses of the building (e.g. communications network 135). The first user device 102 may include a memory 103 that includes instructions, and a processor 104 that executes the instructions from the memory 103 to perform the various operations that are performed by the first user device 102. In certain embodiments, the processor 104 may be hardware, software, or a combination thereof. The first user device 102 may also include an interface 105 (e.g. screen, monitor, graphical user interface, etc.) that may enable the first user 101 to interact with various applications executing on the first user device 102 and to interact with the system 100. In certain embodiments, the first user device 102 may be and/or may include a computer, any type of sensor, a laptop, a set-top-box, a tablet device, a phablet, a server, a mobile device, a smartphone, a smart watch, and/or any other type of computing device. Illustratively, the first user device 102 is shown as a smartphone device in FIG. 1.

In addition to using first user device 102, the first user 101 may also utilize and/or have access to a second user device 106 and a third user device 110. As with first user device 102, the first user 101 may utilize the second and third user devices 106, 110 to transmit signals to access various online services and content. The second user device 106 may include a memory 107 that includes instructions, and a processor 108 that executes the instructions from the memory 107 to perform the various operations that are performed by the second user device 106. In certain embodiments, the processor 108 may be hardware, software, or a combination thereof. The second user device 106 may also include an interface 109 that may enable the first user 101 to interact with various applications executing on the second user device 106 and to interact with the system 100. In certain embodiments, the second user device 106 may be and/or may include a computer, any type of sensor, a laptop, a set-top-box, a tablet device, a phablet, a server, a mobile device, a smartphone, a smart watch, and/or any other type of computing device. Illustratively, the second user device 102 is shown as a smart watch device in FIG. 1.

The third user device 110 may include a memory 111 that includes instructions, and a processor 112 that executes the instructions from the memory 111 to perform the various operations that are performed by the third user device 110. In certain embodiments, the processor 112 may be hardware, software, or a combination thereof. The third user device 110 may also include an interface 113 that may enable the first user 101 to interact with various applications executing on the third user device 110 and to interact with the system 100. In certain embodiments, the third user device 106 may be and/or may include a computer, a laptop, any type of sensor, a set-top-box, a tablet device, a phablet, a server, a mobile device, a smartphone, a smart watch, and/or any other type of computing device. Illustratively, the third user device 110 is shown as a tablet device in FIG. 1. Notably, in certain embodiments, the first, second, and/or third user devices 102, 106, 110 may include any number of sensors, which may include, but are not limited to, face recognition sensors, light sensors, vibration sensors, acoustic sensors, location sensors, eye recognition sensors, proximity sensors, hand wave recognition sensors, presence sensors, hand geometry sensors and/or readers, palm vein recognition sensors and/or readers, voice print speaker sensors, voice pass phrase detectors, fingerprint readers, temperature sensors, pressure sensors, retina recognition devices, gyroscopes, accelerometers, GPS devices, finger vein recognition devices, gait recognition devices, beating-heart-scan recognition devices, ECG devices, pulse recognition devices, DNA recognition devices, keystroke recognition devices, signature recognition devices, body odor recognition devices, ear shape recognition devices, lip shape recognition devices, any type of sensor, any other physical presence and/or authentication technology, or a combination thereof.

The first, second, and third user devices 102, 106, 110 may belong to and/or form a communications network 114. In certain embodiments, the communications network 114 may be a local, mesh, or other network that enables and/or facilitates various aspects of a single or multi-part authentication process for gaining access to nearby systems and locations, such as location 125, which may be a building. In certain embodiments, the communications network 114 may be formed between the first, second, and third user devices 102, 106, 110 through the use of any type of wireless or other protocol and/or technology. For example, the first, second, and third user devices 102, 106, 110 may communicate with one another in the communications network 114 by utilizing Bluetooth Low Energy (BLE), classic Bluetooth, ZigBee, cellular, NFC, Wi-Fi, Z-Wave, ANT+, IEEE 802.15.4, IEEE 802.22, ISA100a, infrared, ISM band, RFID, UWB, Wireless HD, Wireless USB, any other protocol and/or wireless technology, satellite, fiber, or any combination thereof. Notably, the communications network 114 may be configured to communicatively link with and/or communicate with any other network of the system 100 and/or outside the system 100.

In certain embodiments, the first, second, and third user devices 102, 106, 110 belonging to the communications network 114 may share and exchange data with each other via the communications network 114. For example, the first, second, and third user devices 102, 106, 110 may share information relating to the various components of the first, second, and third user devices 102, 106, 110, information identifying the first, second, and third user devices' 102, 106, 110 locations, information indicating the types of sensors that the first, second, and third user devices 102, 106, 110 have, information indicating biometric information for identifying any user associated with the first, second, and/or third user devices 102, 106, 110, information indicating authentication information associated with any user associated with the first, second, and/or third user devices 102, 106, 110, information indicating the types of authentication capabilities of the first, second, and third user devices 102, 106, 110, information identifying the types of connections utilized by the first, second, and third user devices 102, 106, 110, information identifying the applications being utilized on the first, second, and third user devices 102, 106, 110, information identifying how the first, second, and third user devices 102, 106, 110 are being utilized by a user, information identifying whether the first, second, and third user devices 102, 106, 110 are moving and in what direction, information identifying an orientation of the first, second, and third user devices 102, 106, 110, information identifying which user is logged into and/or using the first, second, and third user devices 102, 106, 110, information identifying user profiles for users of the first, second, and third user devices 102, 106, 110, information identifying device profiles for the first, second, and third user devices 102, 106, 110, information identifying the number of devices in the communications network 114, information identifying devices being added to or removed from the communications network 114, any other information, or any combination thereof.

Information obtained from the sensors of the first, second, and third user devices 102, 106, 110 may include, but is not limited to, biometric information from any biometric sensor (or other sensor) of the first, second, and/or third user devices 102, 106, 110, temperature readings from temperature sensors of the first, second, and third user devices 102, 106, 110, ambient light measurements from light sensors of the first, second, and third user devices 102, 106, 110, sound measurements from acoustic sensors of the first, second, and third user devices 102, 106, 110, vibration measurements from vibration sensors of the first, second, and third user devices 102, 106, 110, global positioning information from global positioning devices of the first, second, and third user devices 102, 106, 110, pressure readings from pressure sensors of the first, second, and third user devices 102, 106, 110, proximity information from proximity sensors of the first, second, and third user devices 102, 106, 110, motion information from motion sensors of the first, second, and third user devices 102, 106, 110, presence information from presence sensors of the first, second, and third user devices 102, 106, 110, heart rate sensor information from heart rate sensors of the first, second, and third user devices 102, 106, 110, orientation information from gyroscopes of the first, second, and third user devices 102, 106, 110, tilt information from tilt sensors of the first, second, and third user devices 102, 106, 110, acceleration information from accelerometers of the first, second, and third user devices 102, 106, 110, information from any other sensors, or any combination thereof. In certain embodiments, information from the sensors of the first, second, and third user devices 102, 106, 110 may be transmitted via one or more signals to each other and to the components of the system 100.

In addition to the first user 101, the system 100 may also include a second user 115, who may utilize a fourth user device 116 to perform a variety of functions. For example, the fourth user device 116 may be utilized by the second user 115 to transmit signals to request various types of content, services, and data provided by content and service providers associated with the communications network 135 or any other network in the system 100. In certain embodiments, the second user 115 may be an individual that is seeking access to a building (e.g. building 125) and/or to various computing systems (e.g. physical access control system 132 and/or logical access control system 134) and/or networks associated with one or more businesses of the building (e.g. communications network 135). The fourth user device 116 may include a memory 117 that includes instructions, and a processor 118 that executes the instructions from the memory 117 to perform the various operations that are performed by the fourth user device 116. In certain embodiments, the processor 118 may be hardware, software, or a combination thereof. The fourth user device 116 may also include an interface 119 (e.g. screen, monitor, graphical user interface, etc.) that may enable the second user 115 to interact with various applications executing on the fourth user device 116 and to interact with the system 100. In certain embodiments, the fourth user device 116 may be a computer, a laptop, a set-top-box, a tablet device, a phablet, a server, a mobile device, a smartphone, a smart watch, and/or any other type of computing device. Illustratively, the fourth user device 116 is shown as a smartphone device in FIG. 1.

The second user 115 may also utilize a fifth user device 120 to perform a variety of functions. As with the fourth user device 116, the fifth user device 120 may be utilized by the second user 115 to transmit signals to request various types of content, services, and data provided by content and service providers associated with the communications network 135 or any other network in the system 100. The fifth user device 120 may include a memory 121 that includes instructions, and a processor 122 that executes the instructions from the memory 121 to perform the various operations that are performed by the fifth user device 120. In certain embodiments, the processor 122 may be hardware, software, or a combination thereof. The fifth user device 120 may also include an interface 123 (e.g. screen, monitor, graphical user interface, etc.) that may enable the second user 115 to interact with various applications executing on the fifth user device 120 and to interact with the system 100. In certain embodiments, the fifth user device 120 may be a computer, a laptop, a set-top-box, a tablet device, a phablet, a server, a mobile device, a smartphone, a smart watch, and/or any other type of computing device. Illustratively, the fifth user device 120 is shown as a tablet device in FIG. 1. Notably, in certain embodiments, the fourth and/or fifth user devices 116, 120 may include any number of sensors, which may include, but are not limited to, face recognition sensors, light sensors, vibration sensors, acoustic sensors, location sensors, eye recognition sensors, proximity sensors, hand wave recognition sensors, presence sensors, hand geometry sensors and/or readers, palm vein recognition sensors and/or readers, voice print speaker sensors, voice pass phrase detectors, fingerprint readers, temperature sensors, pressure sensors, retina recognition devices, gyroscopes, accelerometers, GPS devices, finger vein recognition devices, gait recognition devices, beating-heart-scan recognition devices, ECG devices, pulse recognition devices, DNA recognition devices, keystroke recognition devices, signature recognition devices, body odor recognition devices, ear shape recognition devices, lip shape recognition devices, any type of sensor, any other physical presence and/or authentication technology, or a combination thereof.

The fourth and fifth user devices 116, 120 may belong to and/or form a communications network 124. In certain embodiments, the communications network 124 may be a local, mesh, or other network that enables and/or facilitates various aspects of a single or multi-part authentication process for gaining access to nearby systems and locations, such as location 125, which may be a building. In certain embodiments, the communications network 124 may be formed between the fourth and/or fifth user devices 116, 120 through the use of any type of wireless or other protocol and/or technology. For example, the fourth and/or fifth user devices 116, 120 may communicate with one another in the communications network 124 by utilizing BLE, classic Bluetooth, ZigBee, cellular, NFC, Wi-Fi, Z-Wave, ANT+, IEEE 802.15.4, IEEE 802.22, ISA100a, infrared, ISM band, RFID, UWB, Wireless HD, Wireless USB, any other protocol and/or wireless technology, satellite, fiber, or any combination thereof. Notably, the communications network 124 may be configured to communicatively link with and/or communicate with any other network of the system 100 and/or outside the system 100. The fourth and fifth user devices 116, 120 belonging to the communications network 124 may share and exchange data with each other via the communications network 124 in a similar fashion as the first, second, and third user devices 102, 106, 110 do in the communications network 114. Additionally, the fourth and fifth user devices 116, 120 may communicate with each other and share similar types of information with each other as the first, second, and third user devices 102, 106, 110 do in the communications network 114. In certain embodiments, the communications network 124 may be communicatively linked with the communications network 114 and/or the communications network 135. In certain embodiments, information and data from the communications network 114 may be shared with the communications network 124 and the communications network 135. Similarly, information from the communications network 124 may be shared with the communications network 114 and the communications network 135.

In certain embodiments, the first user device 102, the second user device 106, the third user device 110, the fourth user device 116, and/or the fifth user device 120 may have any number of software applications and/or application services stored and/or accessible thereon. For example, the first, second, third, fourth, and fifth user devices 102, 106, 110, 116, 120 may include authentication applications, biometric applications (e.g. biometric detection and/or processing applications), cloud-based applications, VoIP applications, other types of phone-based applications, product-ordering applications, business applications, e-commerce applications, media streaming applications, content-based applications, media-editing applications, database applications, gaming applications, internet-based applications, browser applications, mobile applications, service-based applications, productivity applications, video applications, music applications, social media applications, any other type of applications, any types of application services, or a combination thereof. In certain embodiments, the software applications may support the functionality provided by the system 100 and methods described in the present disclosure. In certain embodiments, the software applications and services may include one or more graphical user interfaces so as to enable the first and second users 101, 110 to readily interact with the software applications. The software applications and services may also be utilized by the first and second users 101, 115 to interact with any device in the system 100, any network in the system 100, or any combination thereof. In certain embodiments, the first, second, third, fourth, and fifth user devices 102, 106, 110, 116, 120 may include associated telephone numbers, device identities, or any other identifiers to uniquely identify the first, second, third, fourth, and fifth user devices 102, 106, 110, 116, 120.

The system 100 may include a location 125, which may be a building, a venue, any type of location, or a combination thereof. The location 125 may be a location that the first and/or second user 101, 110 may desire to access and/or enter. In certain embodiments, the location may include one or more ingress points 130 for entering the location 125, and/or one or more egress points 131 for exiting the location 125. The location 125 may include any number of computing devices 126, which are discussed in further detail below. The location 125 may include and/or be connected to one or more physical access control systems 132 and/or logical access control systems 134. The physical access control systems 132 may comprise hardware, software, or a combination thereof, which may be configured to facilitate entry and/or exit by visitors at the location 125 (such as via the ingress and egress points 130, 131), physical access control at the location 125, intrusion detection at the location 125, various types of surveillance at the location 125, access to one or more proximity cards 129, access to the computing device 126 and/or functionality of the computing device 126, any function of any type of physical access control system 132, or a combination thereof. The physical access control system 132 may include the computing device 126 and/or any other number of devices and/or programs to facilitate its operation. In certain embodiments, the physical access control system 132 may include any number of readers as is described in the present disclosure. In certain embodiments, the physical access control system may control and/or include physical gates, locks, RFID/NFC-based barriers, turnstiles, any barriers, doors, elevators, and/or any type of physical access device for facilitating and/or blocking access to the ingress point 130, facilitating and/or blocking exit from the egress point 131, or a combination thereof.

In addition to physical access control systems 132, the location 125 may also include and/or be connected to one or more logical access control systems 134. The logical access control systems 134 may comprise hardware, software, or a combination thereof, which may be configured to facilitate entry and/or exit via the ingress and/or egress points 130, 131 of the location 125, access into computing systems of the system 100 and/or location 125, access into devices of the system 100 and/or location 125, access into computer software of the system 100 and/or location 125, access to the computing device 126, access to the proximity card 129, access into any type of system, device, and/or program, access into the physical access control system 132, or a combination thereof. In certain embodiments, the logical access control system 134 may facilitate identification of the first and/or second users 101, 115 (e.g. such as via biometric scanning and/or username and password combinations entered into the logical access control system 134), authentication of the first and/or second users 101, 115 into the system 100, the location 125, devices of the location 125, the physical access control system 132, any program, device, and/or system associated with the location 125, or any combination thereof. The logical access control system 134 may also be utilized to enable the first and/or second users 101, 115 to submit proof of digital presence information and/or physical presence to authenticate into the system 100, the logical access control system 134, the physical access control system 132, any device and/or program of the system 100, any computing system of the system 100, or a combination thereof. If a user is authenticated, the logical access control system 134 may provide one or more credentials (e.g. tokens, username and password combinations, proximity card numbers for use with the proximity cards 129 for accessing various systems, any type of credential, or a combination thereof) to such a user so as to enable the user to access the system 100, the logical access control system 134, the physical access control system 132, any device and/or program of the system 100, any computing system of the system 100, or a combination thereof. In certain embodiments, the logical access control system 134 may be configured to enforce access control measures for any of the devices, programs, systems, databases, and/or information of the system 100. In certain embodiments, the logical access control systems 134 may be configured to enable remote access of hardware, software, information, and programs of the system 100, such as by the first user device 102. In certain embodiments, the physical access control system 132, the logical access control system 134, or a combination thereof, may be utilized to facilitate and/or prevent access to the system 100, the logical access control system 134, the physical access control system 132, any device and/or program of the system 100, any computing system of the system 100, or a combination thereof.

The system 100 may also include one or more computing devices 126, which may or may not be included in the location 125. In certain embodiments, access to the computing device 126 may be controlled by the physical access control system 132, the logical access control system 134, any other system of system 100, or a combination thereof. In certain embodiments, the computing device 126 may be a kiosk that may be configured to have any number of sensors and/or devices to facilitate the obtaining of biometric information, the creation of biometric templates (i.e. digital and/or other representations of biometric information generated by the computing device 126 to uniquely identify an individual from one or more other individuals), the comparison of biometric information to stored biometric templates, or any combination thereof. The computing device 126, in certain embodiments, may be the device that enables or prevents access into the ingress point 130 and/or egress point 131 of the location 125. The computing device 126 may include a memory 127 that includes instructions, and a processor 128 that executes the instructions from the memory 127 to perform the various operations that are performed by the computing device 126. In certain embodiments, the processor 128 may be hardware, software, or a combination thereof. The computing device 126 may also include an interface (e.g. screen, monitor, graphical user interface, etc.) that may enable users to interact with various applications executing on the computing device 126 and to interact with the system 100. In certain embodiments, the computing device 126 may be and/or may include a computer, a reader (e.g. an RFID reader, NFC reader, any type of reader, or a combination thereof), a kiosk, any type of sensor, a laptop, a set-top-box, a tablet device, a phablet, a server, a mobile device, a smartphone, a smart watch, and/or any other type of computing device. Illustratively, the computing device 126 is shown as a kiosk device in FIG. 1.

In certain embodiments, the computing device 126 may be configured to dispense and/or receive one or more proximity cards 129. In certain embodiments, the proximity card 129 may only be dispensed if a user effectively authenticates into the physical access control system 132, the logical access control system 134, or a combination thereof. If such a user is authenticated, the computing device 126 may provide a unique proximity card number, which may be utilized with a particular proximity card 129, which may allow the user to access authorized devices, programs, and computing systems of the system 100. The proximity card 129 may be any type of proximity card that may be configured to be powered using radio frequency and/or other communications signals from a reader device, such as a reader device of the computing device 126. The reader of the computing device 126 may include an integrated circuit, which may include the functionality of a processor, memory, or a combination thereof, and may be a chip. The integrated circuit may be configured to transmit signals, instructions, data, information, or any combination thereof. The integrated circuit may also be configured to store and process and any information received from the proximity card 129 or from any other device in the system 100, such as first and second user devices 102, 106. Any information processed and/or stored by the integrated circuit may be transmitted to communications network 135, the first and second user devices 102, 106, or to any other device and/or network in the system 100. The may also include a communications module, such as a Bluetooth or NFC module, that may be utilized to communicate information to and from the first and second user devices 102, 106, which may also have their own corresponding communications modules. Notably, in certain embodiments, the reader may include any functionality of a traditional RFID reader, NFC reader, other reader, or a combination thereof.

In certain embodiments, the proximity card 129 may include one or more tags (e.g. RFID tag, NFC tag, any other type of tag, etc.). The tags may be a RFID tag, an NFC tag, a transceiver, any type of tag capable of wirelessly communicating with the reader of the computing device 126 and/or any other reader of the system 100. In certain embodiments, the tag may include an antenna and an integrated circuit, which may be a chip. The antenna may be attached to the integrated circuit, and may be configured to absorb signals propagated from one or more antennas of a reader of the system 100. The signals may be absorbed by the antenna when the tag of the proximity card 129 is within range of the radio frequency fields (or other energy fields) generated by a reader of the system 100. The absorbed signals may provide energy to supply power and activate the integrated circuit of the tag. Once the integrated circuit of the tag is activated, the tag may communicate with one or more readers of the system 100 and may transmit any information stored within the tag to the readers, such as by utilizing an antenna of the proximity card 129. For example, the information that may be transmitted may be information that identifies the tag (e.g. an identifier, such as a numeric or string-based identifier), identifies the specific user using the proximity card 129 and/or is authorized to use the proximity card 129, identifies which systems, devices, and or locations that a user of the proximity card 129 is authorized to access, credentials, any other information, or a combination thereof. In certain embodiments, the readers may transmit any information to the tags as well, such as, but not limited to, credentials and/or any other information. The integrated circuits of the readers may process the information and transmit the information to the servers 140, 145 of the communications network 135 for further processing and/or handling. In certain embodiments, when the tag of the proximity card 129 is scanned by a reader of the system 100, the system 100 may perform any number of actions. For example, when the tag is scanned by the reader, information from the tag may be sent to the reader, which may then be transmitted to an application executing on the computing device 126, any other device of the system 100, and/or to the servers 140, 145. In an exemplary scenario, the servers 140, 145 may process the information and may enable a user using the proximity card 129 to access one or more systems, devices, and/or locations within the location 125 based on the specific access privileges provided to the user via the proximity card 129.

The system 100 may also include a communications network 135. The communications network 135 may be under the control of a service provider, individuals associated with the location 125, any other designated user, or a combination thereof. The communications network 135 of the system 100 may be configured to link each of the devices in the system 100 to one another. For example, the communications network 135 may be utilized by the first user device 102 to connect with other devices within or outside communications network 135. Additionally, the communications network 135 may be configured to transmit, generate, and receive any information and data traversing the system 100. In certain embodiments, the communications network 135 may include any number of servers, databases, or other componentry. The communications network 135 may also include and be connected to a mesh network, a local network, a cloud-computing network, an IMS network, a VoIP network, a security network, a VoLTE network, a wireless network, an Ethernet network, a satellite network, a broadband network, a cellular network, a private network, a cable network, the Internet, an internet protocol network, MPLS network, a content distribution network, any network, or any combination thereof. Illustratively, servers 140, 145, and 150 are shown as being included within communications network 135. In certain embodiments, the communications network 135 may be part of a single autonomous system that is located in a particular geographic region, or be part of multiple autonomous systems that span several geographic regions.

Notably, the functionality of the system 100 may be supported and executed by using any combination of the servers 140, 145, 150, and 160. The servers 140, 145, and 150 may reside in communications network 135, however, in certain embodiments, the servers 140, 145, 150 may reside outside communications network 135. The servers 140, 145, and 150 may provide and serve as a server service that performs the various operations and functions provided by the system 100. In certain embodiments, the server 140 may include a memory 141 that includes instructions, and a processor 142 that executes the instructions from the memory 141 to perform various operations that are performed by the server 140. The processor 142 may be hardware, software, or a combination thereof. Similarly, the server 145 may include a memory 146 that includes instructions, and a processor 147 that executes the instructions from the memory 146 to perform the various operations that are performed by the server 145. Furthermore, the server 150 may include a memory 151 that includes instructions, and a processor 152 that executes the instructions from the memory 151 to perform the various operations that are performed by the server 150. In certain embodiments, the servers 140, 145, 150, and 160 may be network servers, routers, gateways, switches, media distribution hubs, signal transfer points, service control points, service switching points, firewalls, routers, edge devices, nodes, computers, mobile devices, or any other suitable computing device, or any combination thereof. In certain embodiments, the servers 140, 145, 150 may be communicatively linked to the communications network 135, the communications network 114, the communications network 124, any network, any device in the system 100, or any combination thereof.

The database 155 of the system 100 may be utilized to store and relay information that traverses the system 100, cache content that traverses the system 100, store data about each of the devices in the system 100 and perform any other typical functions of a database. In certain embodiments, the database 155 may be connected to or reside within the communications network 135, the communications network 114, the communications network 124, any other network, or a combination thereof. In certain embodiments, the database 155 may serve as a central repository for any information associated with any of the devices and information associated with the system 100. Furthermore, the database 155 may include a processor and memory or be connected to a processor and memory to perform the various operation associated with the database 155. In certain embodiments, the database 155 may be connected to the computing device 126, the ingress point 130, the egress point 131, the physical access control system 132, the logical access control system 134, the servers 140, 145, 150, 160, the first user device 102, the second user device 106, the third user device 110, the fourth user device 116, the fifth user device 120, any devices in the system 100, any other device, any network, or any combination thereof.

The database 155 may also store information and metadata obtained from the system 100, store metadata and other information associated with the first and second users 101, 115, store user profiles associated with the first and second users 101, 115, store device profiles associated with any device in the system 100, store communications traversing the system 100, store user preferences, store information associated with any device or signal in the system 100, store information relating to patterns of usage relating to the first, second, third, fourth, and fifth user devices 102, 106, 110, 116, 120, store any information obtained from any of the networks in the system 100, store proximity card numbers associated with proximity cards 129, storing information associated with the physical and/or logical access control systems 132, 134, store information associated with proof of physical and/or digital presence of a user, store check-in and/or check-out information associated with a user, store digital consents provided by one or more users, store any biometric information obtained from any of the sensors of the system 100, store biometric and/or digital credentials, store historical data associated with the first and second users 101, 115, store device characteristics, store information relating to any devices associated with the first and second users 101, 115, store any information associated with the computing device 126, store biometric information (including biometric templates) associated with the first and second users 101, 115, store log on sequences and/or authentication information, store information associated with the communications networks 114, 124, store access codes, store access tokens, store any information generated and/or processed by the system 100, store any of the information disclosed for any of the operations and functions disclosed for the system 100 herewith, store any information traversing the system 100, or any combination thereof. Furthermore, the database 155 may be configured to process queries sent to it by any device in the system 100.

Operatively, the system 100 may operate and/or execute the functionality as described in the methods of the present disclosure. Notably, as shown in FIG. 1, the system 100 may perform any of the operative functions disclosed herein by utilizing the processing capabilities of server 160, the storage capacity of the database 155, or any other component of the system 100 to perform the operative functions disclosed herein. The server 160 may include one or more processors 162 that may be configured to process any of the various functions of the system 100. The processors 162 may be software, hardware, or a combination of hardware and software. Additionally, the server 160 may also include a memory 161, which stores instructions that the processors 162 may execute to perform various operations of the system 100. For example, the server 160 may assist in processing loads handled by the various devices in the system 100, such as, but not limited to, receiving and/or authenticating proofs of physical presence; receiving and/or authenticating proofs of digital presence; determining if the proofs of physical and/or digital presence match information contained in biometric templates and/or profiles of the system 100, preventing a user from accessing a location 125 and/or systems associated with the location 125, checking a user into the location 125 and/or systems associated with the location 125, activating one or more credentials for accessing a physical access control system 132 and/or a logical access control system 134, enabling access at an ingress point 130 of the location 125 by utilizing the credentials, deactivating the credential after a period of time and/or if the user does not check out, preventing access to the location 125 and/or systems associated with the location 125 after deactivating the credential, and performing any other suitable operations conducted in the system 100 or otherwise. In one embodiment, multiple servers 160 may be utilized to process the functions of the system 100. The server 160 and other devices in the system 100, may utilize the database 155 for storing data about the devices in the system 100 or any other information that is associated with the system 100. In one embodiment, multiple databases 155 may be utilized to store data in the system 100.

Although FIG. 1 illustrates specific example configurations of the various components of the system 100, the system 100 may include any configuration of the components, which may include using a greater or lesser number of the components. For example, the system 100 is illustratively shown as including a first user device 102, a second user device 106, a third user device 110, a fourth user device 116, a fifth user device 120, a computing device 126, a proximity card 129, a physical access control system 132, a logical access control system 134, a communications network 114, a communications network 124, a communications network 135, a server 140, a server 145, a server 150, a server 160, and a database 155. However, the system 100 may include multiple first user devices 102, multiple second user devices 106, multiple third user devices 110, multiple fourth user devices 116, multiple fifth user devices 120, multiple computing devices 126, multiple communications networks 114, multiple communications networks 124, multiple proximity cards 129, multiple physical access control systems 132, multiple logical access control systems 134, multiple communications networks 135, multiple servers 140, multiple servers 145, multiple servers 150, multiple servers 160, multiple databases 155, or any number of any of the other components inside or outside the system 100. Furthermore, in certain embodiments, substantial portions of the functionality and operations of the system 100 may be performed by other networks and systems that may be connected to system 100.

Figure 2:
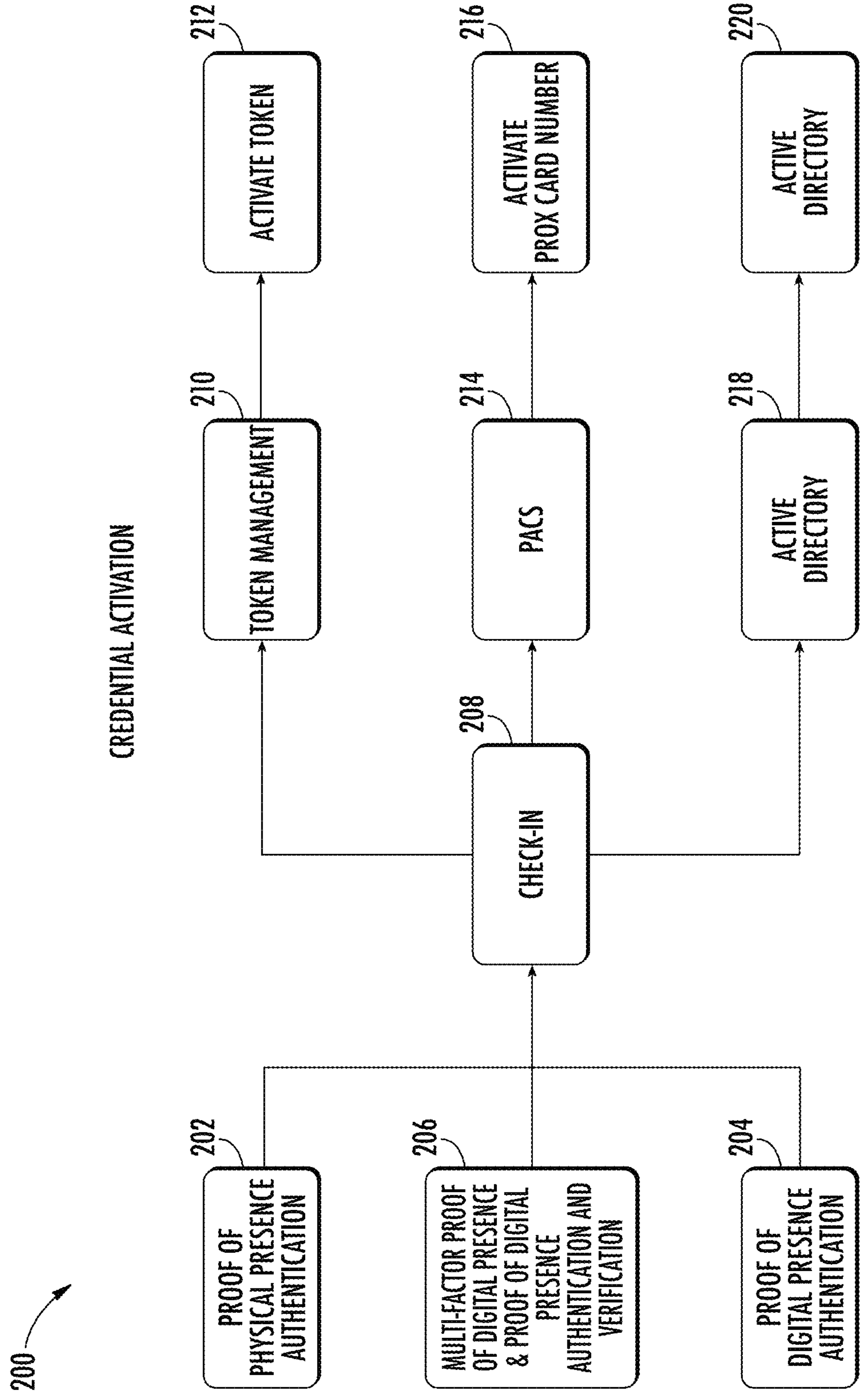
FIG. 2 is a flow diagram illustrating a sample method for providing credential activation according to an embodiment of the present disclosure.

Notably, the system 100 may execute and/or conduct the functionality as described in the methods that follow. As shown in FIG. 2, an exemplary method 200 for providing credential activation layered security is schematically illustrated. The method 200 may include steps for activating one or more credentials for a user, such as first user 101, so as to enable the user to access a location 125, devices, computing systems, programs, physical access control system 132, logical access control system 134, any component of system 100, or a combination thereof. At step 202, the method 200 may include receiving a proof of physical presence from a user (e.g. first user 101). During step 202, the proof of physical presence may also be authenticated by the system 100. For example, a particular proof of physical presence may be compared to information already stored for a user in the system 100, and if the proof of physical presence matches information already stored for the user in the system 100 (e.g. biometric data submitted as proof of physical presence matches biometric data already stored in the system 100), the proof may be authenticated. In certain embodiments, the receiving and/or authentication of the proof of physical presence may be performed and/or facilitated by utilizing the first user device 102, the second user device 106, the third user device 110, the fourth user device 116, the fifth user device 120, the computing device 126, the physical access control system 132, the logical access control system 134, the server 140, the server 145, the server 150, the server 160, the communications networks 114, 124, 135, any combination thereof, or by utilizing any other appropriate program, network, system, or device.

Proofs of physical presence may include, but are not limited to including, obtained and/or analyzed biometric credentials, such as, content and information obtained via 3D face recognition (e.g. a 3D image of the first user 101), content and information obtained via 3D Face and eyes recognition (e.g. a 3D image of the face and eyes of the first user 101), content and information obtained via 2D face recognition (e.g. a 2D image of the face of the first user 101), content and information obtained via hand wave recognition (a video depicting the first user's 101 manner of conducting hand waving), content and information obtained via hand geometry recognition (e.g. an image containing hand geometry information of the first user 101 and/or measurements of the first user's 101 hand), content and information obtained via palm vein recognition (e.g. an image depicting the palm veins of the first user 101), content and information obtained via palm print recognition (e.g. an image containing a palm print of the first user 101 and/or associated measurements), content and information obtained via iris recognition (e.g. an image depicting an iris of the first user 101 and/or information associated with the dimensions of the iris), content and information obtained via retina recognition (e.g. an image containing a retina of the first user 101 or measurements of the retina of the first user 101), content and information obtained via fingerprint recognition (e.g. an image containing a fingerprints of the first user 101 and/or measurements of the fingerprints), content and information obtained via finger vein recognition (e.g. an image containing finger veins of the first user 101), content and information obtained via voice print speaker recognition (e.g. an audio sample of the first user's 101 speech), content and information obtained via voice pass phrase speaker recognition (e.g. an audio sample of a pass phrase spoken by the first user 101), content and information obtained via gait recognition (e.g. media content containing information and/or visuals corresponding to the gait of the first user 101), content and information obtained via beating-heart-scan recognition (e.g. heart beat measurements of the first user 101), content and information obtained via ECG recognition (e.g. an electrocardiogram taken of the first user 101), content and information obtained via pulse recognition (e.g. a pulse measurement(s) of the first user 101), content and information obtained via DNA recognition (e.g. DNA information and/or testing results of the first user 101), keystroke recognition (e.g. tracked keystrokes made by the first user 101), content and information obtained via signature recognition (e.g. an image containing a signature made by the first user 101), content and information obtained via body odor recognition (e.g. a sample of the body odor of the and/or information describing the body odor of the first user 101), content and information obtained via ear shape recognition (e.g. an image and/or description of the ear shape of the first user 101), content and information obtained via lips shape recognition (e.g. an image and/or description of the lips shape of the first user 101), any other physical presence information and/or authentication technology content and/or information, or a combination thereof.

At step 204 and as a potential alternative to starting the method 200 at step 202, the method 200 may include receiving a proof of digital presence from a user, such as first user 101. During step 204, the proof of digital presence may be authenticated by the system 100. For example, a particular proof of digital presence may be compared to information already stored for a user in the system 100, and if the proof of digital presence matches information already stored for the user in the system 100, the proof of digital presence may be authenticated. In certain embodiments, the receiving and/or authentication of the proof of digital presence may be performed and/or facilitated by utilizing the first user device 102, the second user device 106, the third user device 110, the fourth user device 116, the fifth user device 120, the computing device 126, the physical access control system 132, the logical access control system 134, the server 140, the server 145, the server 150, the server 160, the communications networks 114, 124, 135, any combination thereof, or by utilizing any other appropriate program, network, system, or device.

Proofs of digital presence may include, but are not limited to, input, analyzed, and/or obtained passwords, pass phrases, active directory credentials, answers to secret questions, pin codes, digital tokens, proximity cards and information stored thereon, information contained in RFID tags, information contained in NFC tags, mobile based NFC information, information contained in infrared cards, debit and credit card numbers, CVV information, QR codes, barcodes, driver's license numbers, passport numbers, visa numbers, government, military and/or law enforcement issued identity card numbers, Bluetooth proximity information, mobile-application-based authentication information, fingerprint, face and iris recognition information obtained on mobile devices, parking access information, license plate recognition information, IP addresses, MAC addresses, email addresses, phone numbers, date of birth information, zip code, address, city, state, the user's current or defined location, information associated with applications and/or devices utilized and/or authenticated into by a user, any other digital presence and/or authentication technology, or a combination thereof.

At step 206 and as a potential alternative to starting the method 200 at step 202 or 204, the method 200 may include receiving a proof of digital presence from a user, such as first user 101, and a proof of physical presence from the user. During step 206, the proof of digital presence and/or the proof of physical presence may be authenticated by the system 100. For example, a particular proof of digital presence and/or proof of physical presence may be compared to information already stored for a user in the system 100, and if the proof of digital presence and/or physical presence match information already stored for the user in the system 100, the proof of digital presence and/or proof of physical presence may be authenticated. In certain embodiments, the receiving and/or authentication of the proof of physical presence and the proof of digital presence may be performed and/or facilitated by utilizing the first user device 102, the second user device 106, the third user device 110, the fourth user device 116, the fifth user device 120, the computing device 126, the physical access control system 132, the logical access control system 134, the server 140, the server 145, the server 150, the server 160, the communications networks 114, 124, 135, any combination thereof, or by utilizing any other appropriate program, network, system, or device.

If at step 202, 204, or 206 the proof of physical presence and/or proof of digital presence is/are authenticated by the system 100, the method 200 may include checking the user in, at step 208, such as into a physical access control system 132, a logical access control system 134, the system 100 itself, any component of the system 100, any program of the system 100, any device of the system 100, anything in the system 100, or a combination thereof. In certain embodiments, the checking in may be performed and/or facilitated by utilizing the first user device 102, the second user device 106, the third user device 110, the fourth user device 116, the fifth user device 120, the computing device 126, the physical access control system 132, the logical access control system 134, the server 140, the server 145, the server 150, the server 160, the communications networks 114, 124, 135, any combination thereof, or by utilizing any other appropriate program, network, system, or device. If, at step 202, 204, 04 206, the proof of physical presence and/or proof of digital presence are not authenticated by the system 100, the system 100 may generate and transmit an alert indicating the failure of the authentication. At step 210, the method 200 may include utilizing a token management system (which may be included within any of the components of the system 100, such as, but not limited to, the logical access control system 134 and/or the physical access control system 132) to generate, obtain, and/or select a unique token for the user that has been checked in. In certain embodiments, the generating, obtaining, and/or selecting of the unique token may be performed and/or facilitated by utilizing the first user device 102, the second user device 106, the third user device 110, the fourth user device 116, the fifth user device 120, the computing device 126, the physical access control system 132, the logical access control system 134, the server 140, the server 145, the server 150, the server 160, the communications networks 114, 124, 135, any combination thereof, or by utilizing any other appropriate program, network, system, or device.

In certain embodiments, the token may be a physical device and/or software that may be utilized to access to physical locations and/or computing systems. In certain embodiments, the token may serve as an electronic key to access anything that the system 100 has authorized the first user 101 to access. For example, the token may be utilized to open doors, access various software applications associated with the location 125, or a combination thereof. In certain embodiments, the token may include unique cryptographic keys, digital signatures, strings of characters and/or numbers, biometric data, passwords, any security information, any information associated with a user, or a combination thereof, which may be used to access various parts of the system 100 and/or gain access to the ingress point 130 and/or exit via the egress point 131. In certain embodiments, the token may be configured to communicate by utilizing Bluetooth™, NFC, short-range wireless protocols, WiFi, any other communication protocol or a combination thereof. Once the token is generated, obtained, and/or selected for the user, the method 200 may include, at step 212, activating the token so that the user may use the token as a credential for accessing computing systems and/or devices of the system, entering the location via the computing device 126 and via ingress point 131, exiting the egress point 131, accessing various applications of the system, any other type of access of the system 100, or a combination thereof. In certain embodiments, the activating of the token may be performed and/or facilitated by utilizing the first user device 102, the second user device 106, the third user device 110, the fourth user device 116, the fifth user device 120, the computing device 126, the physical access control system 132, the logical access control system 134, the server 140, the server 145, the server 150, the server 160, the communications networks 114, 124, 135, any combination thereof, or by utilizing any other appropriate program, network, system, or device.

In certain embodiments, after step 208, the method 200 may proceed to step 214, which may include accessing and/or interacting with the physical access control system 132. While accessing and/or interacting with the physical access control system 132, the method 200 may include having the physical access control system 132 generating a proximity card number and/or other credentials for use with a proximity card 129. In certain embodiments, the accessing and/or interacting may be performed and/or facilitated by utilizing the first user device 102, the second user device 106, the third user device 110, the fourth user device 116, the fifth user device 120, the computing device 126, the physical access control system 132, the logical access control system 134, the server 140, the server 145, the server 150, the server 160, the communications networks 114, 124, 135, any combination thereof, or by utilizing any other appropriate program, network, system, or device. At step 216, the method may include activating the proximity card number and enabling the proximity card number to be utilized by a user with a proximity card 129 to access the location 125, the ingress point 130, the egress point 131, barriers and/or locks of the location 125, computing systems associated with the location 125, computing systems and/or programs of the system 100, or a combination thereof. In certain embodiments, the proximity card 129 may be dispensed via computing device 126 and may be utilized by a user once the proximity card number of the proximity card 129 is activated.

In certain embodiments, after step 208, the method 200, at step 218, may include accessing and/or interacting with a logical access control system 134, which may include, but is not limited to including, an active directory (e.g. Azure Active Directory), single-sign-on services, authentication services, any type of logical access control system features, or a combination thereof. At step 218, the method 200 may include generating, obtaining, selecting and/or providing a username, password, account, and/or other credentials for an account associated with the user. The username, password, account, and/or other credentials may be utilized by a user to access various physical locations within the location 125, access computing systems of the location 125, access computing systems of the system 100, access various programs, access systems within the system 100 using single-sign on processes, or any combination thereof. In certain embodiments, the username, password, account, and/or other credentials may be utilized in conjunction with the activated proximity card number on a proximity card 129 to access various systems and/or areas of the system 100 and/or location 125. In certain embodiments, the accessing and/or interacting and the providing of the username, password and/or other credentials may be performed and/or facilitated by utilizing the first user device 102, the second user device 106, the third user device 110, the fourth user device 116, the fifth user device 120, the computing device 126, the physical access control system 132, the logical access control system 134, the server 140, the server 145, the server 150, the server 160, the communications networks 114, 124, 135, any combination thereof, or by utilizing any other appropriate program, network, system, or device. At step 220, the method 200 may include enabling the username, password, account, and/or other credentials and enabling a user to access the location 125, the ingress point 130, the egress point 131, barriers and/or locks of the location 125, computing systems associated with the location 125, computing systems and/or programs of the system 100, or a combination thereof, using the enabled credential(s). Notably, the method 200 may further incorporate any of the features and functionality described for the system 100, any other method disclosed herein, or as otherwise described herein.

Figure 3:
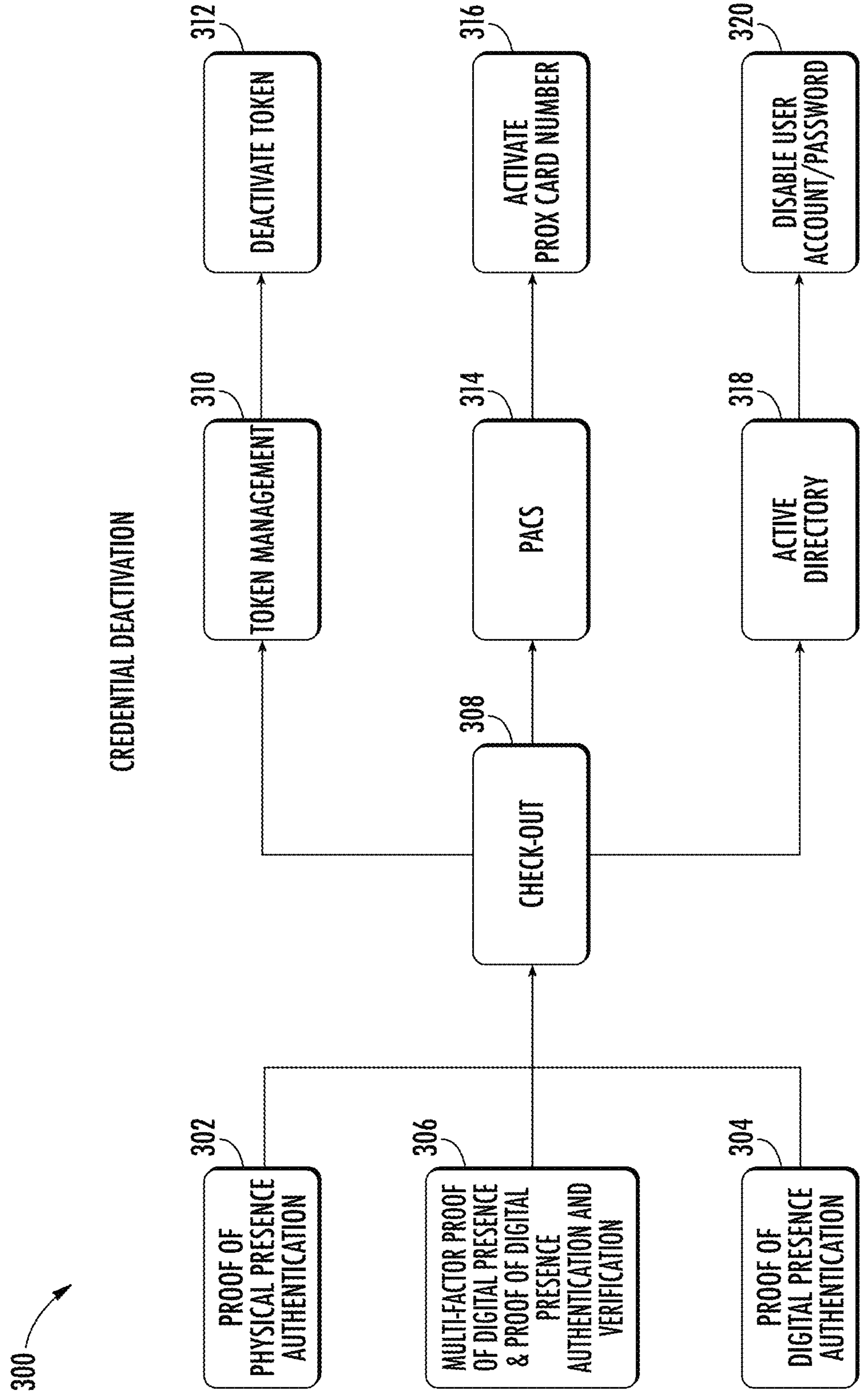
FIG. 3 is a flow diagram illustrating a sample method for providing credential deactivation according to an embodiment of the present disclosure.

As shown in FIG. 3, an exemplary method 300 for providing credential deactivation is schematically illustrated. The method 300 may include steps for deactivating a user's credentials so as to prevent access to a location 125, a physical access control system 132, a logical access control system 134, a program, a device, any type of system, or a combination thereof. The method 300 may include, at step 302, receiving a proof of physical presence from a user (e.g. first user 101). During step 302, the proof of physical presence may also be authenticated by the system 100. In certain embodiments, the receiving and/or authentication of the proof of physical presence may be performed and/or facilitated by utilizing the first user device 102, the second user device 106, the third user device 110, the fourth user device 116, the fifth user device 120, the computing device 126, the physical access control system 132, the logical access control system 134, the server 140, the server 145, the server 150, the server 160, the communications networks 114, 124, 135, any combination thereof, or by utilizing any other appropriate program, network, system, or device. At step 304 and as a potential alternative to starting method 300 at step 302, the method 300 may include receiving a proof of digital presence from a user. During step 304, the proof of digital presence may also be authenticated by the system 100. In certain embodiments, the receiving and/or authentication of the proof of digital presence may be performed and/or facilitated by utilizing the first user device 102, the second user device 106, the third user device 110, the fourth user device 116, the fifth user device 120, the computing device 126, the physical access control system 132, the logical access control system 134, the server 140, the server 145, the server 150, the server 160, the communications networks 114, 124, 135, any combination thereof, or by utilizing any other appropriate program, network, system, or device.

At step 306 and as a potential alternative to starting the method 300 at step 302 or 304, the method 300 may include receiving a proof of digital presence from a user, such as first user 101, and a proof of physical presence from the user. During step 306, the proof of digital presence and/or the proof of physical presence may be authenticated by the system 100. For example, a particular proof of digital presence and/or proof of physical presence may be compared to information already stored for the user in the system 100, and if the proof of digital presence and/or physical presence matches information already stored for the user in the system 100, the proof of digital presence and/or proof of physical presence may be authenticated. In certain embodiments, the receiving and/or authentication of the proof of physical presence and the proof of digital presence may be performed and/or facilitated by utilizing the first user device 102, the second user device 106, the third user device 110, the fourth user device 116, the fifth user device 120, the computing device 126, the physical access control system 132, the logical access control system 134, the server 140, the server 145, the server 150, the server 160, the communications networks 114, 124, 135, any combination thereof, or by utilizing any other appropriate program, network, system, or device.

If at step 302, 304, or 306 the proof of physical presence and/or proof of digital presence is authenticated by the system 100, the method 300 may include checking the user out, at step 308, such as out of the physical access control system 132, the logical access control system 134, the system 100 itself, any component of the system 100, any program of the system 100, any device of the system 100, anything in the system 100, or a combination thereof. In certain embodiments, the checking out may be performed and/or facilitated by utilizing the first user device 102, the second user device 106, the third user device 110, the fourth user device 116, the fifth user device 120, the computing device 126, the physical access control system 132, the logical access control system 134, the server 140, the server 145, the server 150, the server 160, the communications networks 114, 124, 135, any combination thereof, or by utilizing any other appropriate program, network, system, or device. If at step 302, 304, or 306, the proof of physical presence and/or proof of digital presence are not authenticated by the system 100, the method 300 may include generating and transmitting an alert indicating the failure of the authentication. At step 310, the method 300 may include interacting with the token management system, which may have generated, obtained, and/or selected a unique token for the user that was previously checked in, such as in method 200. During step 310, the token management system of the system 100 may access and/or analyze the token utilized by the user. In certain embodiments, the interacting, accessing, and/or analyzing of the unique token may be performed and/or facilitated by utilizing the first user device 102, the second user device 106, the third user device 110, the fourth user device 116, the fifth user device 120, the computing device 126, the physical access control system 132, the logical access control system 134, the server 140, the server 145, the server 150, the server 160, the communications networks 114, 124, 135, any combination thereof, or by utilizing any other appropriate program, network, system, or device. At step 312, the method 300 may include having the token management system deactivate the token based on the user being checked out. Upon deactivation, the token may no longer be utilized by the user to access systems, devices, programs, and/or locations of the system 100.

In certain embodiments, after step 308, the method 300 may proceed to step 314, which may include accessing and/or interacting with the physical access control system 132. While accessing and/or interacting with the physical access control system 132, the method 300 may include having the physical access control system 132 analyze and/or determine a proximity card number and/or other credentials that may have been utilized with a proximity card 129 utilized by a user, such as in response to the checking out conducted in step 308. In certain embodiments, the accessing and/or interacting may be performed and/or facilitated by utilizing the first user device 102, the second user device 106, the third user device 110, the fourth user device 116, the fifth user device 120, the computing device 126, the physical access control system 132, the logical access control system 134, the server 140, the server 145, the server 150, the server 160, the communications networks 114, 124, 135, any combination thereof, or by utilizing any other appropriate program, network, system, or device. At step 316, the method 300 may include having the physical access control system 132 deactivate the proximity card number utilized with the proximity card 129 so as to prevent the user from accessing systems, devices, programs, and/or locations of the system 100. In certain embodiments, the deactivating may be performed and/or facilitated by utilizing the first user device 102, the second user device 106, the third user device 110, the fourth user device 116, the fifth user device 120, the computing device 126, the physical access control system 132, the logical access control system 134, the server 140, the server 145, the server 150, the server 160, the communications networks 114, 124, 135, any combination thereof, or by utilizing any other appropriate program, network, system, or device.

In certain embodiments, after step 308, the method 300 may proceed to step 318, which may include accessing and/or interacting with a logical access control system 134. At step 318, the method 300 may include analyzing username, password, account, and/or other credentials for an account associated with the user. In certain embodiments, the accessing and/or interacting and/or analyzing of the username, password and/or other credentials may be performed and/or facilitated by utilizing the first user device 102, the second user device 106, the third user device 110, the fourth user device 116, the fifth user device 120, the computing device 126, the physical access control system 132, the logical access control system 134, the server 140, the server 145, the server 150, the server 160, the communications networks 114, 124, 135, any combination thereof, or by utilizing any other appropriate program, network, system, or device. At step 320, the method 300 may include disabling the username, password, account, and/or other credentials and preventing a user from accessing the location 125, the ingress point 130, the egress point 131, barriers and/or locks of the location 125, computing systems associated with the location 125, computing systems and/or programs of the system 100, or a combination thereof, using the enabled credential(s). In certain embodiments, the user may be prevented from accessing various specific physical locations within the location 125, accessing and/or using single-sign on processes of the system 100, or any combination thereof. In certain embodiments, the disabling and/or preventing may be performed and/or facilitated by utilizing the first user device 102, the second user device 106, the third user device 110, the fourth user device 116, the fifth user device 120, the computing device 126, the physical access control system 132, the logical access control system 134, the server 140, the server 145, the server 150, the server 160, the communications networks 114, 124, 135, any combination thereof, or by utilizing any other appropriate program, network, system, or device. Notably, the method 300 may further incorporate any of the features and functionality described for the system 100, any other method disclosed herein, or as otherwise described herein.

Figure 4:
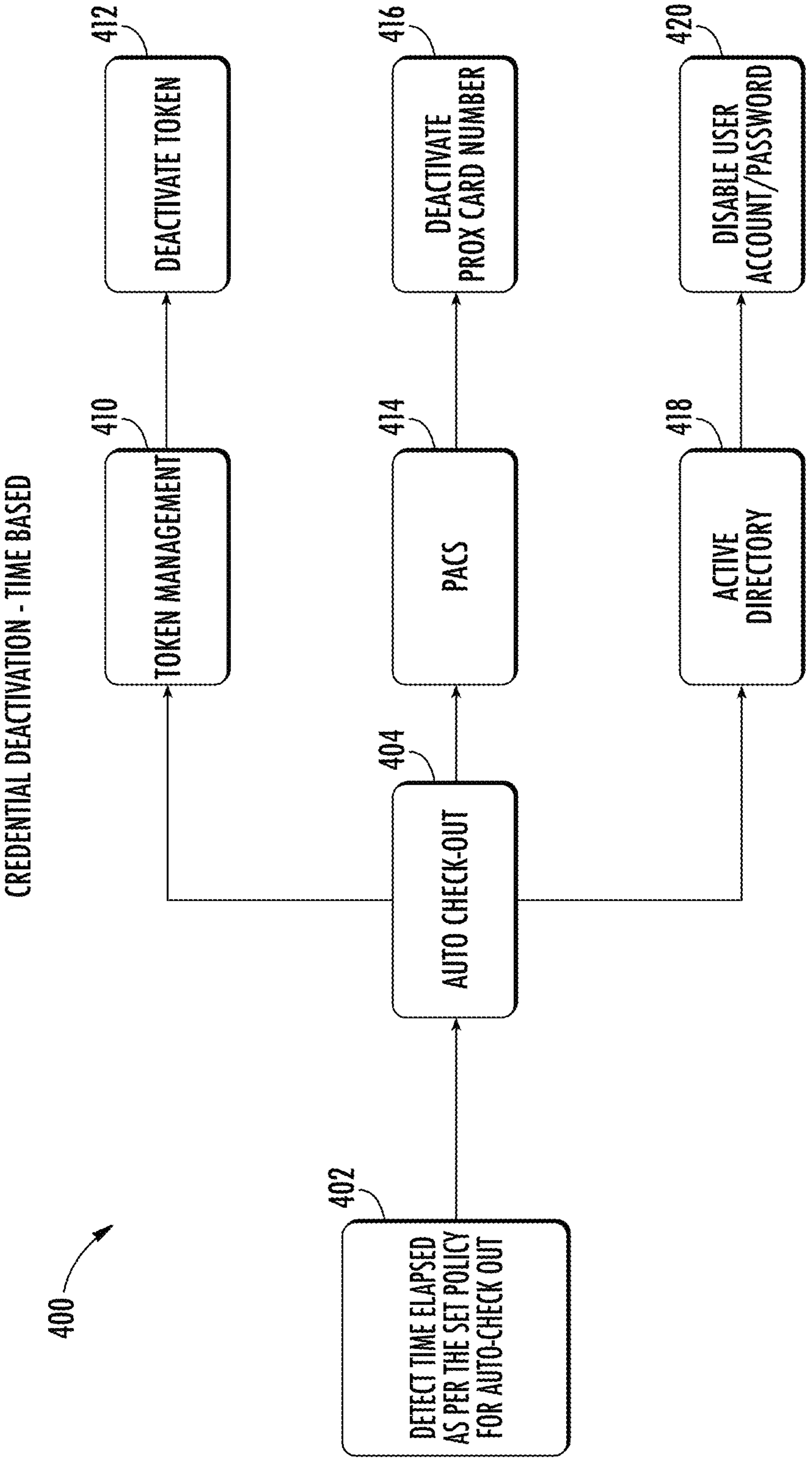
FIG. 4 is a flow diagram illustrating a sample method for providing time-based credential deactivation according to an embodiment of the present disclosure.

As shown in FIG. 4, an exemplary method 400 for providing credential deactivation based on time is schematically illustrated. In particular, the method 400 may include steps for deactivating a user's credentials so as to prevent access to a location 125, a physical access control system 132, a logical access control system 134, a program, a device, any type of system, or a combination thereof, based on a threshold amount of time having elapsed. To that end, the method 400 may include, at step 402, determining whether a threshold amount of time has passed, such as per a set policy in the system 100 of automatically checking-out a user, such as out of the physical access control system 132, the logical access control system 134, the system 100 itself, any component of the system 100, any program of the system 100, any device of the system 100, anything in the system 100, or a combination thereof. In certain embodiments, the threshold amount of time may be an amount of time that the user is allowed to use one or more credentials, an amount of time since the user last used one or more credentials, an amount of time that has passed since the user was authenticated into the system 100 and/or into any component, program, device, and/or process of the system 100, an amount of time In certain embodiments, the determining may be performed and/or facilitated by utilizing the first user device 102, the second user device 106, the third user device 110, the fourth user device 116, the fifth user device 120, the computing device 126, the physical access control system 132, the logical access control system 134, the server 140, the server 145, the server 150, the server 160, the communications networks 114, 124, 135, any combination thereof, or by utilizing any other appropriate program, network, system, or device.

At step 404, the method 400 may include automatically checking-out the user if the threshold amount of time has passed. For example, if the threshold amount of time is ten minutes for being able to use a credential, and the system 100 determines that the ten minutes has passed, the system 100 may automatically checkout the user from the physical access control system 132, the logical access control system 134, the system 100 itself, any component of the system 100, any program of the system 100, any device of the system 100, anything in the system 100, or a combination thereof. In certain embodiments, the checking-out may be performed and/or facilitated by utilizing the first user device 102, the second user device 106, the third user device 110, the fourth user device 116, the fifth user device 120, the computing device 126, the physical access control system 132, the logical access control system 134, the server 140, the server 145, the server 150, the server 160, the communications networks 114, 124, 135, any combination thereof, or by utilizing any other appropriate program, network, system, or device. Once step 404 has been completed, the method 400 may proceed to any one or more of steps 410, 414, and 418, such as simultaneously, sequentially, or in any desired order. At step 410, the method 400 may include interacting with the token management system. During step 410, the token management system of the system 100 may access and/or analyze a token utilized by the user. In certain embodiments, the interacting, accessing, and/or analyzing of the unique token may be performed and/or facilitated by utilizing the first user device 102, the second user device 106, the third user device 110, the fourth user device 116, the fifth user device 120, the computing device 126, the physical access control system 132, the logical access control system 134, the server 140, the server 145, the server 150, the server 160, the communications networks 114, 124, 135, any combination thereof, or by utilizing any other appropriate program, network, system, or device. At step 412, the method 400 may include having the token management system deactivate the token based on the user being checked out. Upon deactivation, the token may no longer be utilized by the user to access systems, devices, programs, and/or locations of the system 100.

At step 414, which may include accessing and/or interacting with the physical access control system 132. While accessing and/or interacting with the physical access control system 132, the method 300 may include having the physical access control system 132 analyze and/or determine a proximity card number and/or other credentials that may have been utilized with a proximity card 129 utilized by a user, such as in response to the automatic checking out conducted in step 404. In certain embodiments, the accessing and/or interacting may be performed and/or facilitated by utilizing the first user device 102, the second user device 106, the third user device 110, the fourth user device 116, the fifth user device 120, the computing device 126, the physical access control system 132, the logical access control system 134, the server 140, the server 145, the server 150, the server 160, the communications networks 114, 124, 135, any combination thereof, or by utilizing any other appropriate program, network, system, or device. At step 416, the method 400 may include having the physical access control system 132 deactivate the proximity card number utilized with the proximity card 129 so as to prevent the user from accessing systems, devices, programs, and/or locations of the system 100. In certain embodiments, the deactivating may be performed and/or facilitated by utilizing the first user device 102, the second user device 106, the third user device 110, the fourth user device 116, the fifth user device 120, the computing device 126, the physical access control system 132, the logical access control system 134, the server 140, the server 145, the server 150, the server 160, the communications networks 114, 124, 135, any combination thereof, or by utilizing any other appropriate program, network, system, or device.

At step 418, the method 400 may include accessing and/or interacting with a logical access control system 134. At step 418, the method 400 may include analyzing username, password, account, and/or other credentials for an account associated with the user. In certain embodiments, the accessing and/or interacting and/or analyzing of the username, password and/or other credentials may be performed and/or facilitated by utilizing the first user device 102, the second user device 106, the third user device 110, the fourth user device 116, the fifth user device 120, the computing device 126, the physical access control system 132, the logical access control system 134, the server 140, the server 145, the server 150, the server 160, the communications networks 114, 124, 135, any combination thereof, or by utilizing any other appropriate program, network, system, or device. At step 420, the method 420 may include disabling the username, password, account, and/or other credentials and preventing a user to access the location 125, the ingress point 130, the egress point 131, barriers and/or locks of the location 125, computing systems associated with the location 125, computing systems and/or programs of the system 100, or a combination thereof, using the enabled credential (s). In certain embodiments, the user may be prevented from accessing various physical locations within the location 125, accessing and/or using single-sign on processes of the system 100, or any combination thereof. In certain embodiments, the disabling and/or preventing may be performed and/or facilitated by utilizing the first user device 102, the second user device 106, the third user device 110, the fourth user device 116, the fifth user device 120, the computing device 126, the physical access control system 132, the logical access control system 134, the server 140, the server 145, the server 150, the server 160, the communications networks 114, 124, 135, any combination thereof, or by utilizing any other appropriate program, network, system, or device. Notably, the method 400 may further incorporate any of the features and functionality described for the system 100, any other method disclosed herein, or as otherwise described herein.

Figure 5:
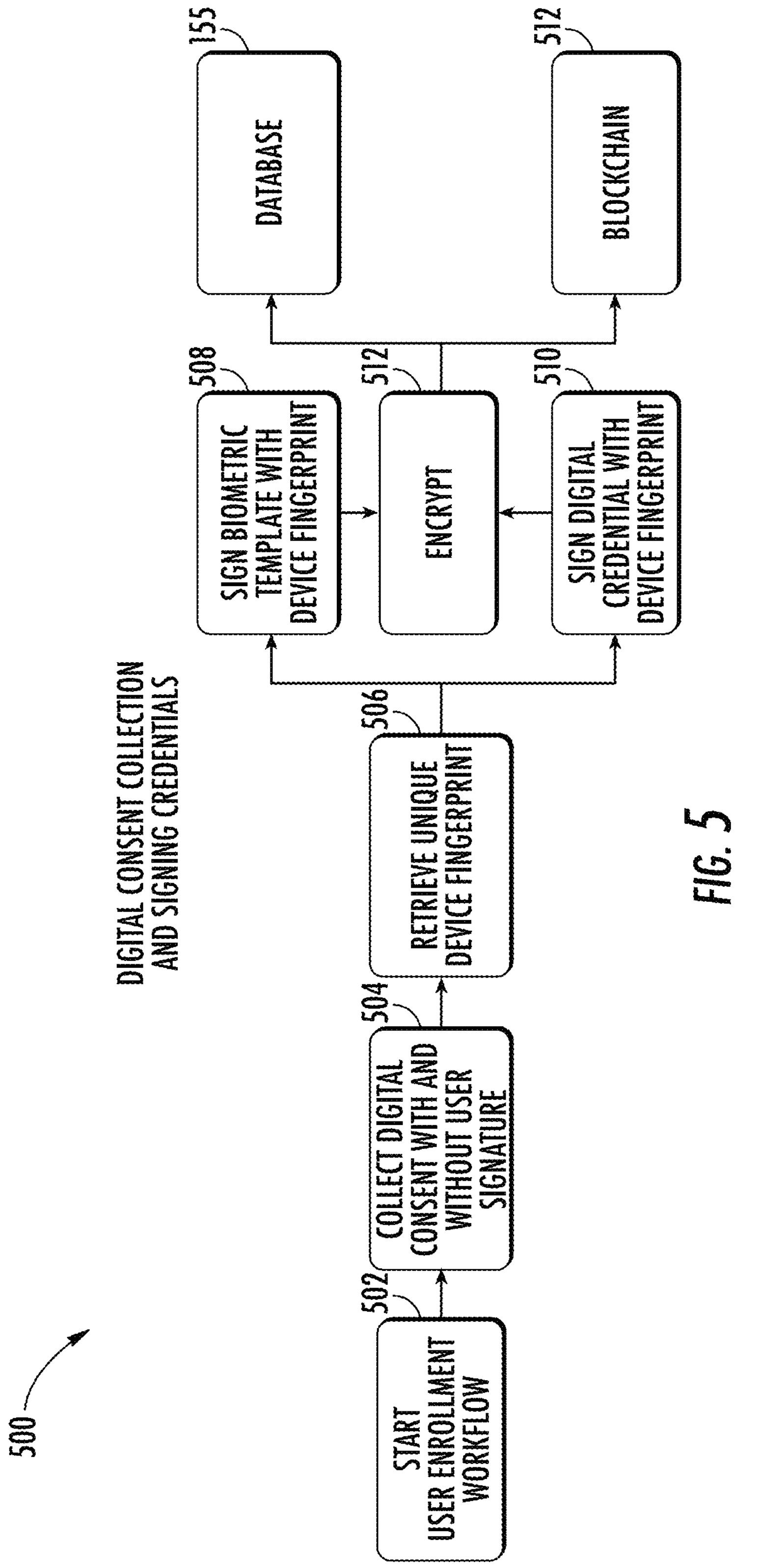
FIG. 5 is a flow diagram illustrating a sample method for providing digital consent collection according to an embodiment of the present disclosure.
Figure 6:
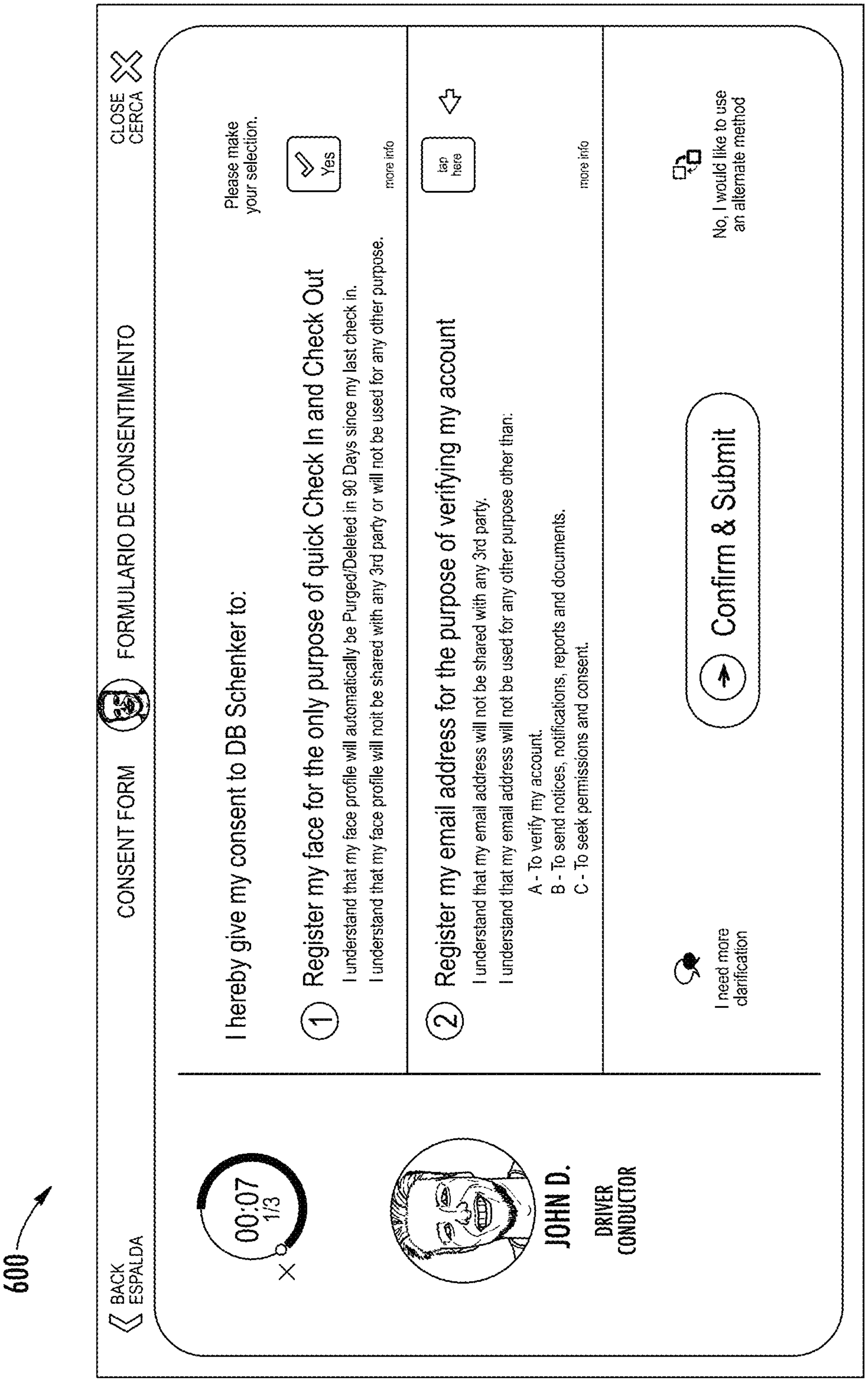
FIG. 6 is a schematic diagram illustrating a sample user interface of an application for inputting a digital consent according to an embodiment of the present disclosure.

As shown in FIG. 5, an exemplary method 500 for collecting digital consents and credential signatures is schematically illustrated. In particular, the method 500 allows for the collection of digital consents from users at the time of enrollment and further protects by hashing, encrypting, and digitally signing the user's biometric templates and digital credentials and/or identities with the device identifiers (e.g. device fingerprints) of one or more devices of the users, which may limit the use of submitted credentials as per the users' consent to only one, multiple, or all devices and/or networks of the system 100 and/or location 125. To that end, the method 500 may include, at step 502, starting and/or initiating a user enrollment workflow, such as in a program executing on the computing device 126 and/or other suitable device of the system 100, such as first user device 102. In certain embodiments, the user enrollment workflow may be utilized to obtain consents from a user, and may be displayed via a user interface of computing 126, and may be configured to interact with and/or receive inputs from a user, such as first user 101. For example, as shown in FIG. 6, a digital consent form 600 that a user may interact with is shown. The digital consent form 600 may display the user's identity, an amount of time that the user is interacting with the digital consent from 600, an option to consent to register the user's face with the system 100 for purposes of checking-in and checking-out the user, an option to consent to register an email address and other information associated with the user, an option for enabling other types of methods for checking-in and/or checking-out the user, an option for obtaining more clarification and/or information regarding providing a digital consent and/or the ramifications of providing a digital consent, any other options, or a combination thereof. In certain embodiments, the initiating of the user enrollment workflow may be performed and/or facilitated by utilizing any device, system, program, network, process, or any combination thereof, such as, but not limited to, those in system 100.

At step 504, the method 500 may include collecting a digital consent with and/or without a signature of the user. The digital consent obtained from the user may authorize the system 100 to use the user's biometric and/or digital credentials, such as for a certain period of time. Additionally, the digital consent may specify which devices, systems, and/or networks that a user authorizes credentials to be utilized on for the purposes of accessing the system 100. Furthermore, in certain embodiments, the digital consent may also be utilized to specify which devices, systems, and/or networks that the user may access and the level of access for such devices, systems, and/or networks, and/or to specify which devices, systems, and/or networks that the system 100 may access (and level of access) that are associated with the user as well. In certain embodiments, the digital consent may be digitally written (such as via a finger and/or stylus on a touchscreen of first user device 102 and/or computing device 126) and input into the interface displaying the consent form 600, for example. In certain embodiments, the digital consent may be input by the user, such as by checking a radio button or digital check box displayed via the program. In certain embodiments, the collecting of the digital consent may be performed and/or facilitated by utilizing any device, system, program, network, process, or any combination thereof, such as, but not limited to, those in system 100. At step 506, the method 500 may include obtaining and/or retrieving a device fingerprint(s) of a device of the user, such as first user device 102, via a wired and/or wireless communications link with the device. In certain embodiments, a device fingerprint may be information that uniquely identifies the first user device 102. For example, a device fingerprint may include a device's TCP/IP configuration, an OS fingerprint, wireless settings, hardware clock skews, model numbers of the device, serial numbers of the devices, a device's configuration, IP address, HTTP request headers, user agent strings, installed plugins, time zone information, screen resolution, operation system information, language information, font information, timestamp information, browser version information, computer processor architecture, memory information, any other device information, information relating to programs on the device, information identifying graphics chips of the device, information identifying components and/or capabilities of the device, or a combination thereof. In certain embodiments, the obtaining of the device fingerprint may be performed and/or facilitated by utilizing any device, system, program, network, process, or any combination thereof, such as, but not limited to, those in system 100.

At step 508, the method 500 may optionally include signing a biometric template of the user with the device fingerprint of the device of the user. The biometric template may be a file that may be include information associated with one or more biometric samples of the user (including measurements of the samples themselves), representations of biometric information, any information that uniquely identifies the user from others users, any physical information of the user (e.g. weight, height, etc.), any other information, or a combination thereof. In certain embodiments, signing the biometric template may comprise associating the device fingerprint of the device of the user with the biometric template of the user, such as by storing the device fingerprint in the biometric template, digitally linking the biometric template with the device fingerprint, digitally signing the biometric template with the device fingerprint (e.g. such as by using public and/or private keys and/or any type of encryption technology including hashing, etc.), or a combination thereof. In certain embodiments, the signing may be performed and/or facilitated by utilizing any device, system, program, network, process, or any combination thereof, such as, but not limited to, those in system 100. At step 510, the method 500 may optionally include signing a digital credential with a device fingerprint. For example, a username and password combination and/or any other digital credential may be signed with the device fingerprint. In certain embodiments, the signing may be performed and/or facilitated by utilizing any device, system, program, network, process, or any combination thereof, such as, but not limited to, those in system 100.

At step 512, the method may include encrypting the signed biometric template and/or the signed digital credential. In certain embodiments, the encrypting may be performed and/or facilitated by utilizing any device, system, program, network, process, or any combination thereof, such as, but not limited to, those in system 100. As an example of signing and encrypting according to the method 500, a hash algorithm may be applied to the device fingerprint and/or to data in the biometric template resulting in a hash value, and, using a private key, may encrypt and sign the biometric template. In order to decrypt the signed document, a public key may be utilized on the digitally signed biometric template and the resulting hash value may be compared to the hash value from the hash algorithm to confirm that the signature is valid. In certain embodiments, at step 512, the method 50 may include storing the encrypted and signed digital credential and/or biometric template in a blockchain, which include a list of records include all information in the system 100. In certain embodiments, each block of the blockchain may contain a cryptographic hash of a previous block in the blockchain, a timestamp, and data, including, but not limited to the encrypted and signed digital credential and/or biometric template, any authentication information, any failed authentication attempts, any information generated and/or input into the system 100, or a combination thereof. In certain embodiments, at step 512, the method 500 may also include storing the encrypted and signed digital credential and/or biometric template in database 155. In certain embodiments, the storing may be performed and/or facilitated by utilizing any device, system, program, network, process, or any combination thereof, such as, but not limited to, those in system 100. Notably, the method 500 may further incorporate any of the features and functionality described for the system 100, any other method disclosed herein, or as otherwise described herein.

Figure 7:
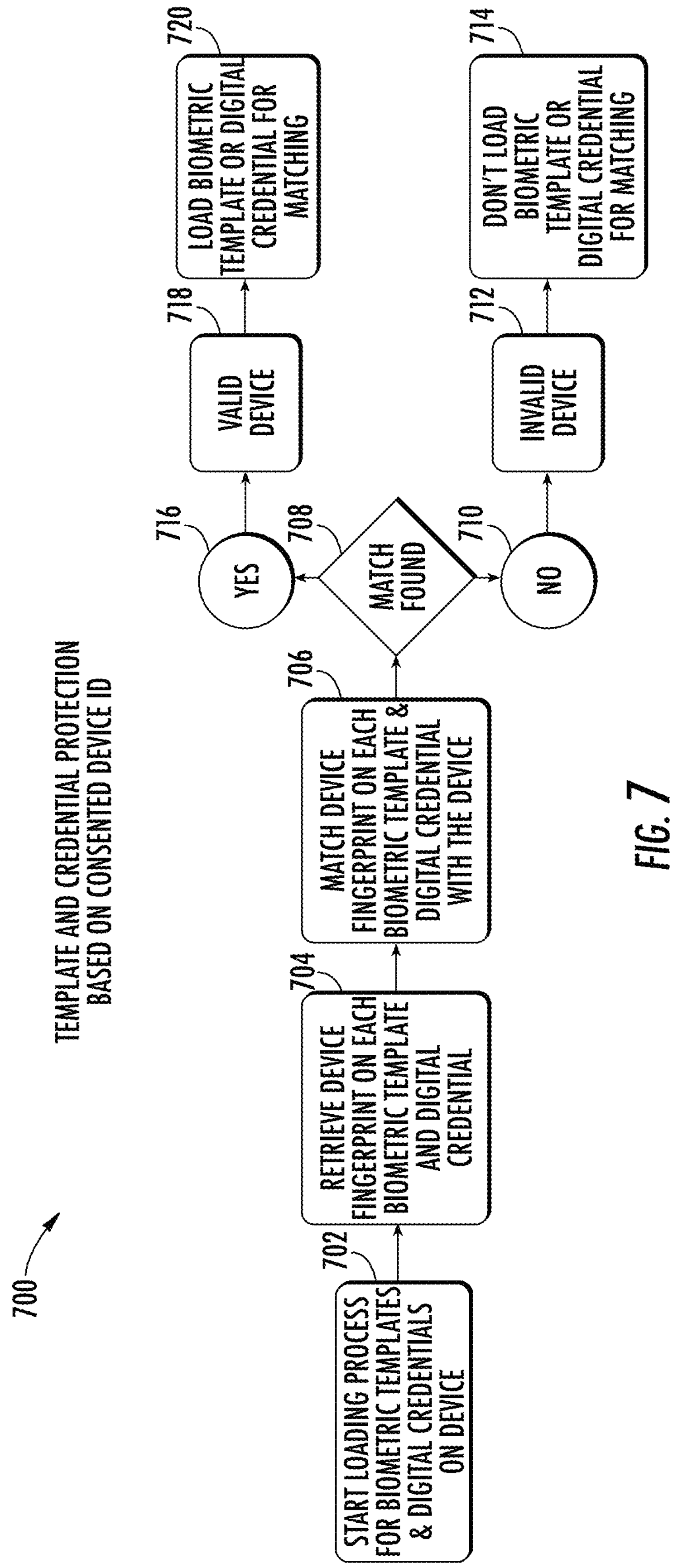
FIG. 7 is a flow diagram illustrating a sample method for providing template and credential protection based on consented device identifiers according to an embodiment of the present disclosure.

As shown in FIG. 7, an exemplary method 700 for providing template and credential protection based on consented device identifiers is schematically illustrated. In particular, the method 700 may include, at step 702, starting and/or initiating a loading process for biometric templates and/or digital credentials on a device, such as first user device 102 of first user 101. For example, the first user 101 may desire to authenticate into the system 100 and may want to access the location 125 and/or systems of the location 125, and may do so by interacting with computing device 126, such as by utilizing first user device 101 and/or manually. The process of the loading of the biometric templates and/or digital credentials may be initiated from the blockchain and/or database 155, for example. In certain embodiments, the starting and/or initiating of the loading process may be performed and/or facilitated by utilizing any device, system, program, network, process, or any combination thereof, such as, but not limited to, those in system 100. Once the loading process for loading biometric templates and/or digital credentials has been started, the method 700 may include, at step 704, retrieving a device fingerprint on each biometric template and/or digital credential (e.g. the device fingerprints used to sign each biometric template and/or digital credential from method 500). In certain embodiments, the retrieving may be performed and/or facilitated by utilizing any device, system, program, network, process, or any combination thereof, such as, but not limited to, those in system 100. Once the device fingerprints on each biometric template and/or digital credential are retrieved, the method 700 may include, at step 706, matching the device fingerprint on each biometric template and/or digital credential with the device fingerprint obtained from the device of the user that is attempting to access the system 100, such as first user device 102. For example, the computing device 126 and/or other components of the system 100 may obtain the device fingerprint from the device of the user by establishing a communication link with the device of the user. In certain embodiments, the matching may be performed and/or facilitated by utilizing any device, system, program, network, process, or any combination thereof, such as, but not limited to, those in system 100.

At step 708, the method 700 may include determining if a match is found. In certain embodiments, the matching may be performed and/or facilitated by utilizing any device, system, program, network, process, or any combination thereof, such as, but not limited to, those in system 100. If a match is not found, at step 710, the method may proceed to step 712, and may determine that the device of the user is invalid. In certain embodiments, the determining may be performed and/or facilitated by utilizing any device, system, program, network, process, or any combination thereof, such as, but not limited to, those in system 100. Once the device is determined to be invalid, the method 700 may proceed to step 714, which may include not loading the biometric template and/or digital credential so as to protect the biometric template and/or digital credential. If, however, a match is found, at step 716, the method 700 may include proceeding to step 718, which may include determining that the device is a valid device that may be authenticated into the system 100. Once the device is determined to be valid at step 718, the method 700 may proceed to step 720, which may include loading the biometric template and/or digital credential that match to the device fingerprint of the device of the user so that the user may access the system 100 using the device. In certain embodiments, the biometric template and/or digital credential may be loaded only if the device fingerprint is of a device that the user has also consented credentials to be used on. In certain embodiments, the biometric template and/or digital credential may be loaded onto the user's device itself, onto the computing device 126, onto any appropriate device, or a combination thereof. In certain embodiments, the loading may be performed and/or facilitated by utilizing any device, system, program, network, process, or any combination thereof, such as, but not limited to, those in system 100. Notably, the method 700 may further incorporate any of the features and functionality described for the system 100, any other method disclosed herein, or as otherwise described herein.

Figure 8:
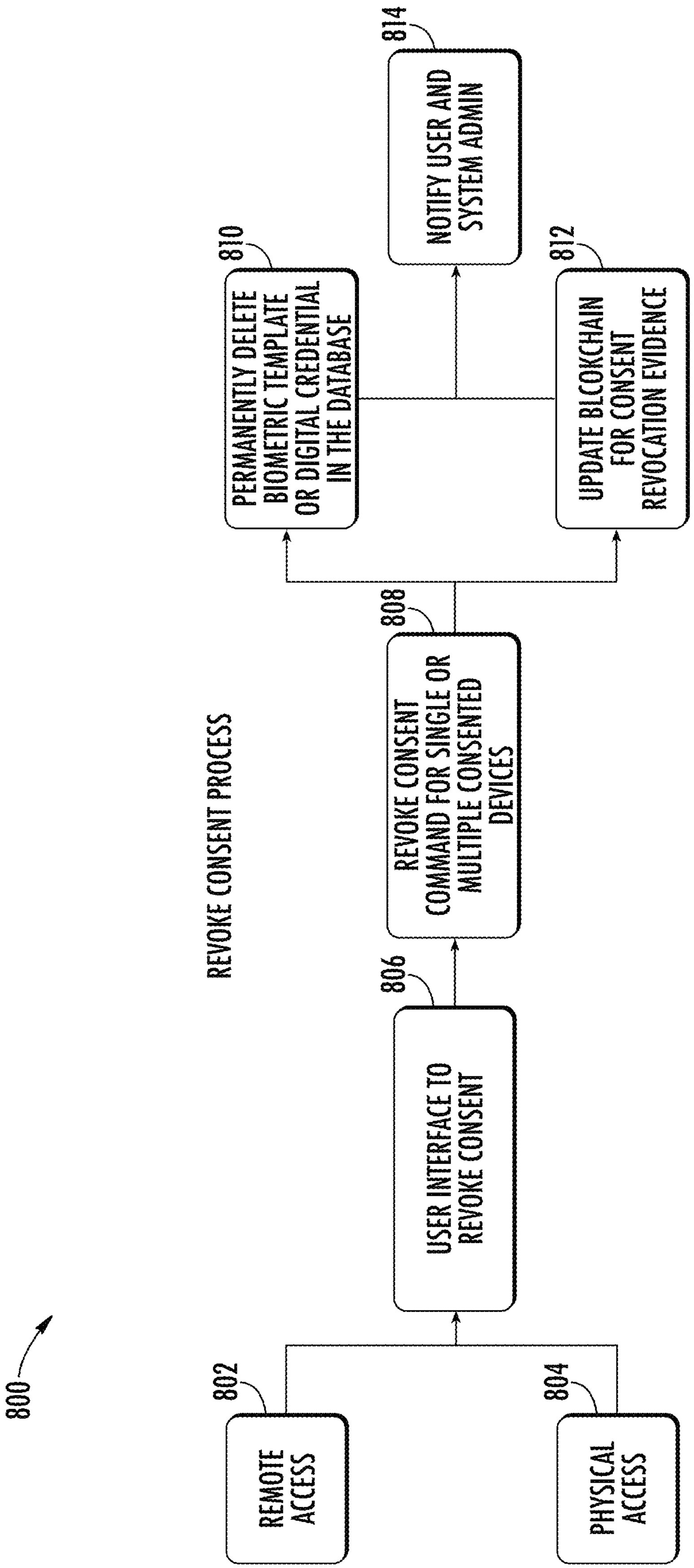
FIG. 8 is a flow diagram illustrating a sample method for revoking consent according to an embodiment of the present disclosure.

As shown in FIG. 8, an exemplary method 800 for revoking consent is schematically illustrated. At step 802, a user may remotely access the system 100, such as by using first user device 102. Alternatively to step 802 or simultaneously with step 802, the user, at step 804, may physically access the system 100 (e.g. computing device 126 or another device physically accessible at the location 125). At step 806, the method 800 may include providing a user interface with an option to enable the user to revoke one or more digital consents that the user may have previously authorized in the system 100. For example, the user interface with the option may be displayed on the first user device 102 if the user is using remote access, and/or the user interface with the option may be displayed on the computing device 126 if physical access. At step 808, the method 800 may include executing a revoke consent command for single or multiple consented devices (and systems and/or networks as applicable to the situation) if the user selects the option to revoke consent. Once the revoke consent command is executed the method 800 may proceed to step 810, which may include permanently deleting the user's biometric template and/or digital credential from the database 155. Optionally or in addition to step 810, the method 800 may also proceed to step 812, which may include updating a blockchain of the system 100 to indicate that consent was revoked by the user. The update to the blockchain may include evidence and/or information indicative of the revocation including, but not limited to, a timestamp of the revocation, information indicating that the user did indeed revoke consent, any other relevant information, or a combination thereof. At step 814, the method 800 may include notifying the user that the revocation of the consent has been successfully executed and/or notifying a system administrator of the system 100 as well. For example, a text, email, phone call, instant message, and/or other type of notification may be utilized. In certain embodiments, the functionality provided in the method 800 may be performed and/or facilitated by utilizing any device, system, program, network, process, or any combination thereof, such as, but not limited to, those in system 100. Notably, the method 800 may further incorporate any of the features and functionality described for the system 100, any other method disclosed herein, or as otherwise described herein.

Figure 9:
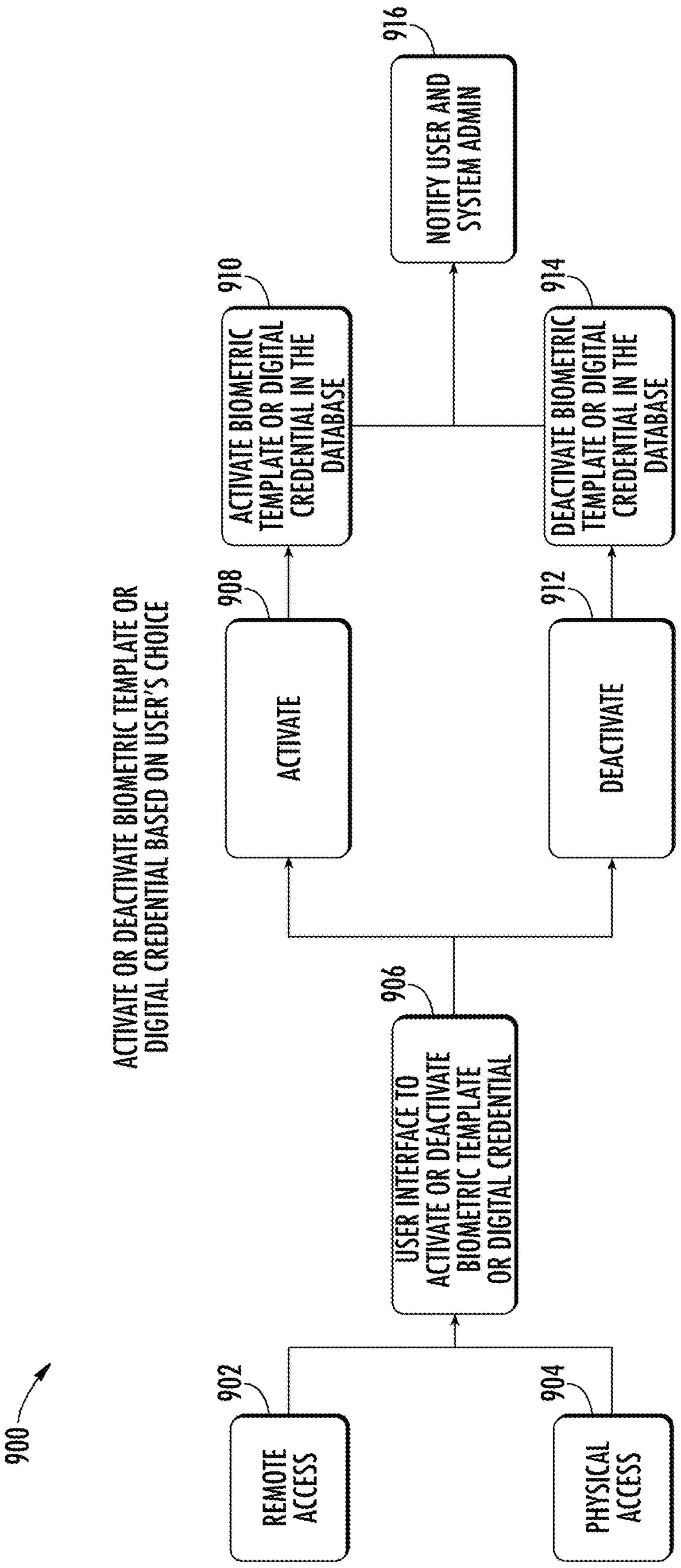
FIG. 9 is a flow diagram illustrating a sample method for activating or deactivating a biometric template or digital credential according to an embodiment of the present disclosure.

As shown in FIG. 9, an exemplary method 900 for activating or deactivating a biometric template or digital credential is schematically illustrated. At step 902, a user may remotely access the system 100, such as by using first user device 102. Alternatively to step 902 or simultaneously with step 902, the user, at step 904, may physically access the system 100 (e.g. computing device 126 or another device physically accessible at the location 125). At step 906, the method may include providing a user interface with an option to activate or deactivate a biometric template and/or digital credential. For example, the user interface with the option may be displayed on the first user device 102 if the user is using remote access, and/or the user interface with the option may be displayed on the computing device 126 if physical access. At step 908, the method 900 may include execute a command to cause activation of the biometric template and/or digital credential if the user selects the activation option displayed on the user interface. At step 910, the method 900 may include activating the biometric template and/or digital credential (e.g. in the database 155 and/or blockchain) based on execution of the activation command. At step 916, the method 900 may include transmitting a notification to the user and/or a system administrator indicating the activation of the biometric template and/or credential. If, on the other hand, at step 906, the use options to deactivate a biometric template and/or credential, the method 900 may proceed to step 912 and may execute a deactivate command. At step 914, the method 900 may include deactivating the biometric template and/or digital credential (e.g. in the database 155 and/or blockchain) based on execution of the deactivation command. Once the biometric template and/or digital credential is deactivated, the system 100 may transmit a notification to the user and/or system administrator indicating the biometric template and/or digital credential has been deactivated and/or may not be utilized to access parts of the system 100. In certain embodiments, the functionality provided in the method 900 may be performed and/or facilitated by utilizing any device, system, program, network, process, or any combination thereof, such as, but not limited to, those in system 100. Notably, the method 900 may further incorporate any of the features and functionality described for the system 100, any other method disclosed herein, or as otherwise described herein.

Figure 10:
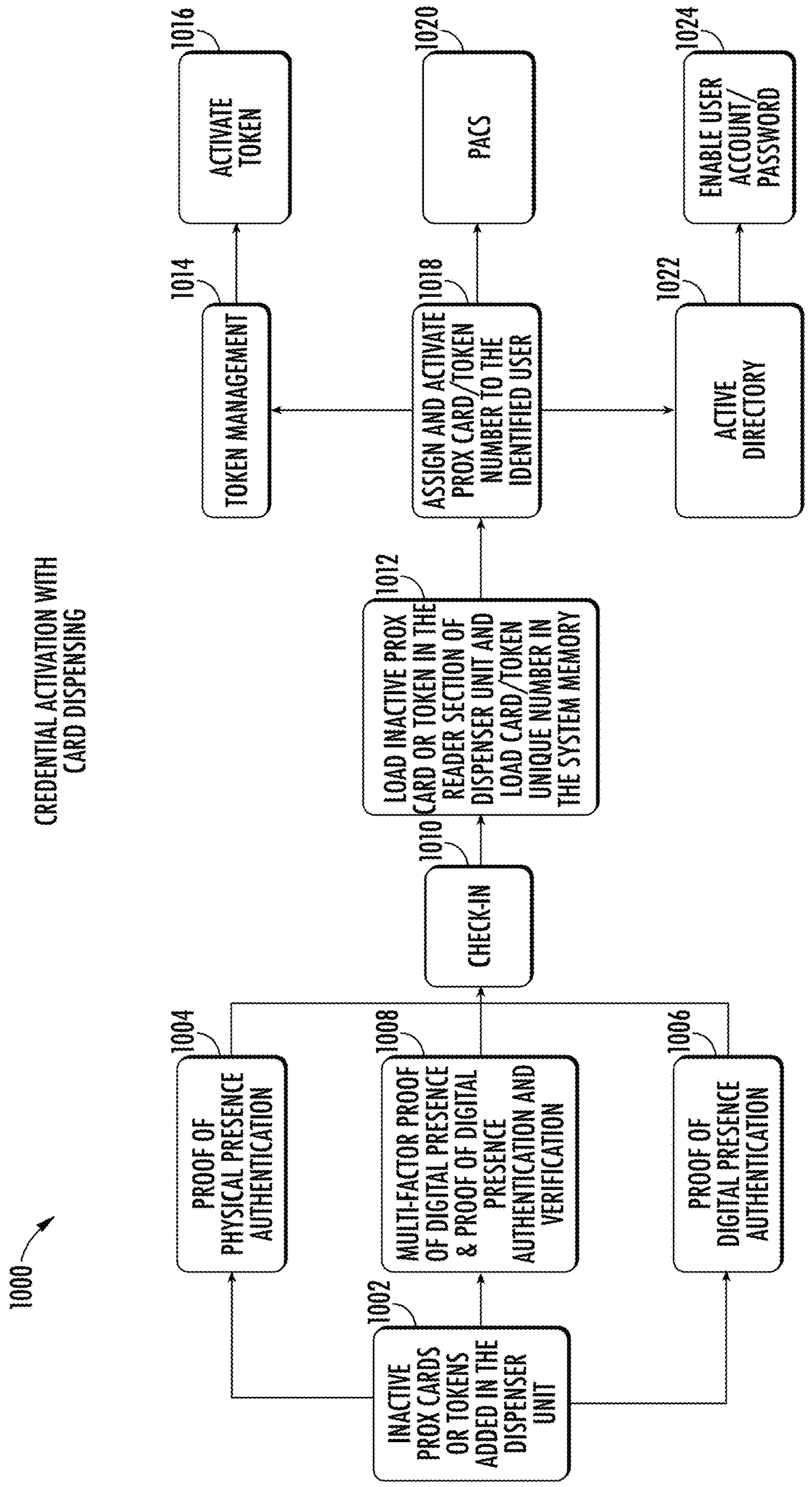
FIG. 10 is a flow diagram illustrating a sample method for providing credential activation with card dispensation according to an embodiment of the present disclosure.

As shown in FIG. 10, an exemplary method 1000 for providing credential activation with card dispensation is schematically shown. At step 1002, the method 1000 may include adding inactive proximity cards 129 and/or tokens into a dispenser unit of the computing device 126. At steps 1004, 1006 and 1008, authentications of proofs of physical presence and/or digital presence of a user attempting to access portions of the system 100 and/or location 125 may be conducted by the system 100 respectively. If the proofs of physical presence and/or digital presence are authenticated at steps 1004, 1006, and/or 1008, the method 1000 may include checking the user into the system 100, at step 1010. Once the user is checked in, the method 1000 may include, at step 1012, loading an inactive proximity card 129 and/or token in a reader component (e.g. RFID/NFC/Other reader) of the dispenser unit of the computing device 126, and may include loading a unique proximity card number and/or unique token number (or other credential) into a memory of the system 100. The proximity card number and/or unique token number may be associated with a user role of the user with respect to use of the system 100. For example, a c-suite user role may have a token number with a higher level of access in the system 100 than a visitor user role, which may have access to a smaller subset of systems and/or devices of the system 100. At step 1018, the method 1000 may include assigning and/or activating the unique proximity card number and/or token number and associating the proximity card number and/or token number to the identified user. In certain embodiments, at step 1018, the method 1000 may include dispensing the proximity card 129 so that the user may utilize it. At step 1014, the token management system may be accessed, and, at step 1016, the token management system may activate a token and may load the unique token number onto the token so that the user may use the token to access authorized devices, networks, and/or programs of the system 100 and/or location 125 (e.g. token may be utilized to unlock doors, gain access to computers, etc.). At step 1016, the token may also be dispensed from the computing device 126 for use by the user. At step 1020, the user may utilize the proximity card 129 loaded with the unique proximity card number and/or token number to access the physical access control system 132 and/or any other portions of the system 100 that may be configured to interact with the proximity card 129 to provide access. At step 1022, the method 1000 may include accessing the logical access control system 134 of the system, and, at step 1024, the method 100 may include enabling a user account and/or digital credential, such as a password, for the user to utilize to access various computing systems of the system 100. In certain embodiments, the functionality provided in the method 1000 may be performed and/or facilitated by utilizing any device, system, program, network, process, or any combination thereof, such as, but not limited to, those in system 100. Notably, the method 1000 may further incorporate any of the features and functionality described for the system 100, any other method disclosed herein, or as otherwise described herein.

Figure 11:
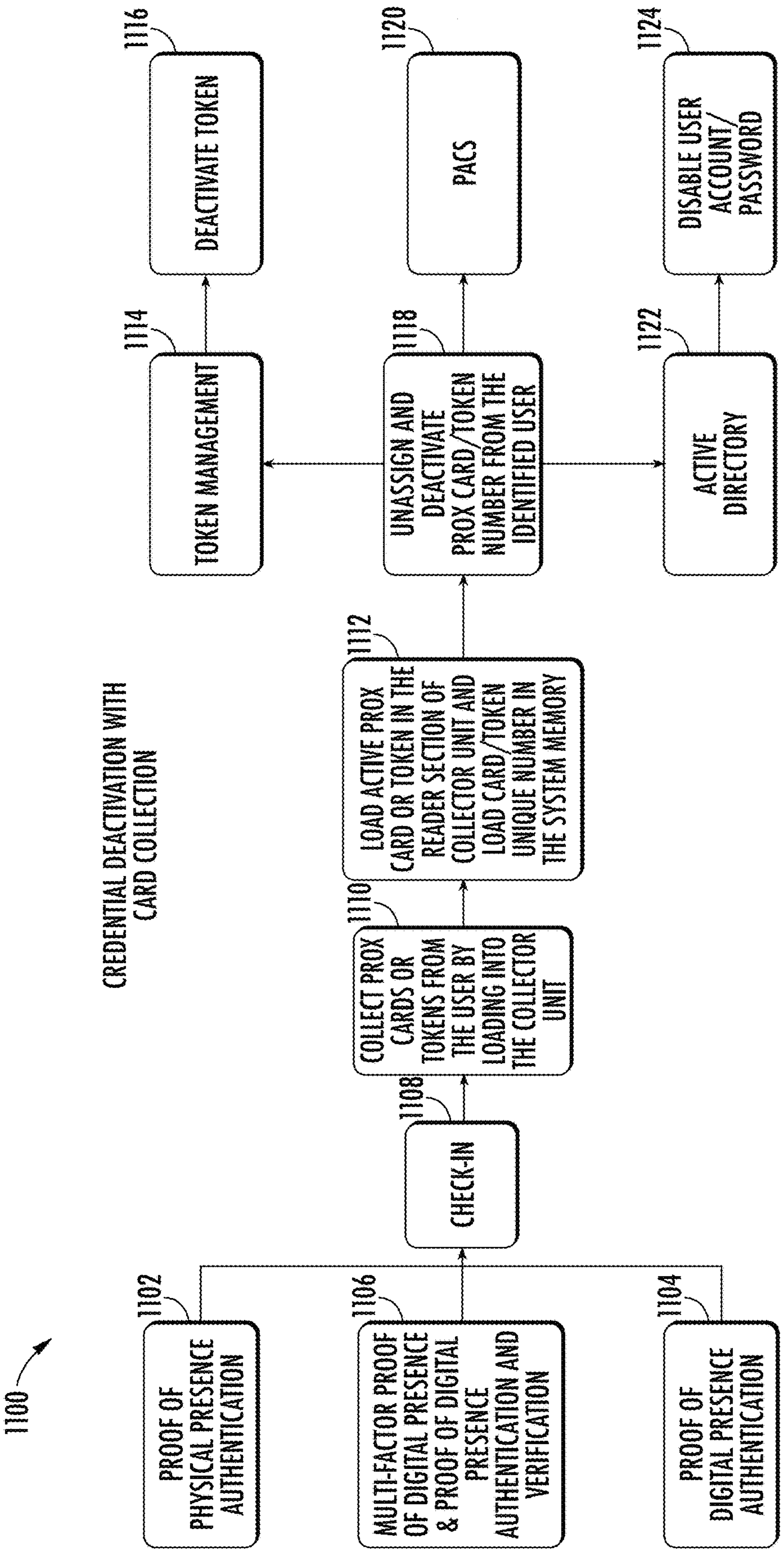
FIG. 11 is a flow diagram illustrating a sample method for providing credential deactivation with card collection according to an embodiment of the present disclosure.

As shown in FIG. 11, an exemplary method 1100 for providing credential deactivation with card collection is schematically shown. At steps 1102, 1104 and 1106, authentications of proofs of physical presence and/or digital presence of a user attempting to check out of the system 100 and/or location 125 may be conducted by the system 100 respectively. If the proofs of physical presence and/or digital presence are authenticated at steps 1102, 1104 and/or 1106, the method 1100 may include checking the user out of the system 100 and/or location 125, at step 1108. Once the user is checked out, the method 1100 may include, at step 1110, collecting a proximity card 129 and/or token from the user by having the user load the proximity card 129 and/or token into a collector unit of the computing device 126, which may be receptacle. At step 1112, the method 1100 may include loading the active proximity card and/or token numbers in the reader component/section of the collector unit of the computing device 126 and loading the proximity card number and/or token number into a memory of the system 100. At step 1118, the method 1100 may include unassigning and/or deactivating the proximity card and/or token numbers from the identified user. In certain embodiments, the deactivated proximity card and/or token numbers may then be utilized for different users. At step 1114, the method 1100 may include accessing the token management system, and at step 1116, the token management system may deactivate the token. At step 1120, the method 1100 may include accessing the physical access control system 132 and deactivating the proximity card and/or proximity card number. At step 1122, the method 1100 may include accessing the logical access control system 134, and at step 1124, the logical access control system 134 may disable the user account of the user and/or any digital credentials (e.g. passwords, etc.) utilized for accessing the logical access control system 134. In certain embodiments, the functionality provided in the method 1100 may be performed and/or facilitated by utilizing any device, system, program, network, process, or any combination thereof, such as, but not limited to, those in system 100. Notably, the method 1100 may further incorporate any of the features and functionality described for the system 100, any other method disclosed herein, or as otherwise described herein.

Figure 12:
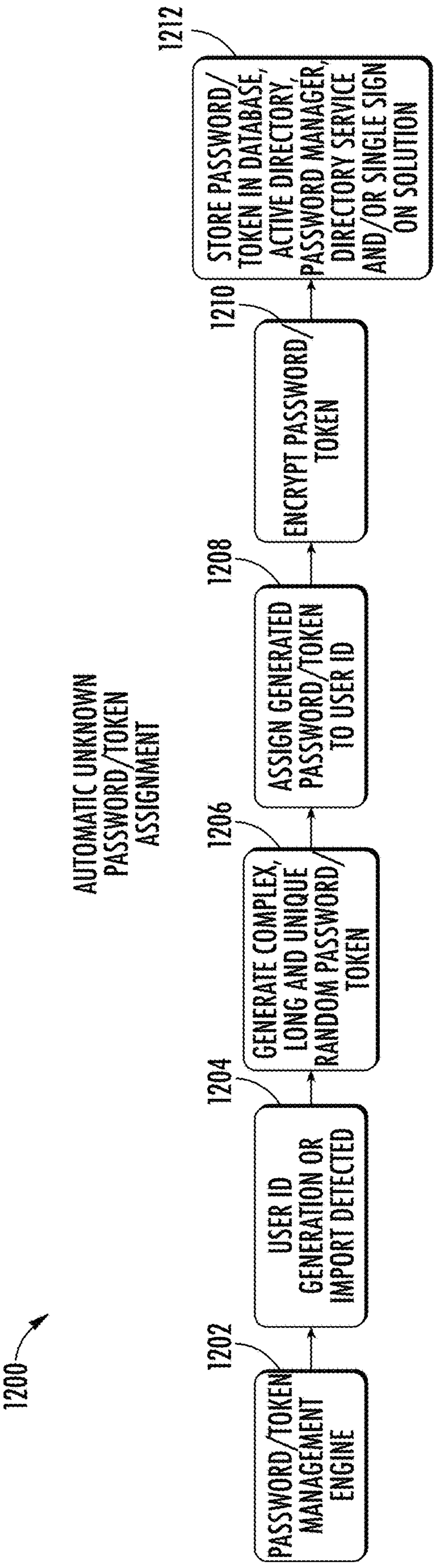
FIG. 12 is a flow diagram illustrating a sample method for providing automatic password and/or token assignment according to an embodiment of the present disclosure.

As shown in FIG. 12, an exemplary method 1200 for providing automatic password and/or token assignment is schematically shown. At step 1202, the method 1200 may include accessing and/or interacting with the token management system/engine of the system 100. At step 1204, the method 1200 may include detecting the generation and/or importation of a user identifier of a user that may potentially access the system 100 and/or location 125. Once the detecting has been conduction, the method 1200 may include, at step 1206, generating a complex, long, and/or unique random password and/or token number. At step 1208, the method 1200 may include assigning the generated password and/or token number to the user identifier of the user so as to associate them with the user. In certain embodiments, the generated password and/or token number may be unknown by anyone other than the system 100 itself. At step 1210, the password and/or token may be encrypted by the system 100 to ensure security and to thwart potential hackers and/or unauthorized use of the credentials. At step 1212, the method 1200 may include storing the password and/or token number in database 155, in an active directory (and logical access control system 134), a digital password manager, a directory service, and/or into a single-sign-on process that enables the user to access computing systems of the system 100 via a single authentication using the password and/or token. In certain embodiments, the functionality provided in the method 1200 may be performed and/or facilitated by utilizing any device, system, program, network, process, or any combination thereof, such as, but not limited to, those in system 100. Notably, the method 1200 may further incorporate any of the features and functionality described for the system 100, any other method disclosed herein, or as otherwise described herein.

Figure 13:
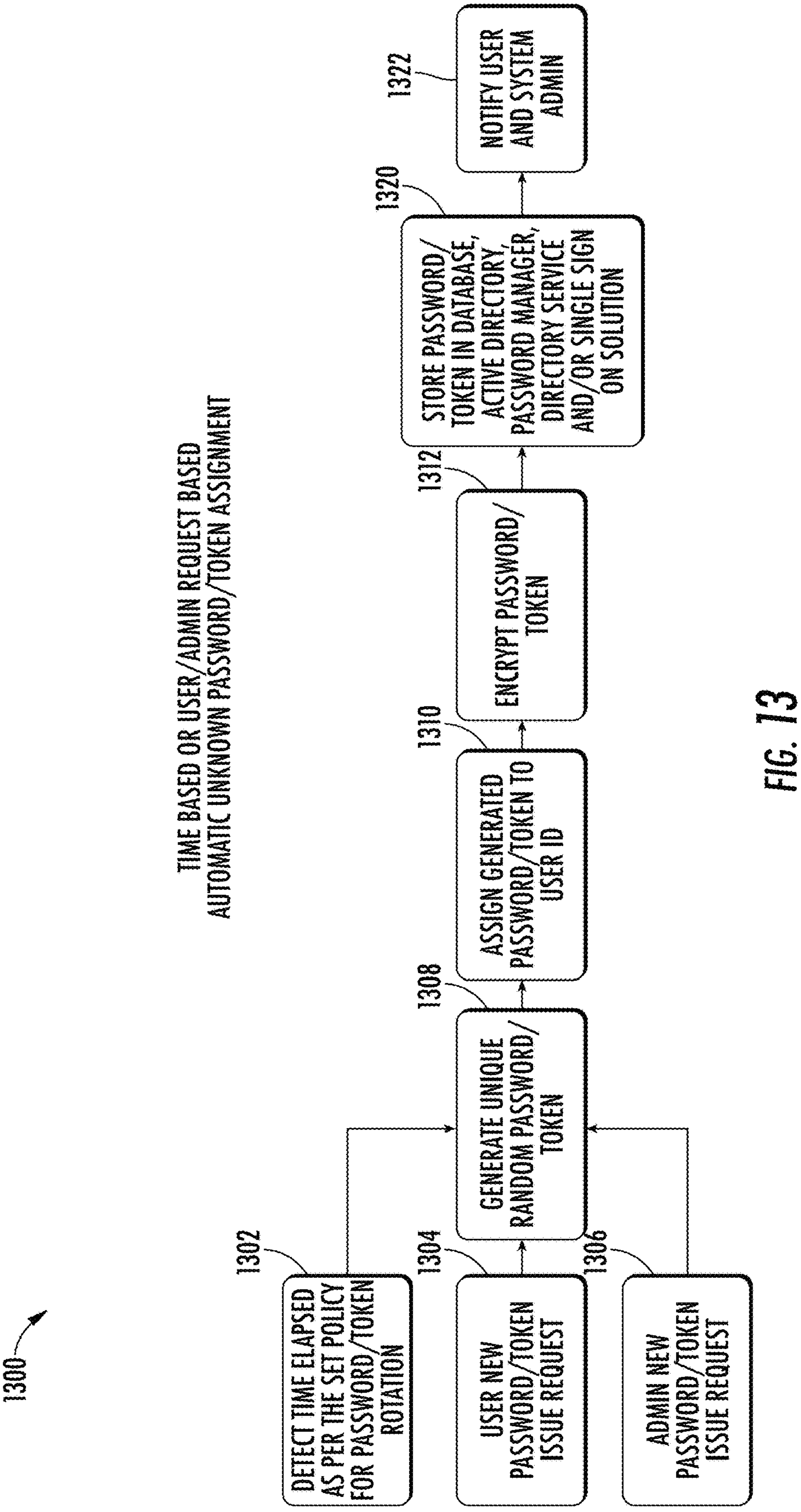
FIG. 13 is a flow diagram illustrating a sample method for providing time-based or user request-based automatic password and/or token assignment according to an embodiment of the present disclosure.

As shown in FIG. 13, an exemplary method 1300 for providing time-based or user request-based automatic password and/or token assignment is schematically shown. At step 1302, the method 1300 may include detecting that a certain amount of time has elapsed per a set policy for password (i.e. digital credential) and/or token number rotation. At step 1304, the method 1300 may include having a user request a new password and/or token. At step 1306, the method 1300 may include having a system administrator of the system 100 issue a request for a new password and/or token for the user. Based on the request(s) and detection of the elapsed time set by the policy, the method 1300 may include, at step 1308, generating a unique random password and/or token number. At step 1310, the method 1300 may including assigning the unique password and/or token number to a user identifier of the user. The user identifier of the user may comprise a number, string, and/or other identifier that unique identifies the user from other users of the system 100. At step 1312, the password and/or token number may be encrypted by the system 100, such as by utilizing any suitable encryption algorithm. At step 1320, the method 1300 may include storing the password and/or token number in database 155, in an active directory (and logical access control system 134), a digital password manager, a directory service, and/or into a single-sign-on process that enables the user to access computing systems of the system 100 via a single authentication using the password and/or token. At step 1322, the method 1300 may include transmitting a notification to the user and/or to the system administrator indicating storage, generation, and/or assignment of the unique password and/or token number. In certain embodiments, the functionality provided in the method 1300 may be performed and/or facilitated by utilizing any device, system, program, network, process, or any combination thereof, such as, but not limited to, those in system 100. Notably, the method 1200 may further incorporate any of the features and functionality described for the system 100, any other method disclosed herein, or as otherwise described herein.

Figure 14:
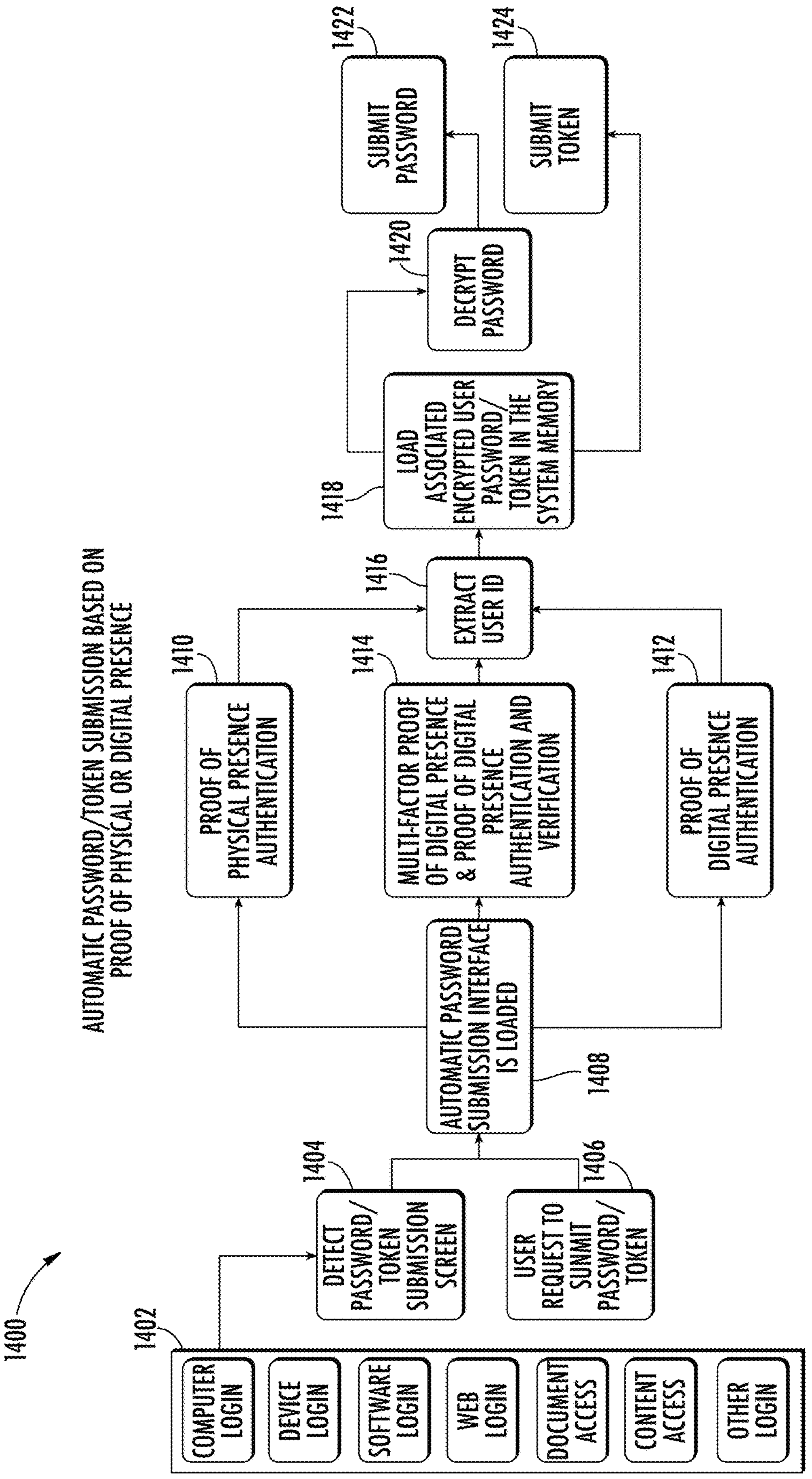
FIG. 14 is a flow diagram illustrating a sample method for providing password and/or token submission based on proof of physical or digital presence according to an embodiment of the present disclosure.

As shown in FIG. 14, an exemplary method 1400 for providing password and/or token submission based on proof of physical or digital presence is schematically shown. At step 1402, the method 1400 may include providing one or more options for logging into the system 100 (e.g. computer login, device login, software login, web login, document access, content access, and/or other login). At step 1404, the method 1400 may include detecting a password and/or token submission screen. At step 1406, the method 1400 may include having a user request to submit a password and/or token. At step 1408, the method 1400 may include loading an automatic password submission interface, such as via on a user interface of the first user device 102 and/or the computing device 126. At steps 1410, 1412, and/or 1414, the method 1400 may include authenticating proofs of physical presence and/or digital presence of the user attempting to access portions of the system 100 and/or location 125. At step 1416, the method 1400 may extract a user identifier of the user based on the authentications of proofs of the physical and/or digital presence of the user. At step 1418, the method 1400 may include loading associated encrypted user passwords and/or tokens in a memory of the system 100. In certain embodiments, the loaded encrypted user passwords and/or tokens may be unknown by anyone or anything other than the system 100 itself and/or the user. At step 1420, the method 1400 may include decrypting the encrypted password. At step 1422, the method 1400 may include automatically submitting the decrypted password so as to enable the user to access portions of the system 100. At step 1424, which may occur directly after step 1418, the method 1400 may include automatically submitting the token so as to enable the user to access portions of the system 100. In certain embodiments, the functionality provided in the method 1400 may be performed and/or facilitated by utilizing any device, system, program, network, process, or any combination thereof, such as, but not limited to, those in system 100. Notably, the method 1400 may further incorporate any of the features and functionality described for the system 100, any other method disclosed herein, or as otherwise described herein.

Figure 15:
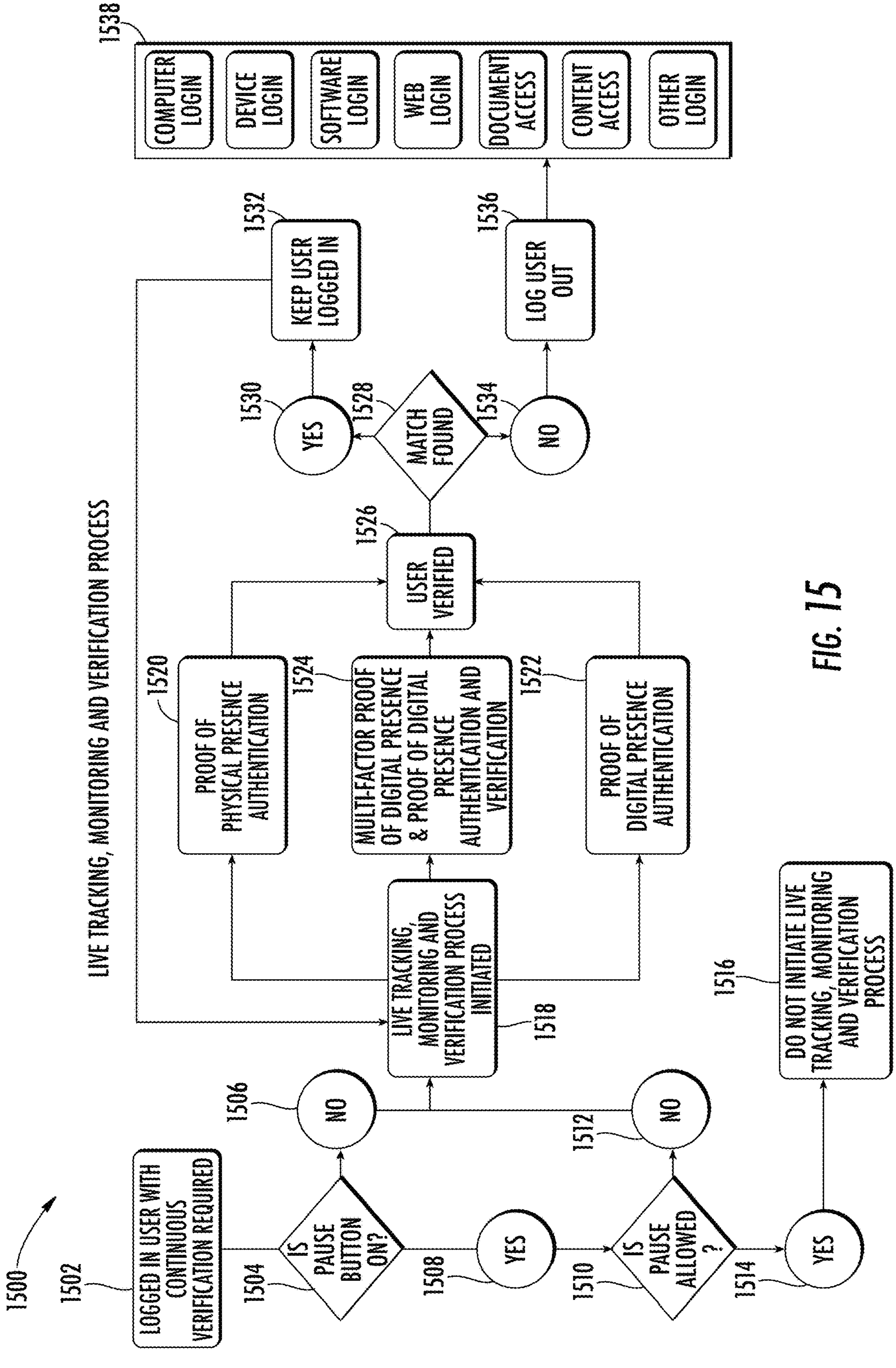
FIG. 15 is a flow diagram illustrating a sample method for performing live tracking, monitoring, and verification according to an embodiment of the present disclosure.

As shown in FIG. 15, an exemplary method 1500 for performing live tracking, monitoring, and verification is schematically shown. At step 1502, the method 1500 may include conducting continuous verification of a user logged into the system 100 that is utilized credentials authorized for the user to access the system 100. At step 1504, the method 1500 may include determining if an option to pause the verification, monitoring, and/or live tracking is on. For example, the option to pause may be provided on a user interface displayed on the computing device 126, a device used by the user (e.g. first user device 102), any other device, or a combination thereof. The user may select and turn on the option to pause via an input into the user interface, such as, but not limited to, a voice input, a text input, a touch-screen input, any type of input, or a combination thereof. If the option is not on, at step 1506, the method 1500 may proceed to step 1518, which may involve initiating live tracking, monitoring, and/or verification of the user logged into the system 100. If the option to pause is enabled or on, at step 1508, the method 1500 may proceed to step 1510 to determine if pausing of the verifying, monitoring, and/or live tracking is allowed. If pausing is allowed, at step 1514, the method 1500 may then proceed to step 1516, which involves not initiating live tracking, monitoring, and/or verification processes of the user. If however, pausing is not allowed, at step 1512, the method 1500 may proceed to step 1518, which involves initiating live tracking, monitoring, and/or verification of the user. In order to authenticate the user into the system 100, the method 1500 may proceed to steps 1520, 1522, and/or 1524, which include authenticating the proof of physical presence and/or proof of digital presence provided by the user, such as via first user device 102 and/or computing device 126. In certain embodiments, if paused by the user, and the user's presence is not verified, the system 100 may not log out the user's account and may not lock down computers, devices, software, and/or systems, or where continuous verification is originally required with proof of physical presence or proof of digital presence only if the permission of pausing the set by the system administrator to pause the continuous tracking, monitoring, and verification of the user's proof of physical presence or proof of digital presence after authentication.

If the user is authenticated and verified via authentication of proof of physical presence and/or proof of digital presence at step 1526, the method 1500 may proceed to step 1528. At step 1528, the method 1500 may include determining if a match is found for the user in the system 100 database 155, a system memory, or other data repository of the system 100. If data matching the user is found in the system 100, at step 1530, the method 1500 may keep the user logged into the system, at step 1532. The method 1500 may then revert back to step 1518 and continue live tracking, monitoring, and verification processes with regard to the user. If data matching the user is not found in the system 100, at step 1534, the method 1500 may log the user out at step 1536. When the user is logged out, the system 100 may lock down devices, networks, software, and/or anything where continuous verification or other verification is required by the system 100. At step 1538, the method 1500 may provide various options to the user to log in to the system, such as, computer login, device login, software login, web login, document access login, content access login, and/or other login. In certain embodiments, the functionality provided in the method 1500 may be performed and/or facilitated by utilizing any device, system, program, network, process, or any combination thereof, such as, but not limited to, those in system 100. Notably, the method 1500 may further incorporate any of the features and functionality described for the system 100, any other method disclosed herein, or as otherwise described herein.

Figure 16:
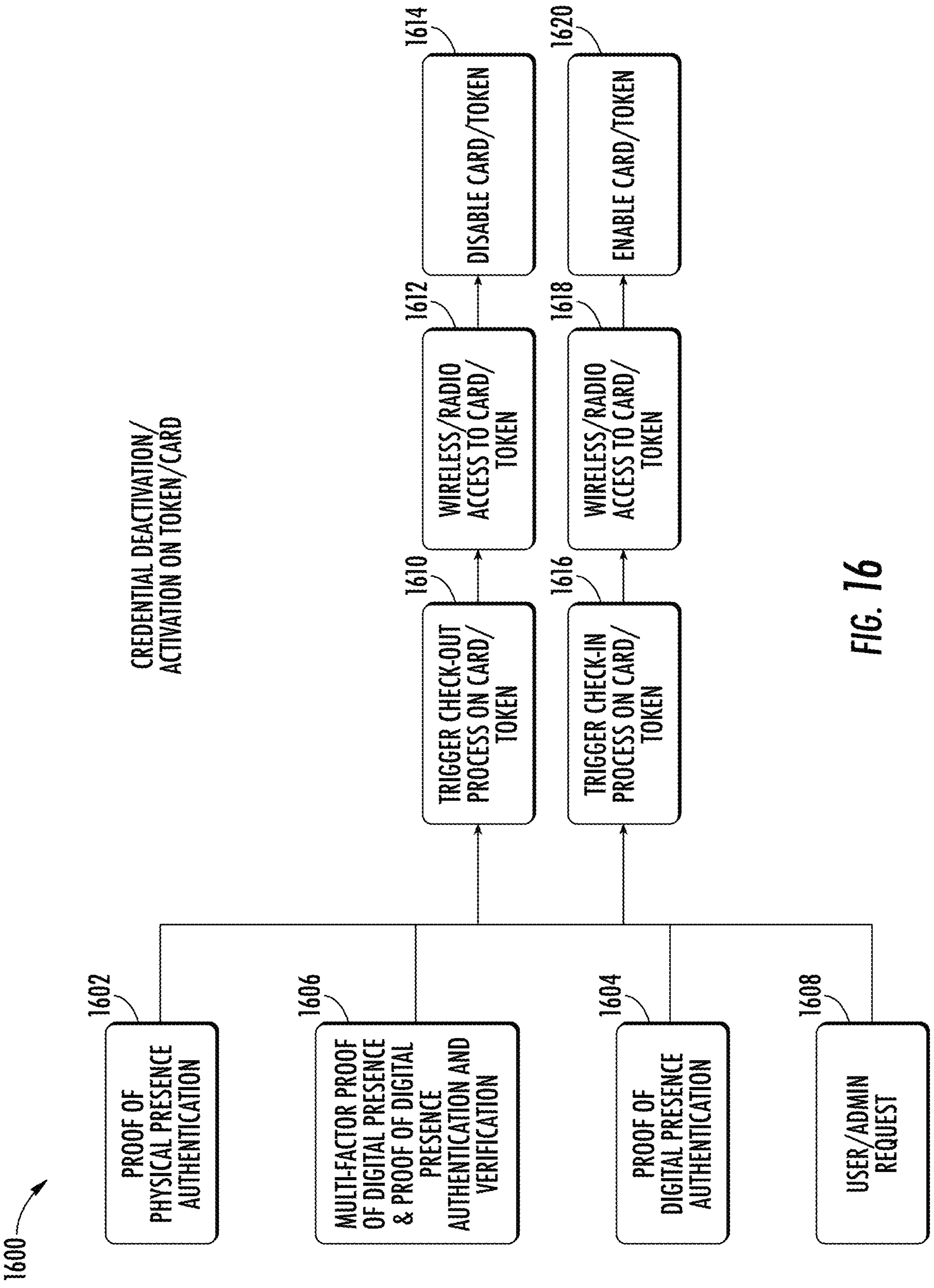
FIG. 16 is a flow diagram illustrating a sample method for providing credential activation or deactivation on a token or card according to an embodiment of the present disclosure.

As shown in FIG. 16, an exemplary method 1600 for providing credential deactivation or activation on a token or proximity card 129 is schematically shown. Steps 1602 1604, 1606, and 1608 may occur in any desired order or simultaneously. At step 1602, the method 1600 may include authenticating a proof of physical presence provided by a user, such as first user 101. At step 1604, the method 1600 may include authenticating a proof of digital presence of the user. At step 1606, the method 1600 may include authenticating and verifying multi-factor proof of digital presence and physical presence. At step 1608, the method 1600 may include having the user and/or a system administrator transmit a request to the system 100 for credential deactivation or activation for a token and/or proximity card 129. Based on the authentication of the proof of physical presence, proof of digital presence, and/or user and/or admin request, the method 1600 may proceed to step 1610 if the request is for checking the user out. If the request is for checking the user in, the method 1600 may proceed to step 1616 instead. Assuming the request is for checking the user out of the system 100, the method 1600 may initiate and/or trigger a check-out process for the proximity card 129 and/or token that the user has been using with the system 100. At step 1612, the system 100, such as via computing device 126, may, at step 1612, wirelessly communicate (e.g. using NFC/RFID/WiFI/wireless components) with the proximity card 129 and/or token, such as via a wireless interface of the proximity card 129 and/or token. At step 1614, the proximity card number of the proximity card 129 and/or the token number of the token may be disabled and/or deactivated by the computing device 126 via the wireless communication, by other components of the system 100, or a combination thereof.

If the request, on the other hand, is for checking the user into the system 100, the method 1600, at step 1616, may initiate and/or trigger a check-in process for the proximity card 129 and/or token. At step 1618, the method 1600, such as via computing device 126, may wirelessly communicate (e.g. using NFC/RFID/WiFI/wireless components) with the proximity card 129 and/or token, such as via a wireless interface of the proximity card 129 and/or token. At step 1620, the proximity card number of the proximity card 129 and/or the token number of the token may be enabled and/or activated by the computing device 126 via the wireless communication, by other components of the system 100, or a combination thereof. In certain embodiments, at step 1620, the proximity card number and/or token number may be transmitted from the system 100 to the proximity card 129 and/or token, and then system 100 may then activate the proximity card 129 and/or token for use with the system 100. In certain embodiments, the functionality provided in the method 1600 may be performed and/or facilitated by utilizing any device, system, program, network, process, or any combination thereof, such as, but not limited to, those in system 100. Notably, the method 1600 may further incorporate any of the features and functionality described for the system 100, any other method disclosed herein, or as otherwise described herein.

Figure 17:
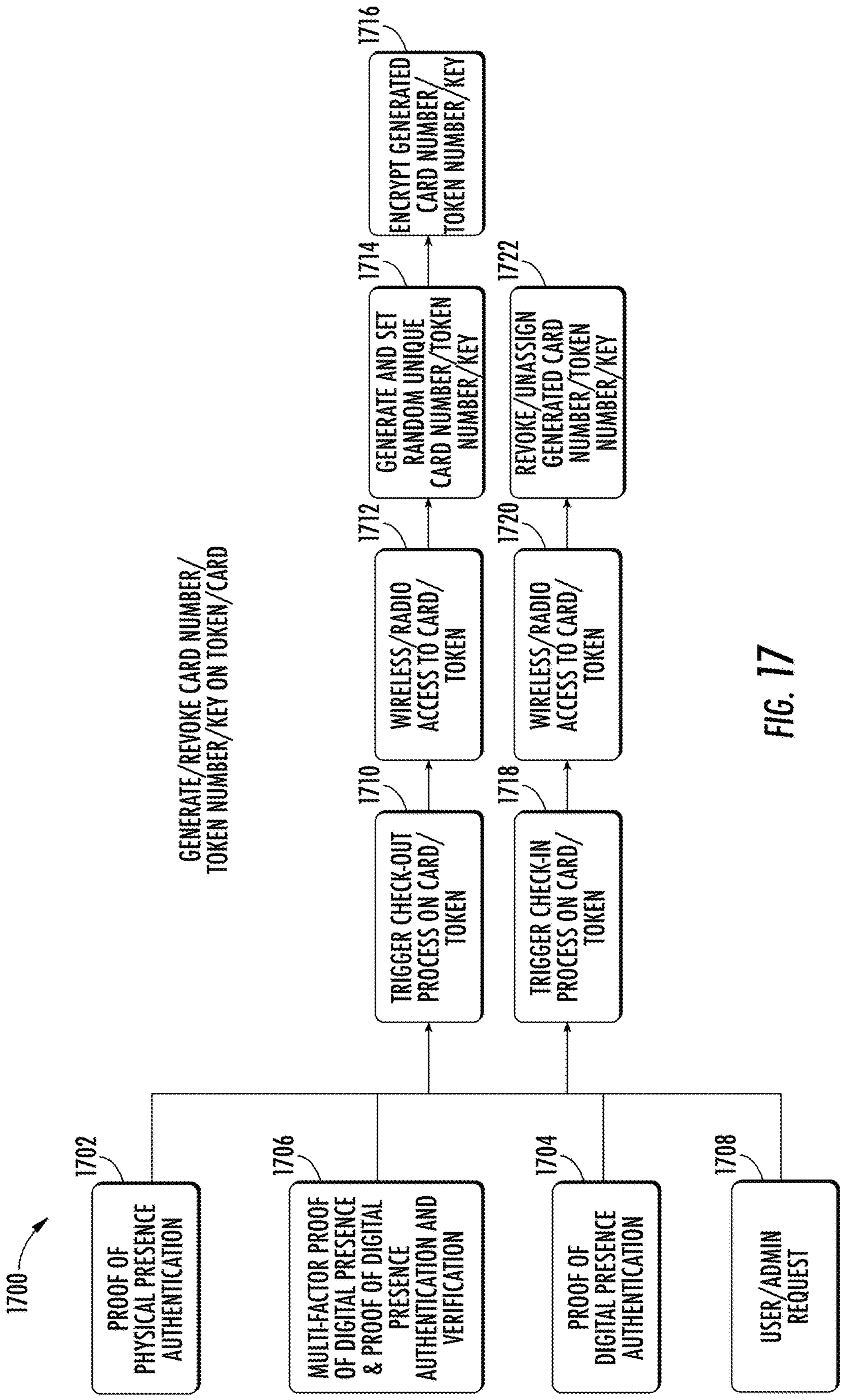
FIG. 17 is a flow diagram illustrating a sample method for generating or revoking a card number, token number, or key on a token or card according to an embodiment of the present disclosure.

As shown in FIG. 17, an exemplary method 1700 for providing credential generation and/or revocation on a token or proximity card 129 is schematically shown. In certain embodiments, the method 1700 may facilitate automatic issuance and assignment (or revocation or unassignment) of a new encrypted/unencrypted system-generated proximity card number/token number plus additionally required preset information within the chip on the proximity card 129 and/or token by authenticating proof of physical and/or digital presence at an ingress point and/or upon a user/administrator request and/or after a defined time period. At step 1702, the method 1700 may include authenticating a proof of physical presence provided by a user, such as first user 101. At step 1704, the method 1700 may include authenticating a proof of digital presence of the user. At step

1706, the method 1700 may include authenticating and verifying multi-factor proof of digital presence and physical presence of the user. At step 1708, the method 1700 may include having the user and/or a system administrator of the system 100 transmit a request to the system 100 (e.g. to computing device 126) for credential deactivation or activation for a token and/or proximity card 129. Based on the authentication of the proof of physical presence, proof of digital presence, and/or user and/or admin request, the method 1700 may proceed to step 1710 if the request is for checking the user into the system 100. If the request is for checking the user out of the system 100 and the user is authenticated, the method 1700 may proceed to step 1718 instead. Assuming the request is for checking-in the user, the method 1700, at step 1710, may initiate and/or trigger a check-in process for the proximity card 129 and/or token. At step 1712, the method 1700, such as via computing device 126 and/or another suitable device, may wirelessly communicate (e.g. using NFC/RFID/WiFi/radio/wireless components) with the proximity card 129 and/or token, such as via a wireless interface of the proximity card 129 and/or token. At step 1714, the method 1700 may include generating and setting a random unique card number, token number, and/or digital key to be utilized with the proximity card 129 and/or token. At step 1716, the method 1700 may include encrypting the generated card number, token number, and/or digital key and associating the encrypted card number, token number, and/or digital key with the proximity card 129 and/or token so that the proximity card 129 and/or token may be utilized by the user to access physical access control system 132, logical access control system 134, the system 100 in general, and/or any other authorized system. In certain embodiments, the proximity card number, digital key, and/or token number may be transmitted from the system 100 to the proximity card 129 and/or token, and then system 100 may then activate the proximity card 129 and/or token for use with the system 100. If the request at step 1708 is for checking the user out of the system 100 and the user is authenticated by the system 100, the method 1700 may, at step 1718, initiate and/or trigger a check-out process for the proximity card 129 and/or token that the user has been using with the system 100. At step 1720, the system 100, such as via computing device 126, may wirelessly communicate (e.g. using NFC/RFID/WiFI/wireless components) with the proximity card 129 and/or token, such as via a wireless interface of the proximity card 129 and/or token. At step 1722, the method 1700 may include revoking and/or unassigning the previously generated card number, digital key, and/or token number. As a result, the user may then be prevented from accessing the various systems and/or locations 125 of the system 100 until the user is checked in again. In certain embodiments, the functionality provided in the method 1700 may be performed and/or facilitated by utilizing any device, system, program, network, process, or any combination thereof, such as, but not limited to, those in system 100. Notably, the method 1700 may further incorporate any of the features and functionality described for the system 100, any other method disclosed herein, or as otherwise described herein.

Figure 18:
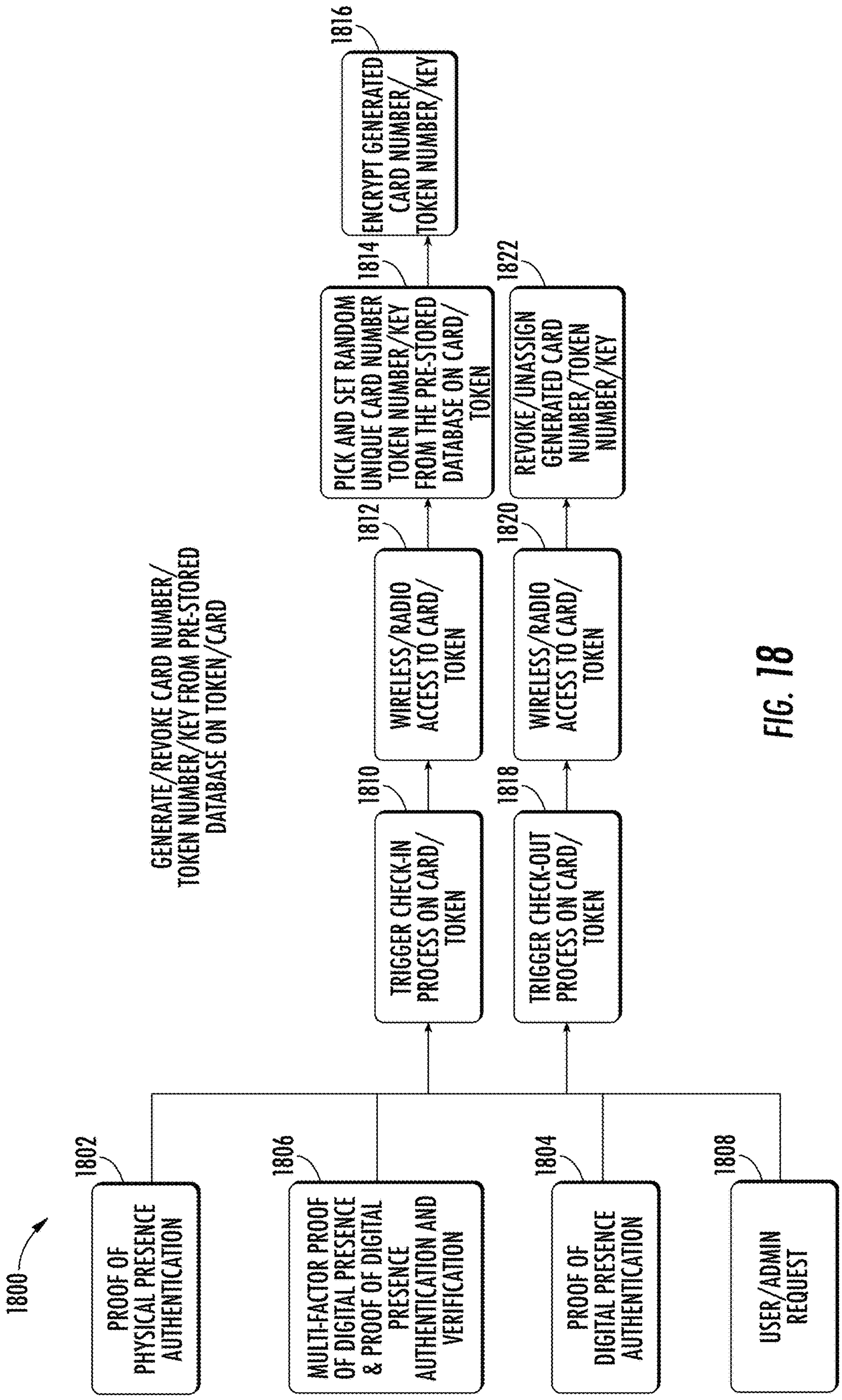
FIG. 18 is a flow diagram illustrating a sample method for generating or revoking a card number, token number, or key from a pre-stored database on a token or card according to an embodiment of the present disclosure.

As shown in FIG. 18, an exemplary method 1800 for providing credential generation and/or revocation on a token or proximity card 129 is schematically shown. The method 1800 may include facilitating automatic issuance, assignment and/or rotation (and/or revocation and/or unassignment) of proximity card numbers and/or token numbers, along with any pre-set required information (e.g. information identifying the locations that the user can access, information identifying computing systems and/or devices that the user can access, and/or any other required information), by authenticating proof of physical and/or digital presence at an ingress or egress point 130, 131 and/or upon request by the user and/or a system administrator, and/or after a designated time period. At step 1802, the method 1800 may include authenticating a proof of physical presence provided by a user, such as first user 101. At step 1804, the method 1800 may include authenticating a proof of digital presence of the user. At step 1806, the method 1800 may include authenticating and verifying multi-factor proof of digital presence and physical presence of the user. At step 1808, the method 1800 may include having the user and/or a system administrator of the system 100 transmit a request to the system 100 (e.g. to computing device 126) for credential deactivation or activation for a token and/or proximity card 129. Based on the authentication of the proof of physical presence, proof of digital presence, and/or user and/or admin request, the method 1800 may proceed to step 1810 if the request is for checking the user into the system 100. If the request is for checking the user out of the system 100 and the user is authenticated, the method 1800 may proceed to step 1818 instead. Assuming the request is for checking-in the user, the method 1800, at step 1810, may initiate and/or trigger a check-in process for the proximity card 129 and/or token. At step 1812, the method 1800, such as via computing device 126 and/or another suitable device, may wirelessly communicate (e.g. using NFC/RFID/WiFi/radio/wireless components) with the proximity card 129 and/or token, such as via a wireless interface of the proximity card 129 and/or token.

At step 1814, the method 1800 may include selecting, from a pre-stored database (e.g. database 155) and setting a random unique card number, token number, and/or digital key to be utilized with the proximity card 129 and/or token. At step 1816, the method 1800 may include encrypting the selected and/or generated card number, token number, and/or digital key and associating the encrypted card number, token number, and/or digital key with the proximity card 129 and/or token so that the proximity card 129 and/or token may be utilized by the user to access physical access control system 132, logical access control system 134, the system 100 in general, and/or any other authorized system. In certain embodiments, the proximity card number, digital key, and/or token number from the pre-stored database may be transmitted from the system 100 to the proximity card 129 and/or token, and then system 100 may then activate the proximity card 129 and/or token for use with the system 100. If the request at step 1808 is for checking the user out of the system 100 and the user is authenticated by the system 100, the method 1800 may, at step 1818, initiate and/or trigger a check-out process for the proximity card 129 and/or token that the user has been using with the system 100. At step 1820, the system 100, such as via computing device 126, may wirelessly communicate (e.g. using NFC/RFID/WiFI/wireless components) with the proximity card 129 and/or token, such as via a wireless interface of the proximity card 129 and/or token. At step 1822, the method 1800 may include revoking and/or unassigning the previously set card number, digital key, and/or token number. In certain embodiments, the revoking and/or unassigning may include removing the card number, digital key, and/or token number from the pre-stored database so that they may not be used further. As a result, the user may then be prevented from accessing the various systems and/or locations 125 of the system 100 until the user is checked in again. In certain embodiments, the functionality provided in the method 1800 may be performed and/or facilitated by utilizing any device, system, program, network, process, or any combination thereof, such as, but not limited to, those in system 100. Notably, the method 1800 may further incorporate any of the features and functionality described for the system 100, any other method disclosed herein, or as otherwise described herein.

Figure 19:
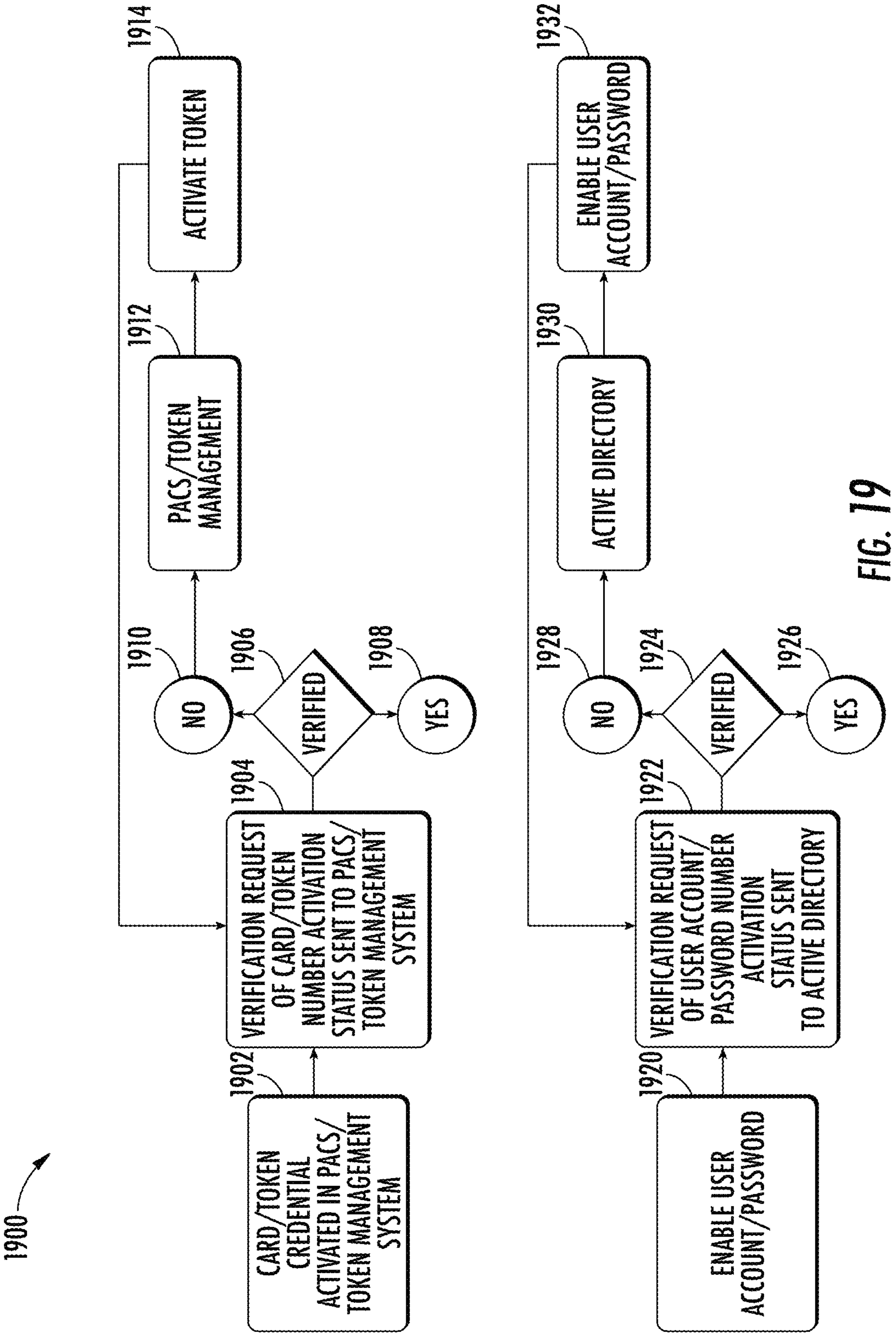
FIG. 19 is a flow diagram illustrating a sample method for verifying a card number, token number, user account, and/or password according to an embodiment of the present disclosure.

As shown in FIG. 19, an exemplary method 1900 for verifying card numbers, token numbers, user accounts, passwords for use with the system 100 is schematically shown. In method 1900, upon credential activation, the system 100 may confirm a proximity card and/or token status with the physical access control system 132 (or other system of system 100), and if the status is returned as deactivated or unassigned, the system 100 may automatically resend the command to issue and activate the proximity card and/or token again until the required active status has been achieved. In a first process flow of the method 1900 and at step 1902, the method 1900 may include activating a credential (e.g. token number, proximity card number, etc.) for use with a proximity card 129 and/or token in the physical access control system 132 and/or token management system of the system 100 (and/or to other systems of the system 100). At step 1904, the method 1900 may include transmitting a verification request of the proximity card and/or token number activation status to the physical access control system 132 and/or token management system (and/or to other system of the system 100). At step 1906, the method 1900 may include having the physical access control system 132, token management system, and/or other system verify the activation status of the proximity card number, token number, and/or other credential. If the credential is determined to be activated, the method 1900 may proceed to step 1908, where the credential activation is confirmed. If the credential is not determined to be activated, the method 1900 may proceed to step 1910, wherein the credential activation is not confirmed. After step 1910, the method 1900 may proceed to step 1912 where a notification is provided to the physical access control system 132, the token management system, and/or other system. At step 1914, the method 1900 may include having the physical access control system 132, the token management system, and/or the other system activate the credential. Once the credential is activated, the method 1900 may revert back to step 1904 to transmit the verification request regarding the activation status of the credential to the physical access control system 132, the token management system, and/or the other system so that the credential activation may be verified.

The method 1900 may also include another process flow, which may be focused on verification of credential activation status by the logical access control system 134. In particular, at step 1920, the method 1900 may include enabling a user account and/or password for use with various computing systems and/or devices of the system 100. For example, the enabling may be performed by the logical access control system 134. At step 1922, the method 1900 may include transmitting a verification request of the user account and/or password activation status to the logical access control system 134, which may include, but is not limited to including, an active directory, single-sign-on functionality, and/or other logical access control system functionality and/or features. At step 1924, the method 1900 may include having the logical access control system 134 and/or other suitable system verify the activation status of the user account and/or password, and/or other credential. If the user account and/or password credential is determined to be activated, the method 1900 may proceed to step 1926, wherein the credential activation is confirmed. If the user account and/or password credential is not determined to be activated, the method 1900 may proceed to step 1928, where the credential activation is not confirmed. After step 1928, the method 1900 may proceed to step 1930, where a notification is provided to the logical access control system 134 and/or other system. At step 1930, the method 1900 may include having the logical access control system 134 and/or the other system activate the user account and/or password credential. Once the credential is activated, the method 1900 may revert back to step 1922 to transmit the verification request regarding the activation status of the credential to the logical access control system 134 and/or the other system so that the credential activation may be verified. In certain embodiments, the functionality provided in the method 1900 may be performed and/or facilitated by utilizing any device, system, program, network, process, or any combination thereof, such as, but not limited to, those in system 100. Notably, the method 1900 may further incorporate any of the features and functionality described for the system 100, any other method disclosed herein, or as otherwise described herein.

Figure 20:
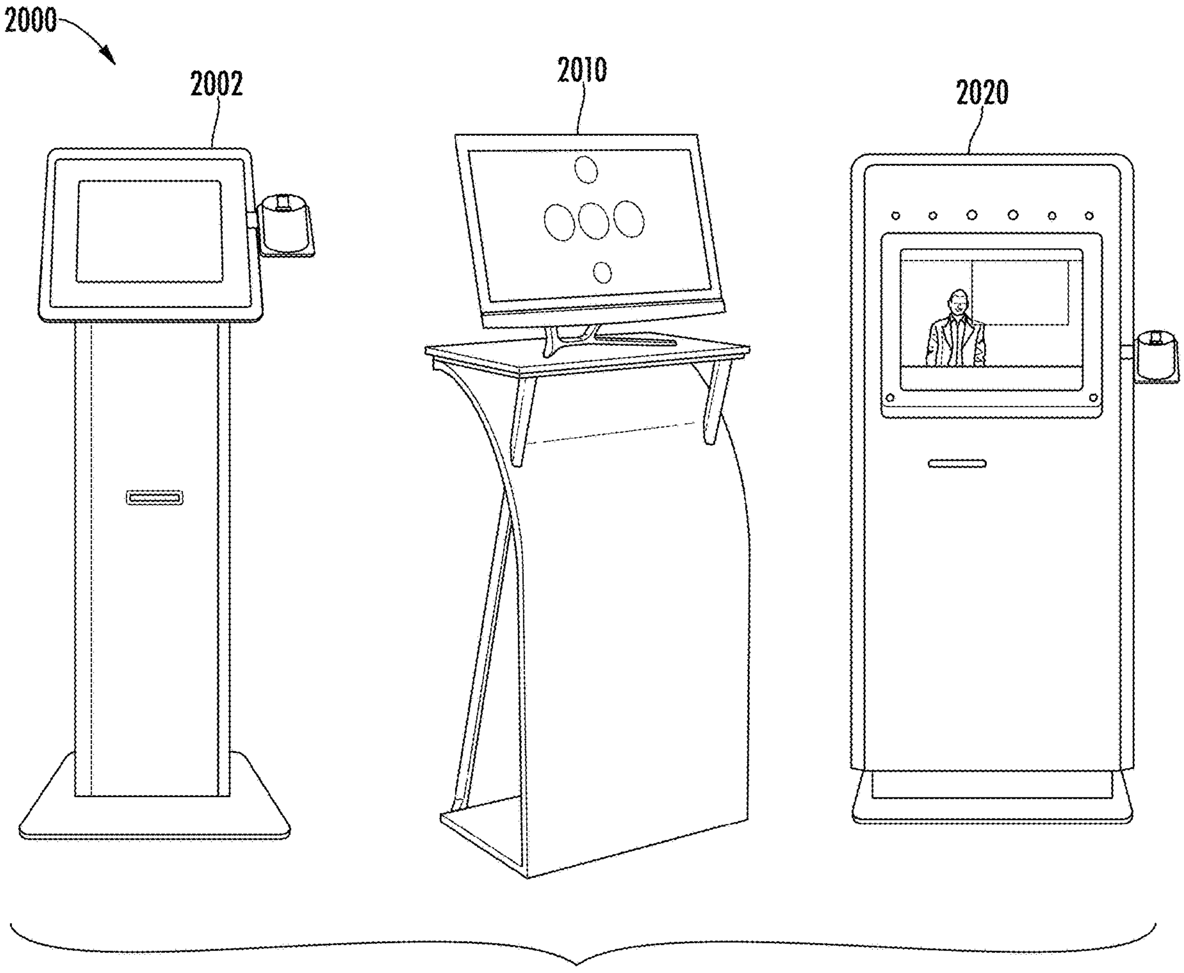
FIG. 20 is a schematic diagram illustrating various types of devices for facilitating credential activation according to an embodiment of the present disclosure.
Figure 21:
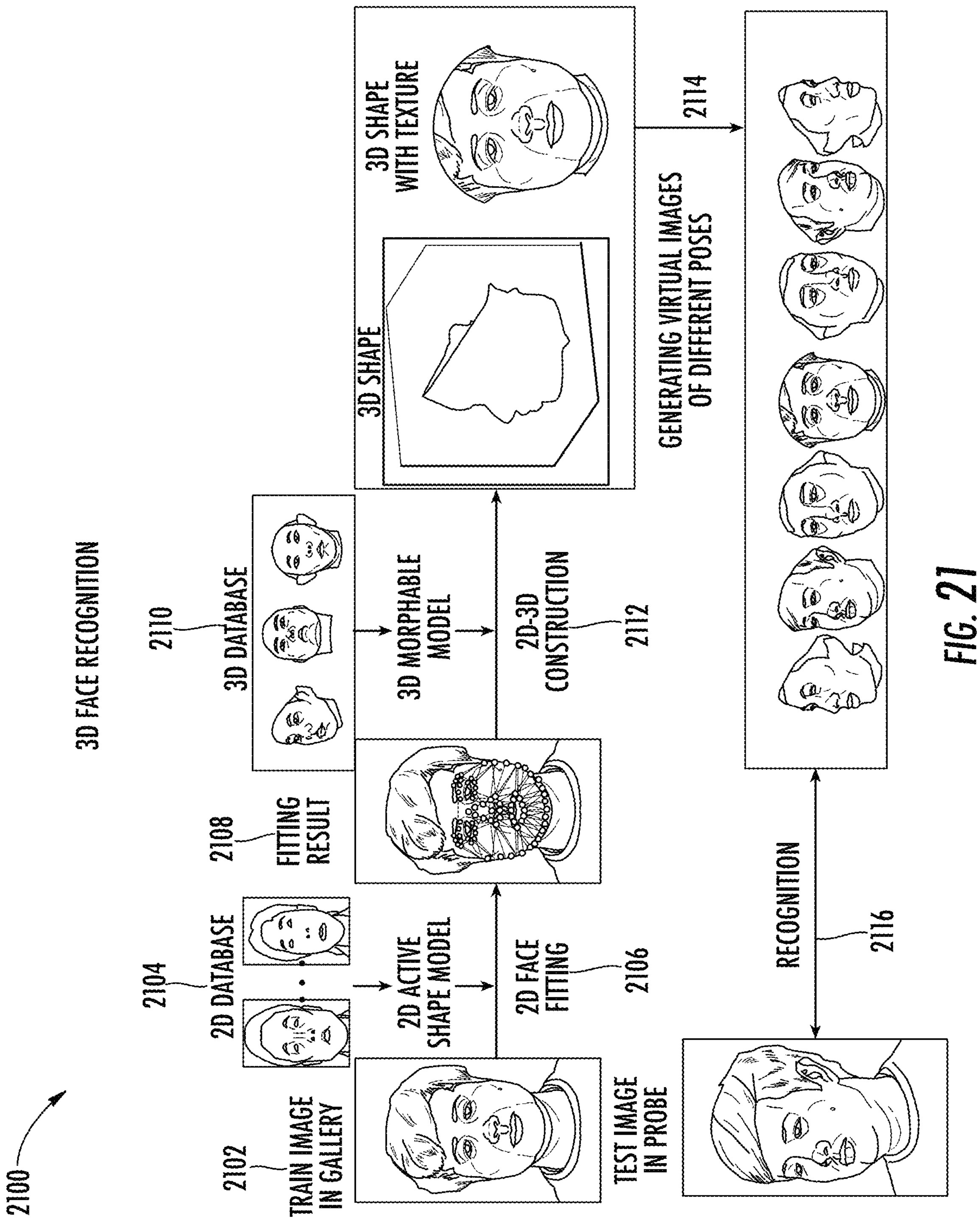
FIG. 21 is a flow diagram illustrating a sample method for providing 3D face recognition according to an embodiment of the present disclosure.

The systems and methods disclosed herein may include additional functionality and features. For example, in certain embodiments, the systems and methods may also utilize a variety of systems, devices, programs, and/or functionality to obtain proofs of physical and/or digital presence and/or to authenticate such proofs. As shown in FIG. 20, various computing devices 126 are shown. For example, computing devices 2002, 2010, 2020 may include any number of memories and/or processors, cameras, sensors, and a user interface to receive inputs from a user and/or output information to the user. In certain embodiments, the computing devices 2002, 2010, 2020 may be configured to dispense proximity cards 129 and/or tokens, and may be communicatively linked to the physical access control system 132, the logical access control system 134, and/or other systems of the system 100. The computing devices 2002, 2010, 2020 may be configured to obtain biometric data, demographic data, user account data, images of the user, and/or any data that way be utilized to identify the user. In certain embodiments, the computing devices 2002, 2010, 2020 may include any device and/or functionality as described in the present disclosure and as shown in FIGS. 1-45. For example and referring now also to FIG. 21, the computing devices 2002, 2010, 2020 may be configured to conduct 3D face recognition of a user. As an exemplary 3D face recognition process, the method 2100 is provided. At step 2102, the method 2100 may include training the system 100 with an image captured of the user, which may be stored in an image gallery. At step 2104, the method 2100 may include interacting with a 2D database and generating a 2D active shape model. Using the 2D database the 2D active shape model, the method 2100 may include conducted 2D face fitting at step 2106. At step 2108, the method 2100 may provide a fitting result. At step 2110, the method 2100 may include interacting with a 3D database and generating a 3D morphable model. At step 2112, the method 2100 may include conducting 2D to 3D construction, which may include generating a 3D shape of the user and generated a 3D shape with texture. At step 2114, the method 2100 may include generating virtual images including different poses of the user, such as poses of the user's face. When the user attempts the access the system 100, such as via the computing devices 2002, 2010, 2020, the method 2100 may recognize the user at step 2116 by comparing a newly captured image of the user to the generated 3D virtual images of the different poses of the user.

Figure 22:
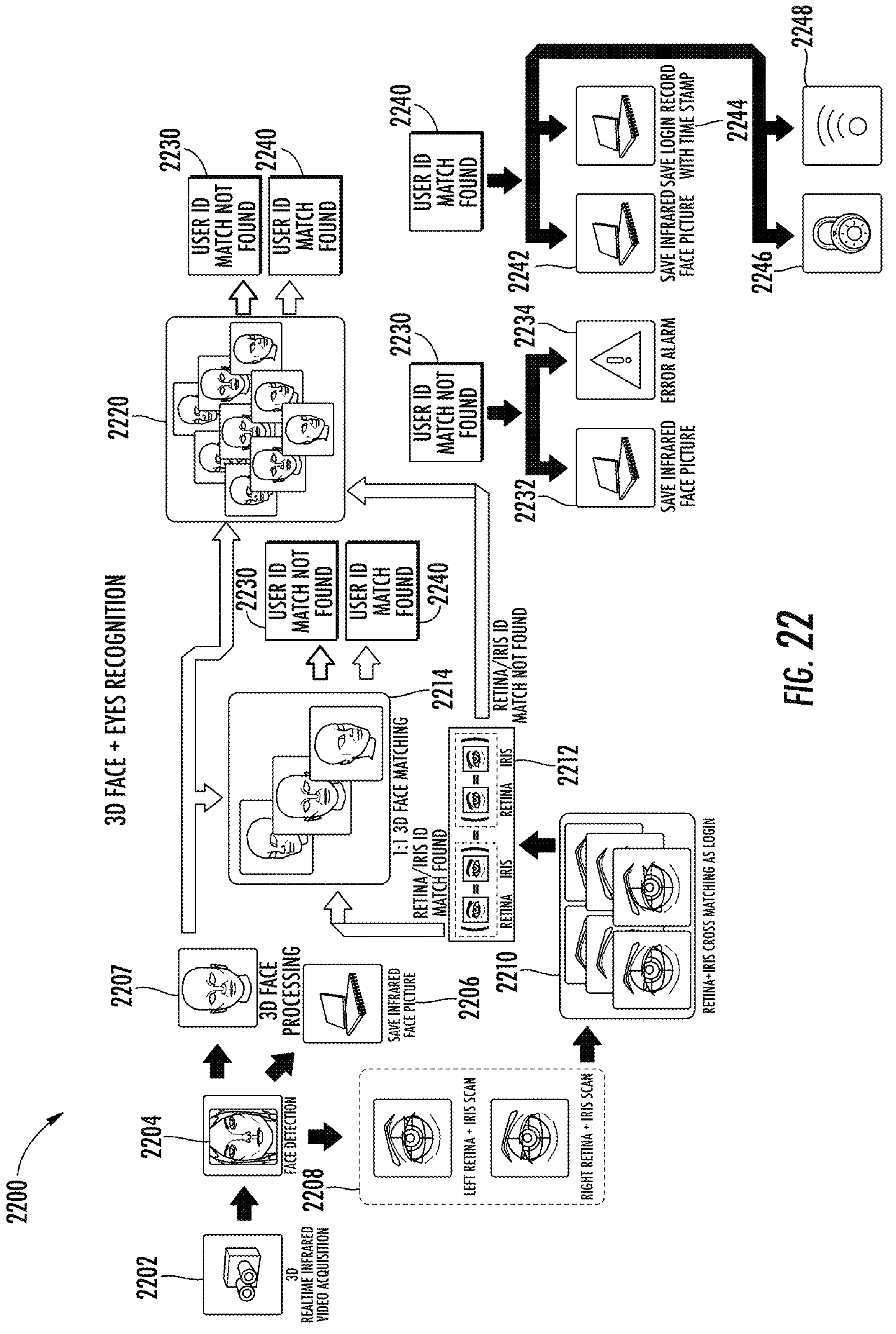
FIG. 22 is a flow diagram illustrating a sample method for providing 3D face and eyes recognition according to an embodiment of the present disclosure.

As another example and referring now also to method 2200 of FIG. 22, the system 100 may be configured to conduct 3D face and eyes recognition, which may also be utilized to provide proof of presence to the system 100. At step 2202, the method 2200 may include conducting 3D real-time infrared video acquisition, where the video may include the user's face. At step 2204, the method 2200 may detect the face of the user in the video using any number of algorithms. At step 2206, an infrared face image of the user may be saved in the system 100, and at step 2207, the method 2200 may include conducting 3D face processing. At step 2208, the method 2200 may include scanning the left and right retinas and irises of the eyes of the user. The method 2200 may proceed to step 2210 and utilizing the scanned retinas and/or irises to log the user into the system 100 if there is a match for the scanned retinas and/or irises already saved in the system 100. The matching process may be conducted at step 2212. If a match for the retains and/or irises is found, the method 2200 may proceed to step 2214, which may include conducted 1:1 3D face matching using the results from the 3D face processing. If a user identifier associated with an image stored in the system 100 is found that matches the 3D face image, the method 200 proceeds to step 2240 and the user is authenticated. If a user identifier associated with an image stored in the system 100 is not found and there is no match to the 3D ace image, the method 200 proceeds to step 2230. At step 2220, the method 2200 may conduct 1:N 3D face matching, and if a matching user identifier is found, the method 2200 proceeds to step 2240, and if a matching user identifier is not found, the method 2200 proceeds to step 2230. If the match is not found at step 2230, the method 2200 may save the infrared face picture of the user in the system 100 at step 2232 and outputting an error alarm at step 2234 indicating that no match was found and that a potential unauthorized user may be attempting to access the system 100. If the match is found at step 2240, the method 2200 may save the infrared face picture (such as for training the system 100 for future authentications) at step 2242, save a login record for the user with a time stamp at step 2244, enabling access to an access control system of the system 100 at step 2246, and transmitting, at step 2248, a notification (e.g. push notification) to any number of systems and/or devices indicating that the user is logged into one or more portions of the system 100.

Figure 23:
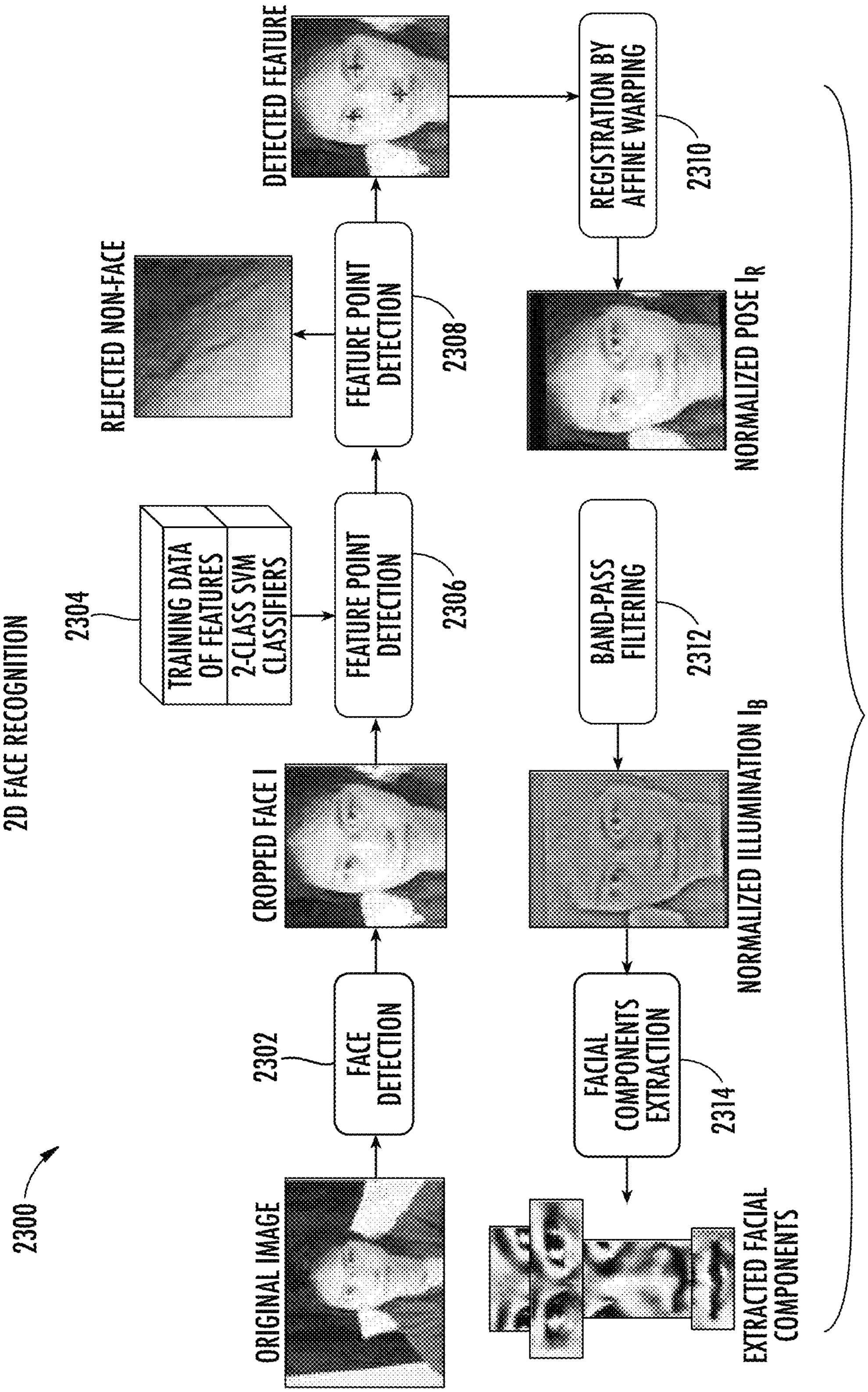
FIG. 23 is a flow diagram illustrating a sample method for providing 2D face recognition according to an embodiment of the present disclosure.

As another example and referring now also to method 2300 of FIG. 23, the system 100 may be configured to conduct 2D face recognition. At step 2302, the method 2300 may examine an original image of a user to detect the face of the user. The image of the user may be cropped to focus on the face of the user. At step 2304, the method 2300 may utilize training data of features and 2-class support vector machine (SVM) classifiers to conduct feature point detection at step 2306 on the cropped image. At step 2308, the method 2300 may remove non-face features from the image. At step 2310, the method 2300 may conduct registration on the image by conducting affine warping, and at step 2312, the method 2300 may conduct band-pass filtering on the image. At step 2314, the method 2300 may extract facial components from the band-pass filtered image and store them in the system 100 so that the user may be recognized upon a subsequent attempt to access the system 100.

Figure 24:
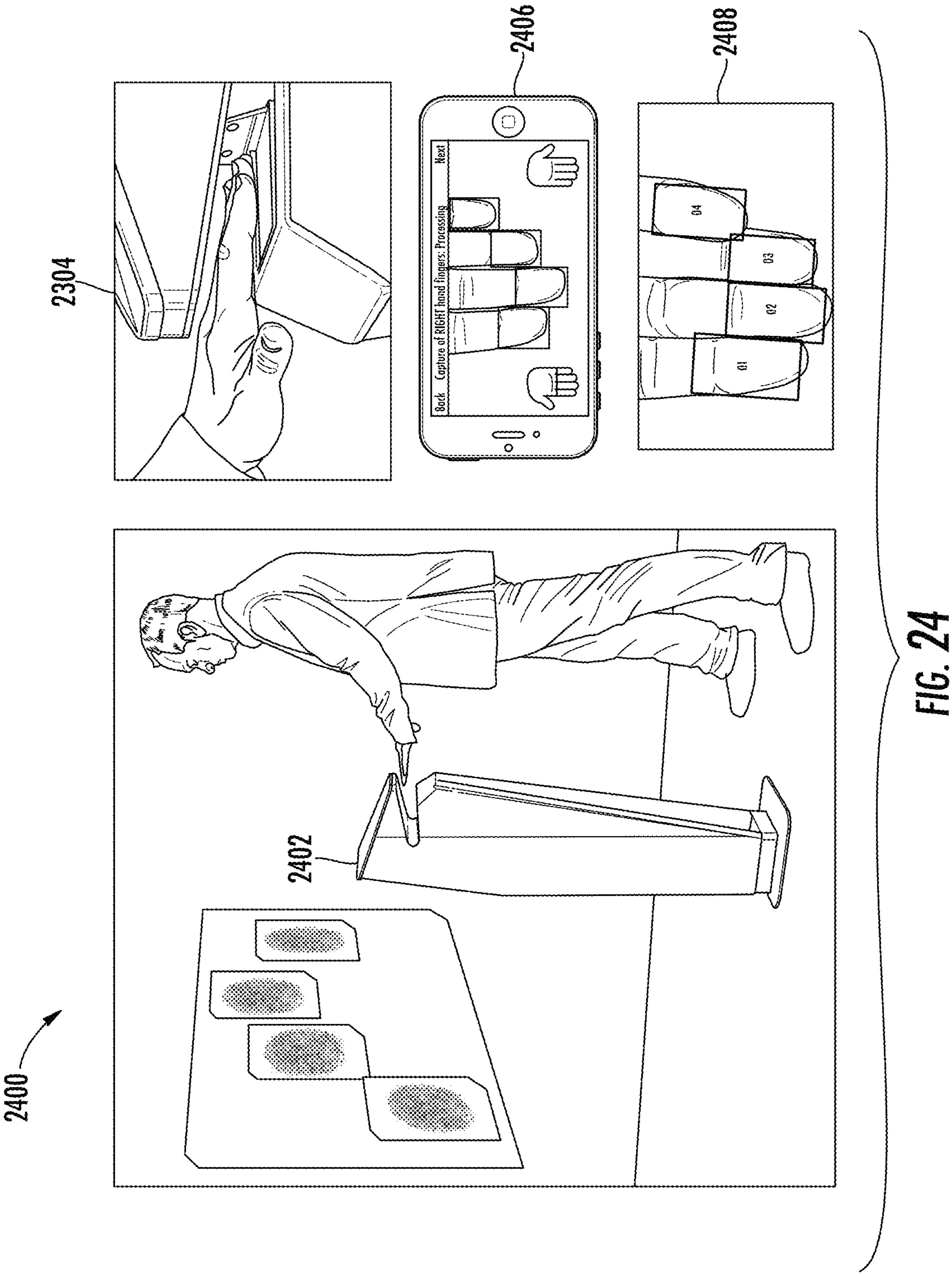
FIG. 24 is a schematic diagram illustrating devices for performing hand wave recognition according to an embodiment of the present disclosure.
Figure 25:
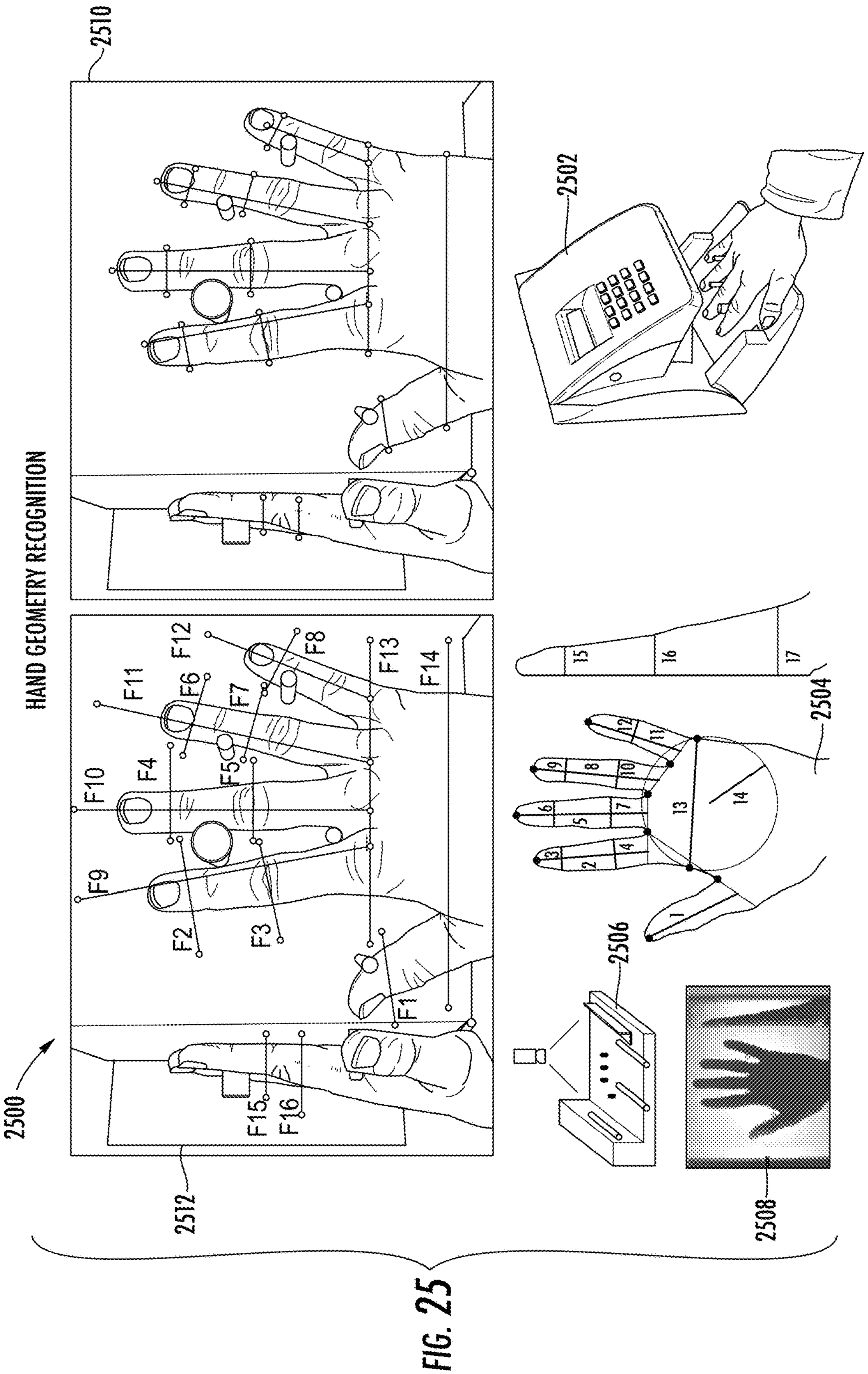
FIG. 25 is a schematic diagram illustrating hand geometry recognition according to an embodiment of the present disclosure.

As another example and referring now also to method 2400 of FIG. 24, the system 100 may be configured to conduct hand wave recognition as a way to obtain proof of presence and authenticate the user. A user may approach computing device 2402 (e.g. computing device 126) and may wave his or her hand in a scanning receptacle of the computing device 2402 at step 2404. At 2406, the method 2400 may include capturing an image of the user's hand and/or analyzing the fingers of the user. At step 2408, the method 2400 may compare the analyzed fingers of the user to pre-stored data in the system, and, if there is a match, the user may be authenticated based on the hand wave recognized for the user. As another example and referring now also to method 2500 of FIG. 25, the system 100 may be configured to conduct hand geometry recognition to obtain a proof of presence for the user and/or authenticate the user. At step 2502, the method 2500 may include having the user place his hand on a device configured for hand geometry recognition. At steps 2504, 2506, 2508, 2510 and 2512, the method 2500 may include analyzing the various geometric features of the user's hand, fingers, and/or palm and comparing the hand geometry features to pre-stored data in the system 100. If there is a match, the hand geometry may be utilized as proof of physical presence and may be utilized to authenticate the user.

Figure 26:
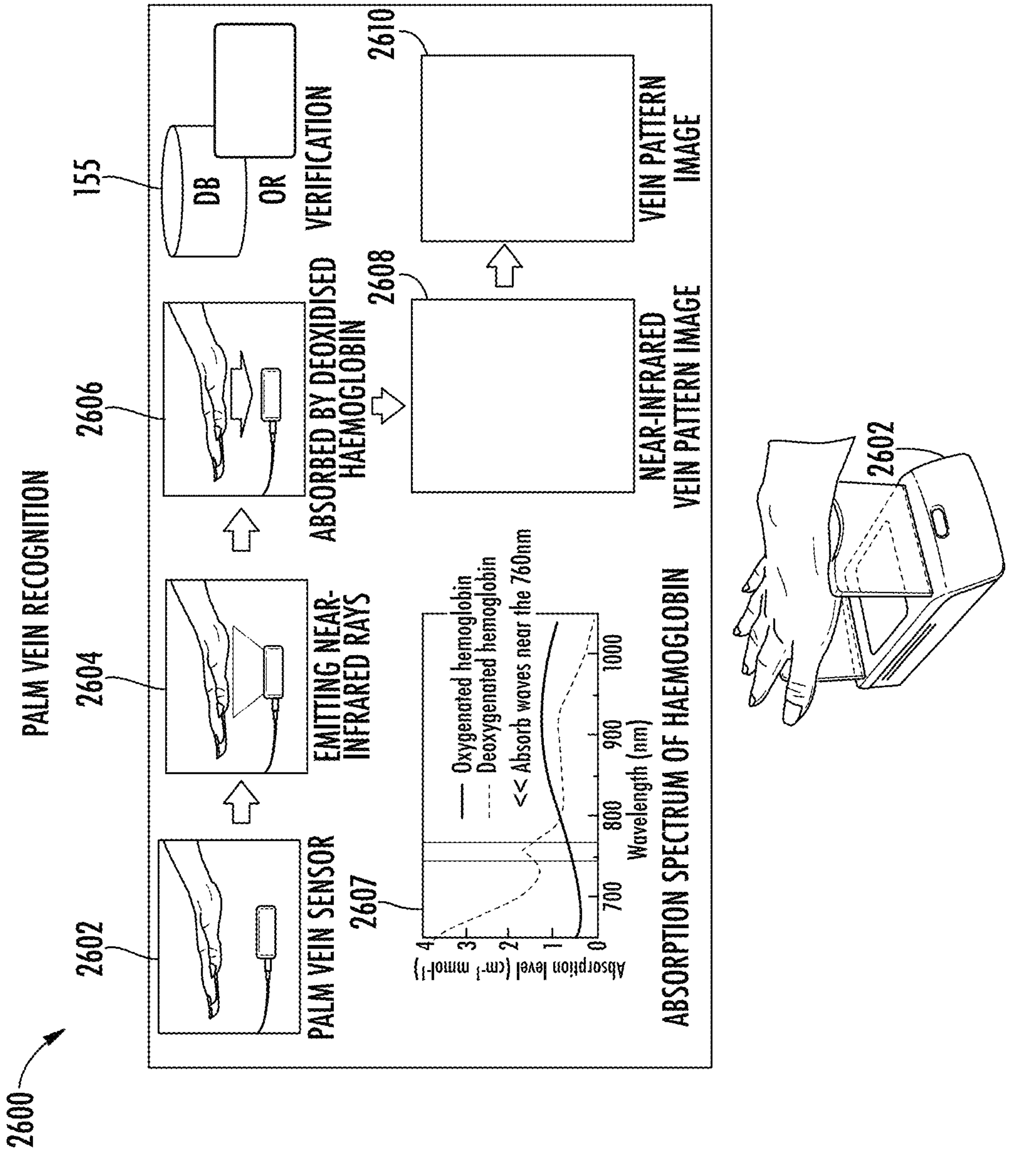
FIG. 26 is a flow diagram illustrating a sample method for providing palm vein recognition according to an embodiment of the present disclosure.
Figure 27:
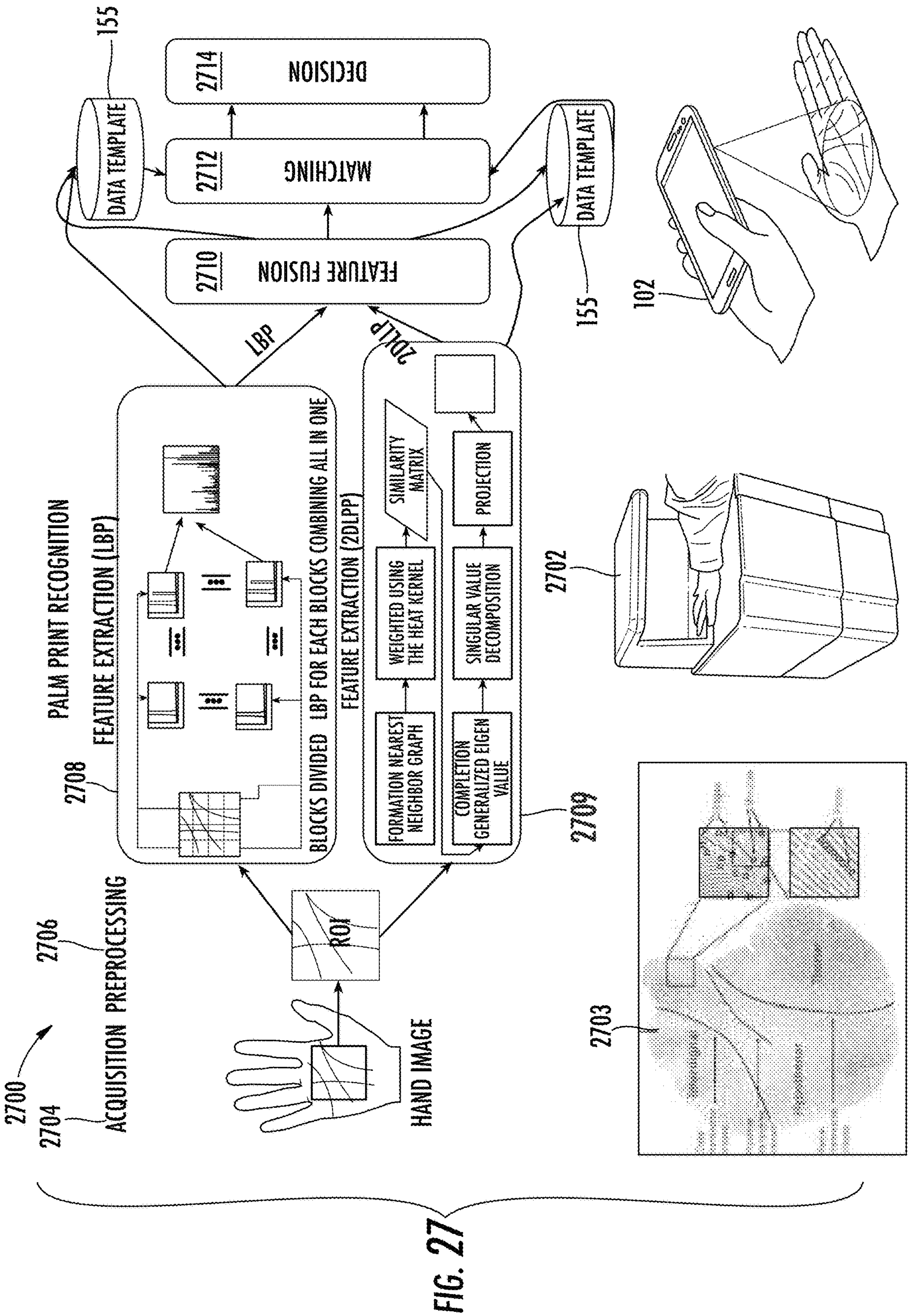
FIG. 27 is a schematic diagram illustrating various aspects of palm print recognition according to an embodiment of the present disclosure.

As another example and referring now also to method 2600 of FIG. 26, the system 100 may be configured to conduct palm vein recognition as a way to obtain proof of presence and authenticate the user. At step 2602, the method 2600 may include having the user place his hand above or on a palm vein sensor of the system 100. At step 2604, the method 2600 may include emitting near-infrared rays toward the hand of the user. At step 2606, the method 2600 may include analyzing the rays absorbed by deoxidized hemoglobin and generating a near-infrared vein pattern image of the user's palm at step 2608. At step 2610, the method 2600 may include verifying the vein pattern image by comparing the generated image to pre-stored data in the system 100. FIG. 2607 illustrates a sample absorption spectrum of hemoglobin. As another example and referring now also to method 2700 of FIG. 27, the system 100 may be configured to conduct palm print recognition as a way to obtain proof of presence and authenticate the user. At step 2702, the user may place his hand on a palm print recognizing device (e.g. computing device 126) for analysis. At step 2703, the method 2700 may include analyzing the various features of the user's palm print, such as interdigital, hypothenar, and thenar regions of the palm print. At step 2704, the method 2700 may acquire an image of the palm print and conduct preprocessing of the palm print at step 2706. At steps 2708 and 2709, the method 2700 may include conducting feature extraction of the various features of the palm print (local binary pattern (LBP) and two-dimensional locality preserving projections (2DLPP)). The feature results from the LBP and 2DLPP may be fused together at step 2710. At step 2712, the method 2700 may include comparing and matching the fused features to data already stored in database 155. Based on the comparing and matching, the method 2700 may, at step 2714, make a decision indicate whether or not a match for the palm print was found. The result may be stored in the database 155 for further use.

Figure 28:
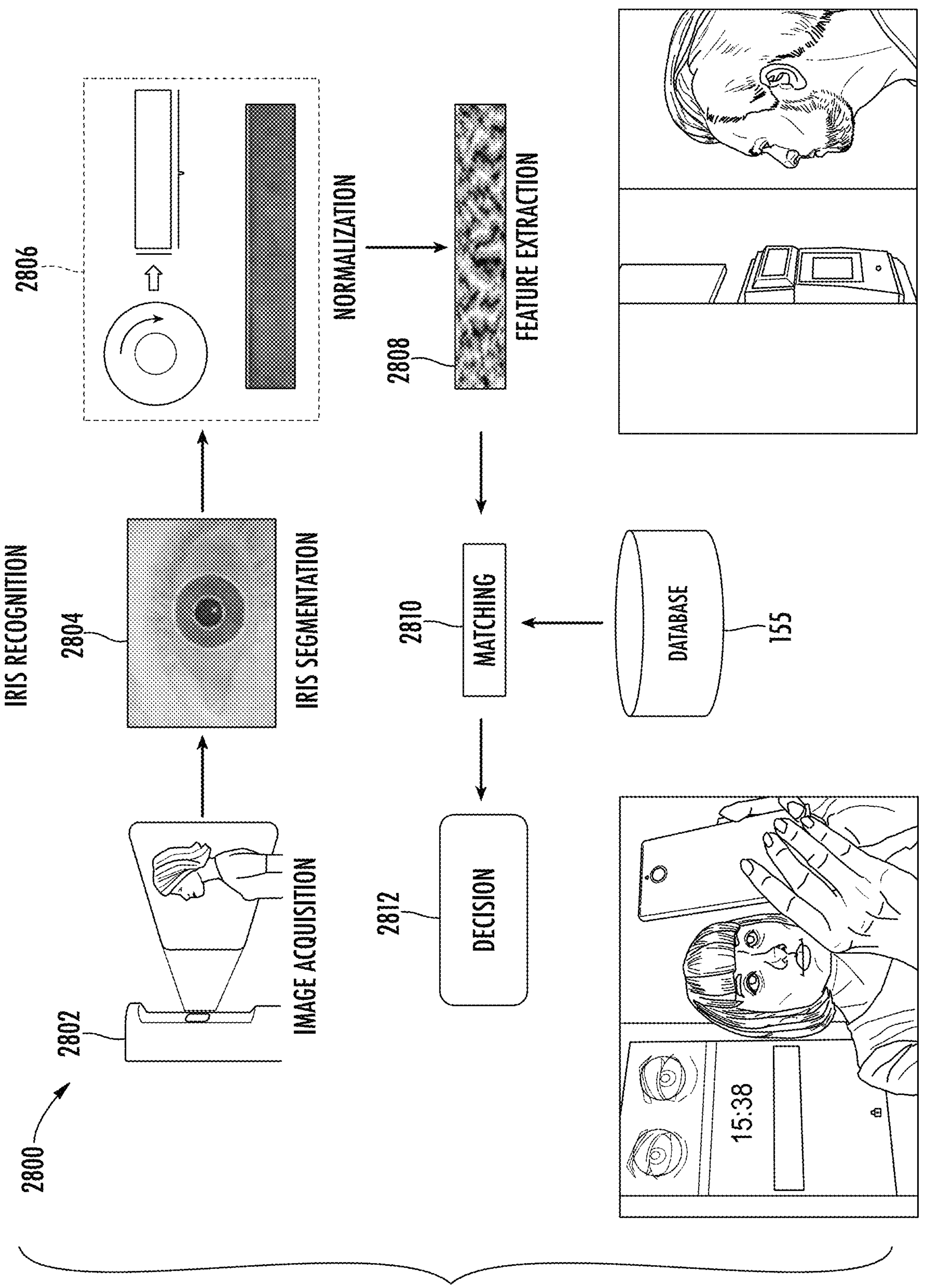
FIG. 28 is a schematic diagram illustrating various aspects of iris recognition according to an embodiment of the present disclosure.
Figure 29:
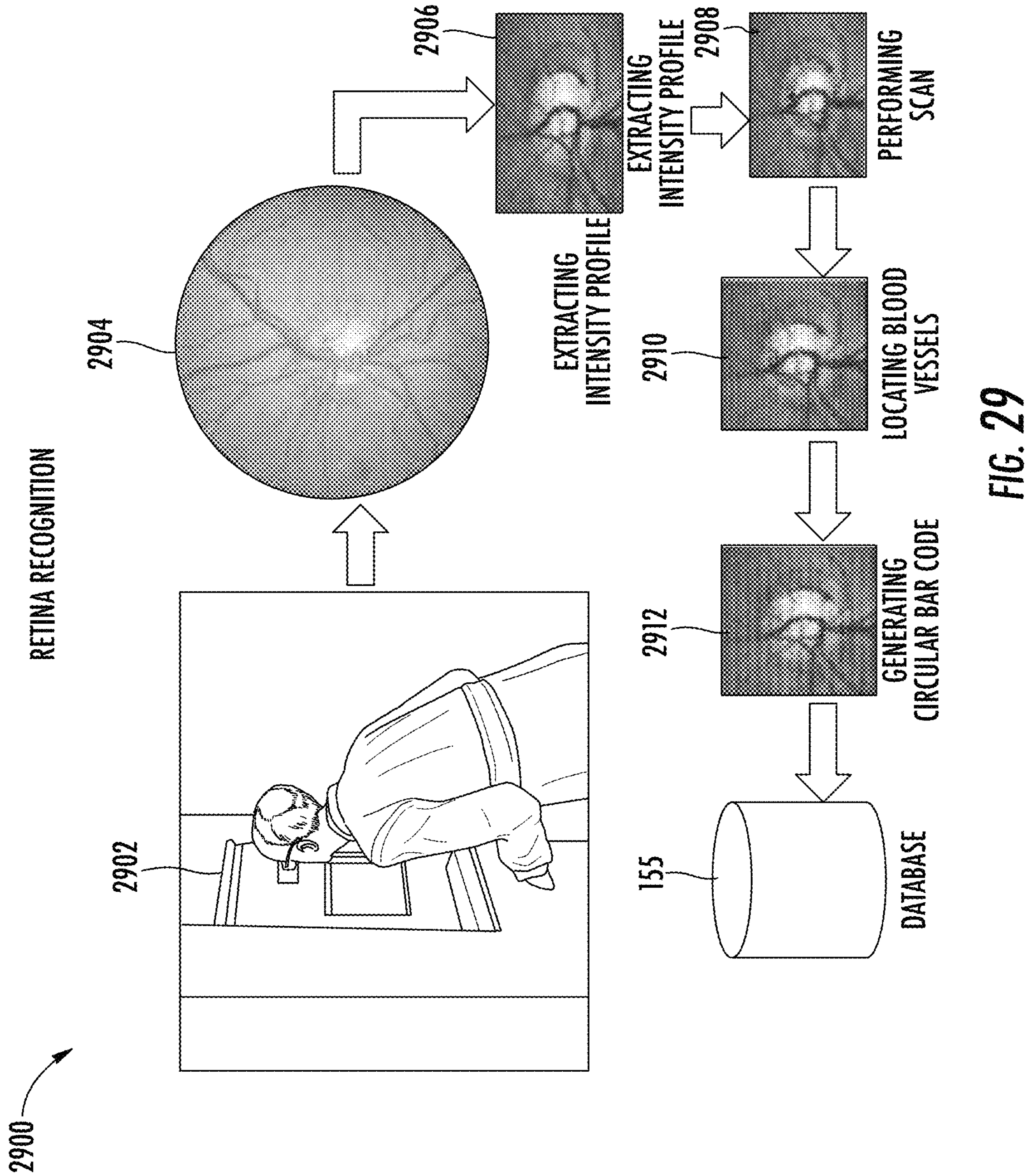
FIG. 29 is a schematic diagram illustrating various aspects of retina recognition according to an embodiment of the present disclosure.

As another example and referring now also to method 2800 of FIG. 28, the system 100 may be configured to conduct iris recognition as a way to obtain proof of presence and authenticate the user. At step 2802, the method 2800 may include acquiring an image of the user, such as by utilizing a camera of computing device 126. At step 2804, the method 2800 may include conducting iris segmentation of the eyes of the user in the image of the user. At step 2806, the method 2800 may conduct normalization on the image, and feature extraction at step 2808. At step 2810, the method 2800 may include comparing and matching the extracted features in the image to features stored in the database 155.

At step 2812, a decision may be made as to whether or not there is a match to the stored features. As another example and referring now also to method 2900 of FIG. 29, the system 100 may be configured to conduct retina recognition as a way to obtain proof of presence and authenticate the user. At step 2902, the method 2900 may capture an image of the retinas of the user. At step 2904, the method 2900 may analyze the capture retina images, and, at step 2906, the method 2900 may include extracting an intensity profile from the retina images. At step 2908, the method 2900 may perform a scan of the image and/or intensity profile, and may locate blood vessels at step 2910. At step 2912, a circular bar code may be generated for the user and it may be stored in the database 155. The retinas of the user may be compared to data stored in the database 155 to determine if there is a match.

Figure 30:
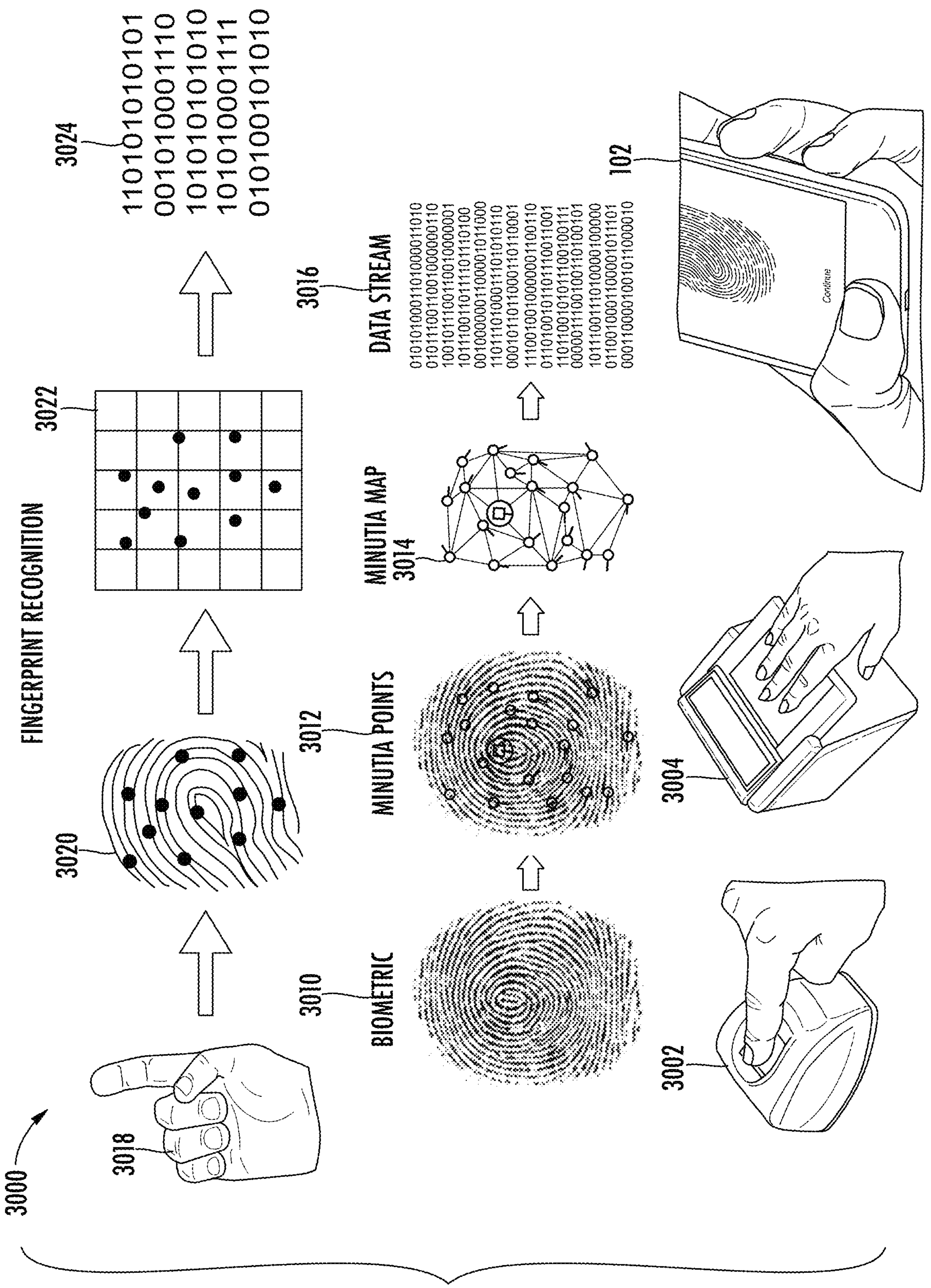
FIG. 30 is a schematic diagram illustrating various aspects of fingerprint recognition according to an embodiment of the present disclosure.
Figure 31:
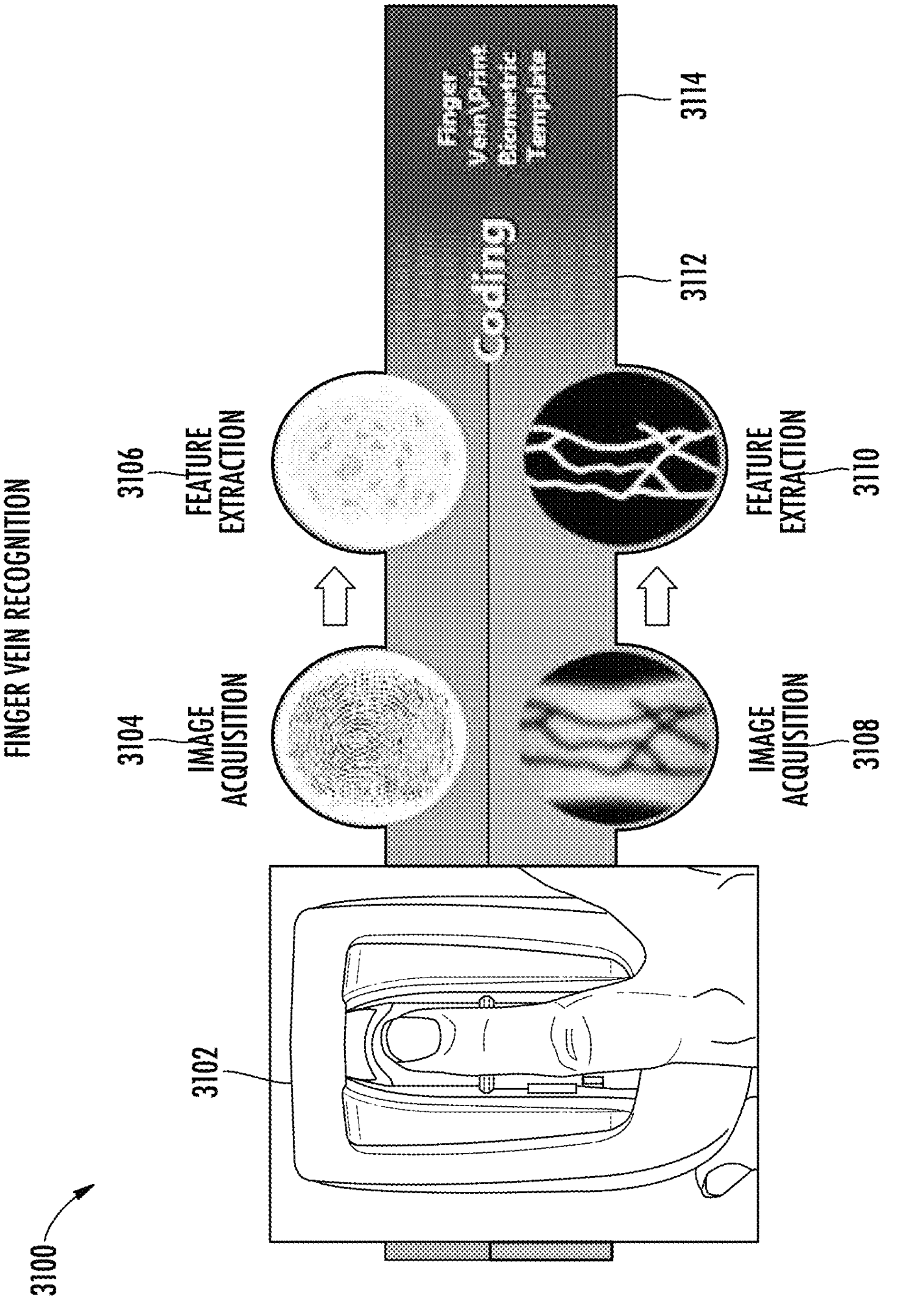
FIG. 31 is a schematic diagram illustrating various aspects of finger vein recognition according to an embodiment of the present disclosure.

As another example and referring now also to method 3000 of FIG. 30, the system 100 may be configured to conduct fingerprint recognition as a way to obtain proof of presence and authenticate the user. At step 3002, the method 3000 may include scanning the finger of the user using a fingerprint scanning device. Optionally, the method 3000 may include, at step 3004, scanning all fingers of the user using a different fingerprint scanning device. At step 3010, the method 3000 may include obtaining biometric data from one or more fingerprints of the user. At step 3012, the method 3000 may determine minutia points for the fingerprints, and may generate a minutia map at step 3014. The minutia map may then be converted in to a data stream at step 3016 for comparison to existing data in the system determining if there is a match. Steps 3018, 3020, 3022, and 3024 may correlate with steps 3010, 3012, 3014, and 3016 of method 3000. As another example and referring now also to method 3100 of FIG. 31, the system 100 may be configured to conduct finger vein recognition as a way to obtain proof of presence and authenticate the user. At step 3102, the method 3100 may include having the user place his finger on a sensor device. At step 3104, an image of the fingerprint may be acquired, and, at step 3106, features may be extracted from the image. At step 3108, an image of the finger veins may be acquired, and, at step 3110, features may be extracted from the image. At step 3112, coding of the extracted features may be conducted, and a finger vein/biometric template of the user may be created at step 3114.

Figure 32:
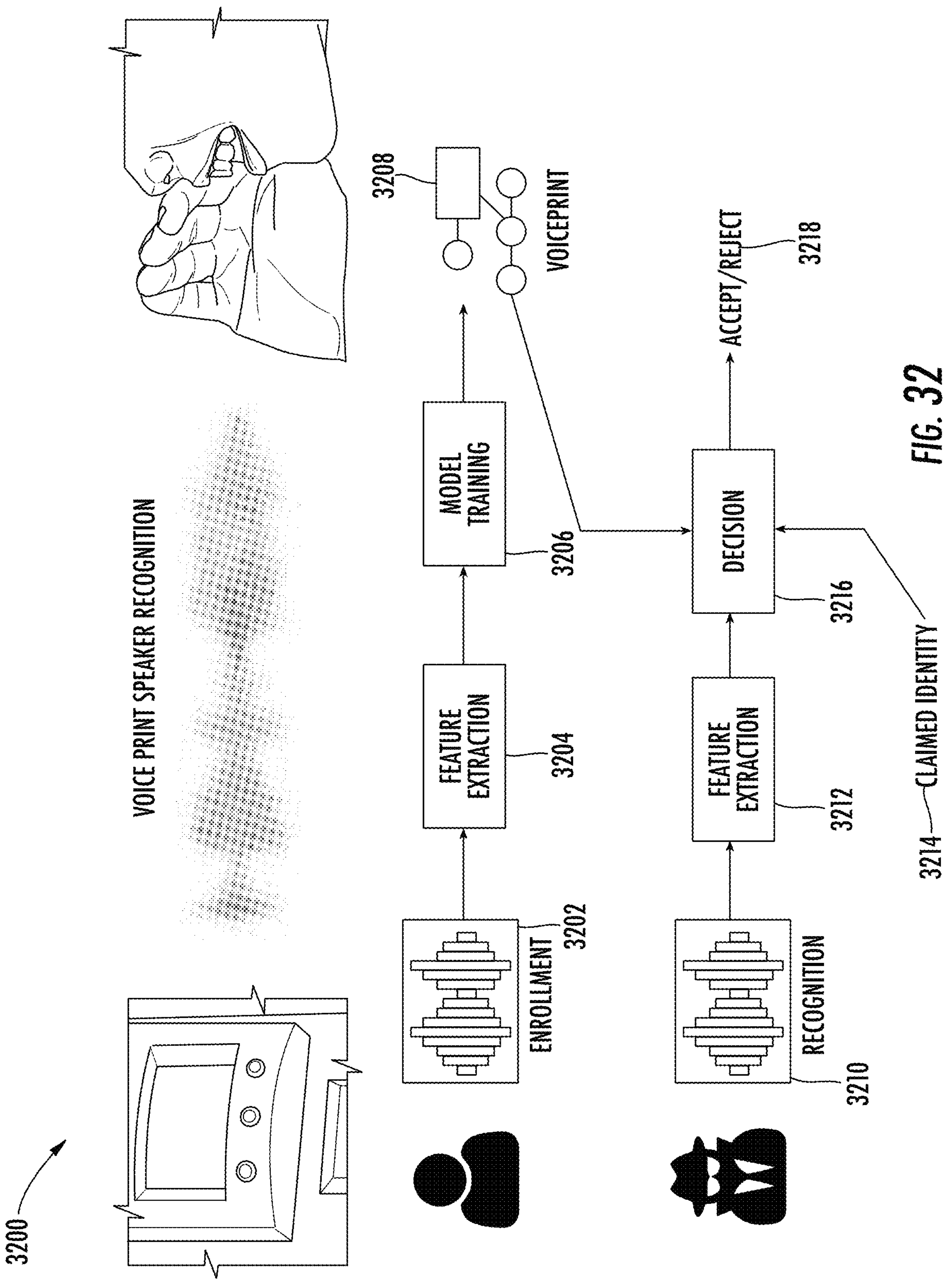
FIG. 32 is a schematic diagram illustrating various aspects of voice print speaker recognition according to an embodiment of the present disclosure.

As another example and referring now also to method 3200 of FIG. 32, the system 100 may be configured to conduct voice print speaker recognition as a way to obtain proof of presence and authenticate the user. At step 3202, the voice of the user may be recorded by an audio recording device of the system 100 and the user may be enrolled in the system 100. At step 3204, features may be extracted from the audio including the voice of the user. At step 3206, the method 3200 may include training one or more models for facilitating voice print speaker recognition using the extracted features. At step 3208, the method 3200 may include generating a voiceprint corresponding to the features extracted from the audio including the voice of the user. At step 3210, a user may provide another audio sample including his voice, and a voice print speaker recognition process may be initiated. At step 3212, features from the audio sample may be extracted. At step 3214, the method 3200 may include receiving an input from the user indicating his claimed identity. At step 3216, the method 3200 may include comparing the features extracted at 3212 to the voiceprint generated at step 3208 to determine if the claimed identity matches the voiceprint. At step 3218, the method 3200 may include accepting or rejecting the user from the system 100 based on whether or not the voiceprint matches the extracted features from the second audio sample.

Figure 33:
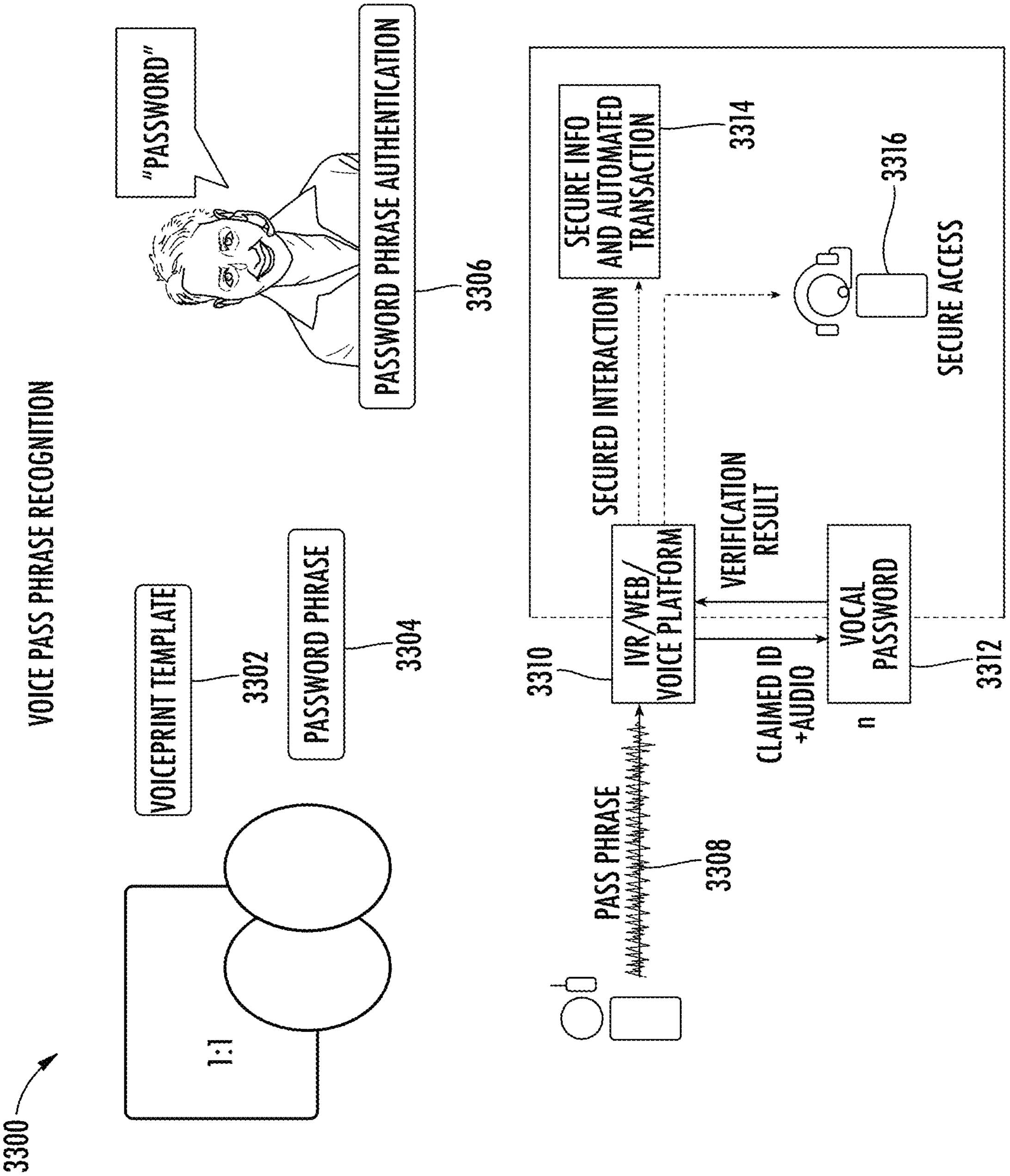
FIG. 33 is a schematic diagram illustrating various aspects of voice pass phrase recognition according to an embodiment of the present disclosure.
Figure 34:
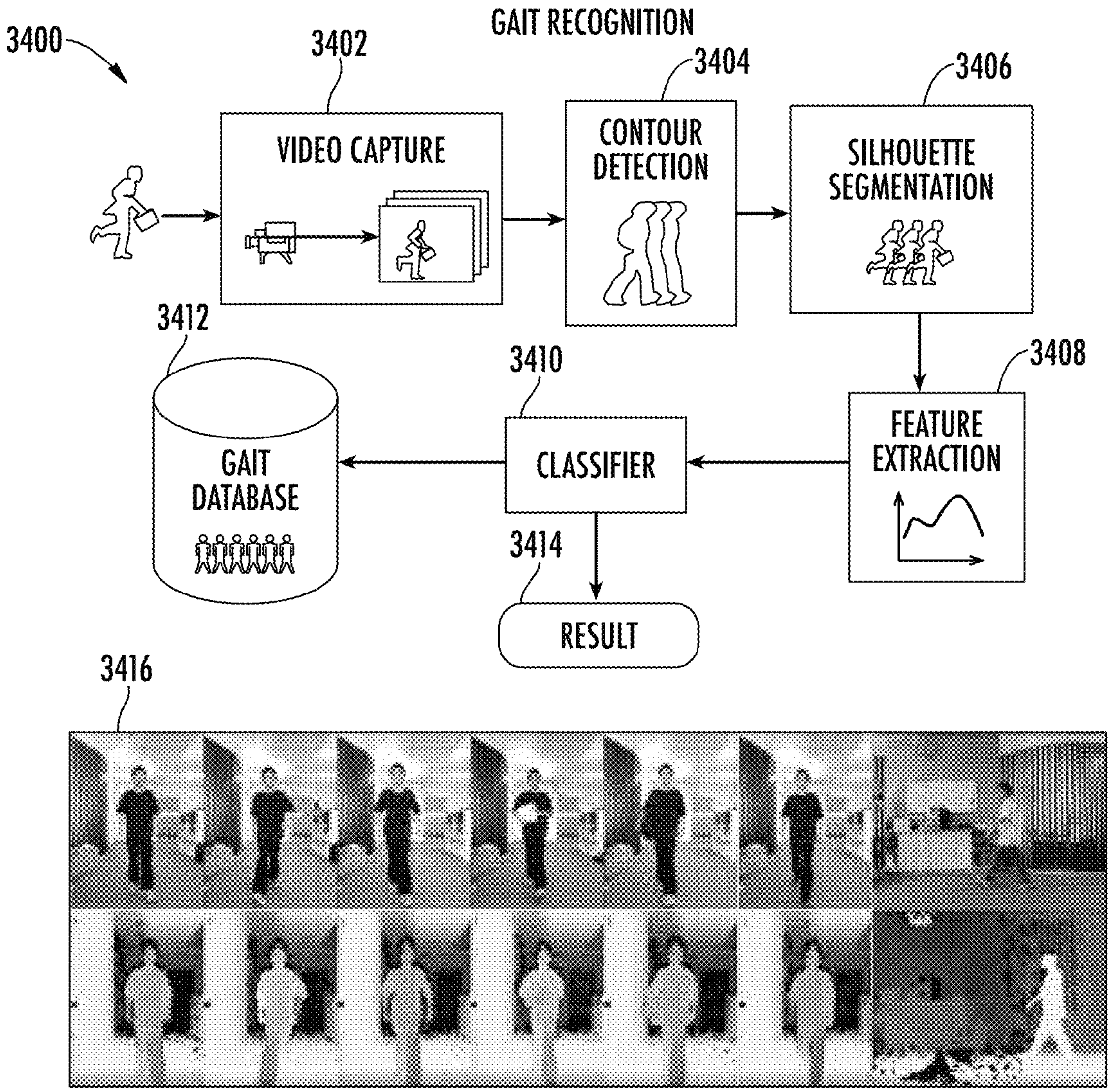
FIG. 34 is a schematic diagram illustrating various aspects of gait recognition according to an embodiment of the present disclosure.
Figure 35:
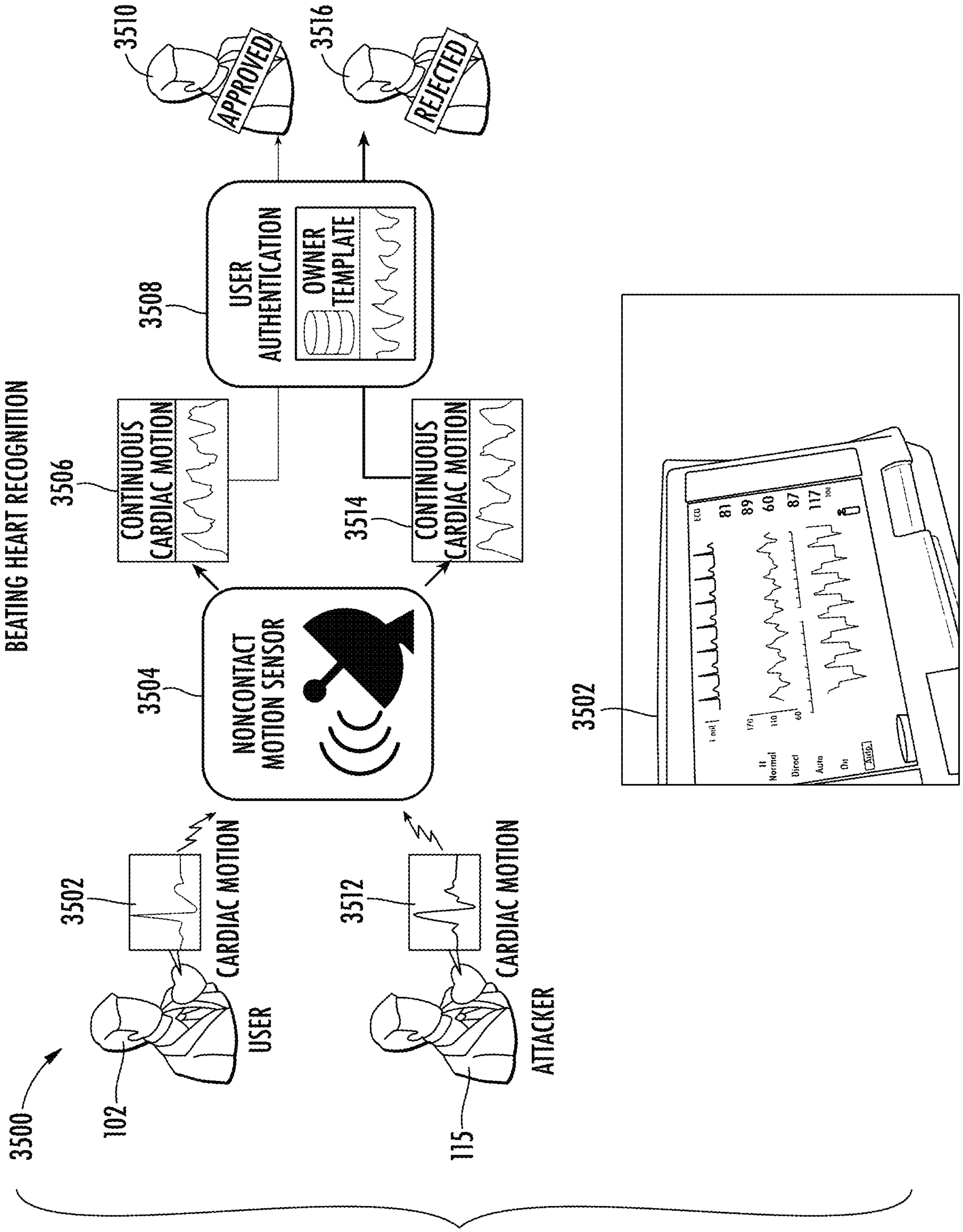
FIG. 35 is a schematic diagram illustrating various aspects of beating heart scan recognition according to an embodiment of the present disclosure.

As another example and referring now also to method 3300 of FIG. 33, the system 100 may be configured to conduct voice pass phrase recognition as a way to obtain proof of presence and authenticate the user. At step 3302, the method 3300 may include providing a voiceprint template, and obtaining a password phrase from a user at step 3304. At step 3306, the method 3300 may conduct voice pass phrase recognition by comparing the information in the voiceprint template to the obtained password phrase. As another sample method 3300, the method 3300 may include, at step 3308, obtaining speech from the user that includes a pass phrase/password. At step 3310, an interactive voice recognition platform may analyze the speech and, at step 3312 may compare the pass phrase to a vocal password stored in the system. If there is a match, the result may be verified by the interactive voice response system, and secure information and automated transaction information may be provided using the system 100 at step 3314. At step 3316, the method 3300 may include providing the user with secure access to the system 100. As another example and referring now also to method 3400 of FIG. 34, the system 100 may be configured to conduct gait recognition as a way to obtain proof of presence and authenticate the user. At step 3402, the method 3400 may be configured to capture video of the user moving, walking, and/or running. At step 3404, the method may conduct contour detection from the video captured of the user. At step 3406, the method 3400 may conduct silhouette segmentation, and, at step 3408, the method 3400 may extract features from the silhouette image. At step 3410, a classifier of the system may compared the extracted features to pre-stored data in a gait database to determine if there is a match. The result of the comparing may be provided at step 3414. Image 3416 illustrates sample images of the gait of a user.

As another example and referring now also to method 3300 of FIG. 33, the system 100 may be configured to conduct beating heart scan recognition as a way to obtain proof of presence and authenticate the user. At step 3502, cardiac motion data may be obtained from a first user. At step 3504, a noncontact motion sensor may be utilized to obtain the cardiac motion data. At step 3506, the sensor may provide continuous cardiac motion data, and, at step 3508, the system 100 may conduct authentication by comparing the cardiac motion data to pre-stored motion data. If the cardiac motion data matches motion data stored in the system 100, the method 3500 may authenticate and approve the user to access the system 100 at step 3510. At step 3512, cardiac motion data may be obtained from a second user. At step 3512, the cardiac motion data may be obtained using a noncontact motion sensor, which can provide continuous cardiac motion data for the second user, at step 3514. At step 3508, the method 3500 may analyze and compare the cardiac motion data for the second user and, if there is no match, the second user may be rejected from accessing the system 100 at step 3516.

Figure 36:
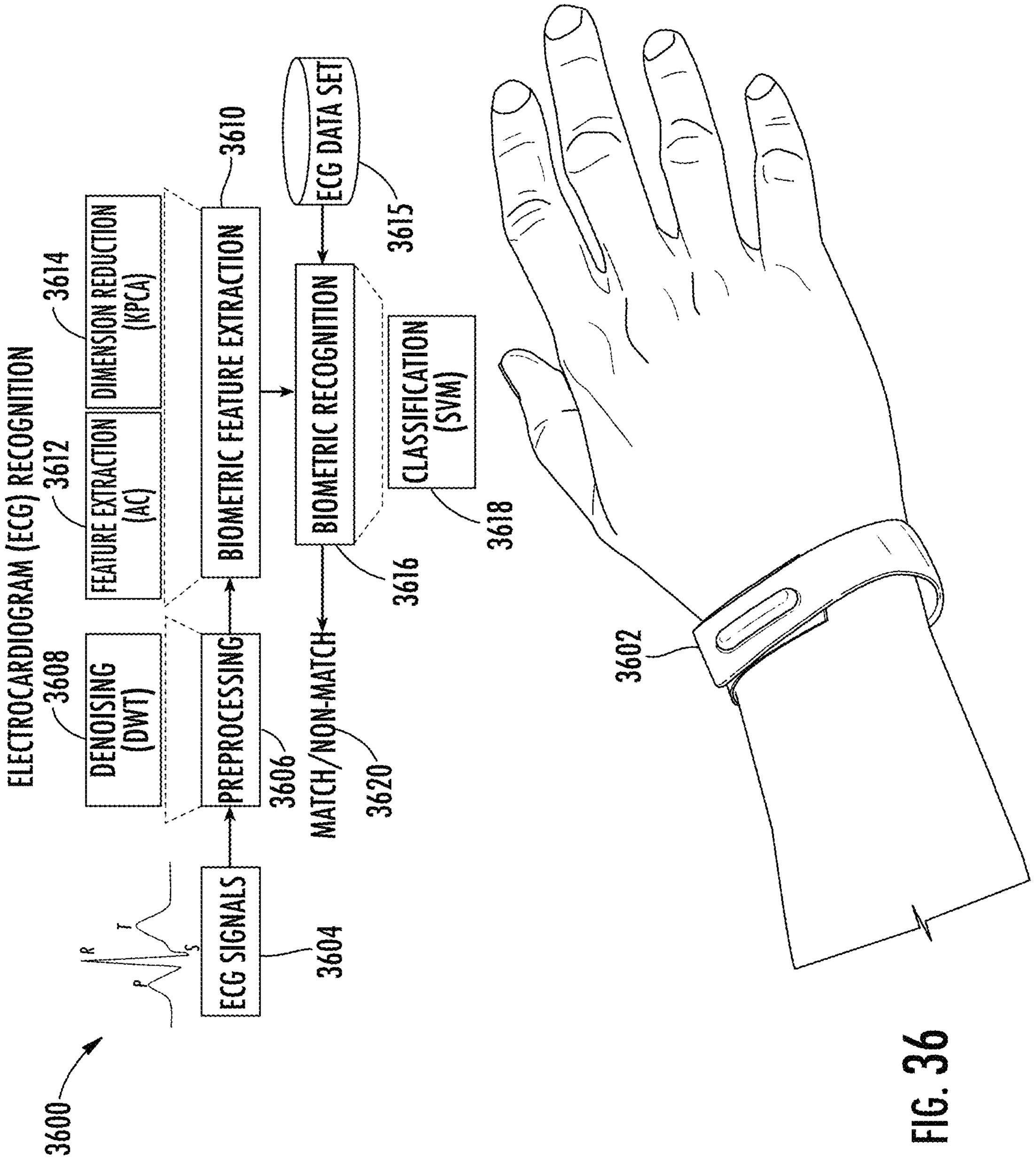
FIG. 36 is schematic diagram illustrating various aspects of electrocardiogram recognition according to an embodiment of the present disclosure.

As another example and referring now also to method 3600 of FIG. 36, the system 100 may be configured to conduct electrocardiogram recognition as a way to obtain proof of presence and authenticate the user. At step 3602, an electrocardiogram monitor may be utilized to measure electrocardiogram signals of the user. At step 3604, the method 3600 may obtain the electrocardiogram signals and may preprocess the signals at step 3606. At step 3608, denoising may be performed on the signals. At step 3610, the method 3600 may include extracting biometric features from the electrocardiogram signals, which may also include (AC) feature extraction at step 3612 and dimension reduction (KPCA) at step 3614. At step 3616, the method 300 may include conducting biometric recognition by comparing the extracted biometric features from an electrocardiogram data set stored in database 155. Also, at step 3618, the method 3600 may conduct SVM classification as well. At step 3620, a decision regarding whether or not there is a match for the biometric extracted features is performed by the system 100.

Figure 37:
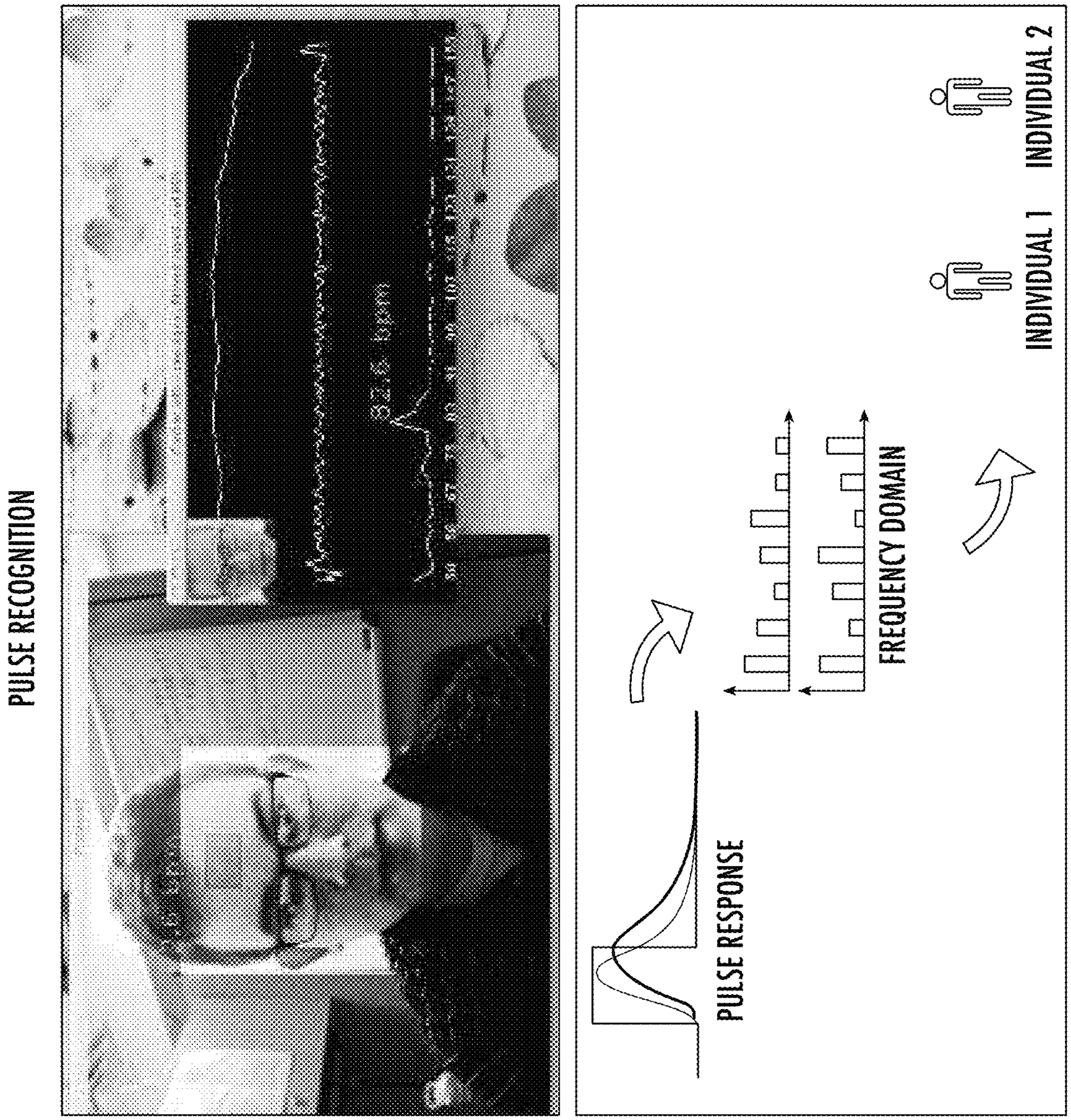
FIG. 37 is a schematic diagram illustrating various aspects of pulse recognition according to an embodiment of the present disclosure.
Figure 38:
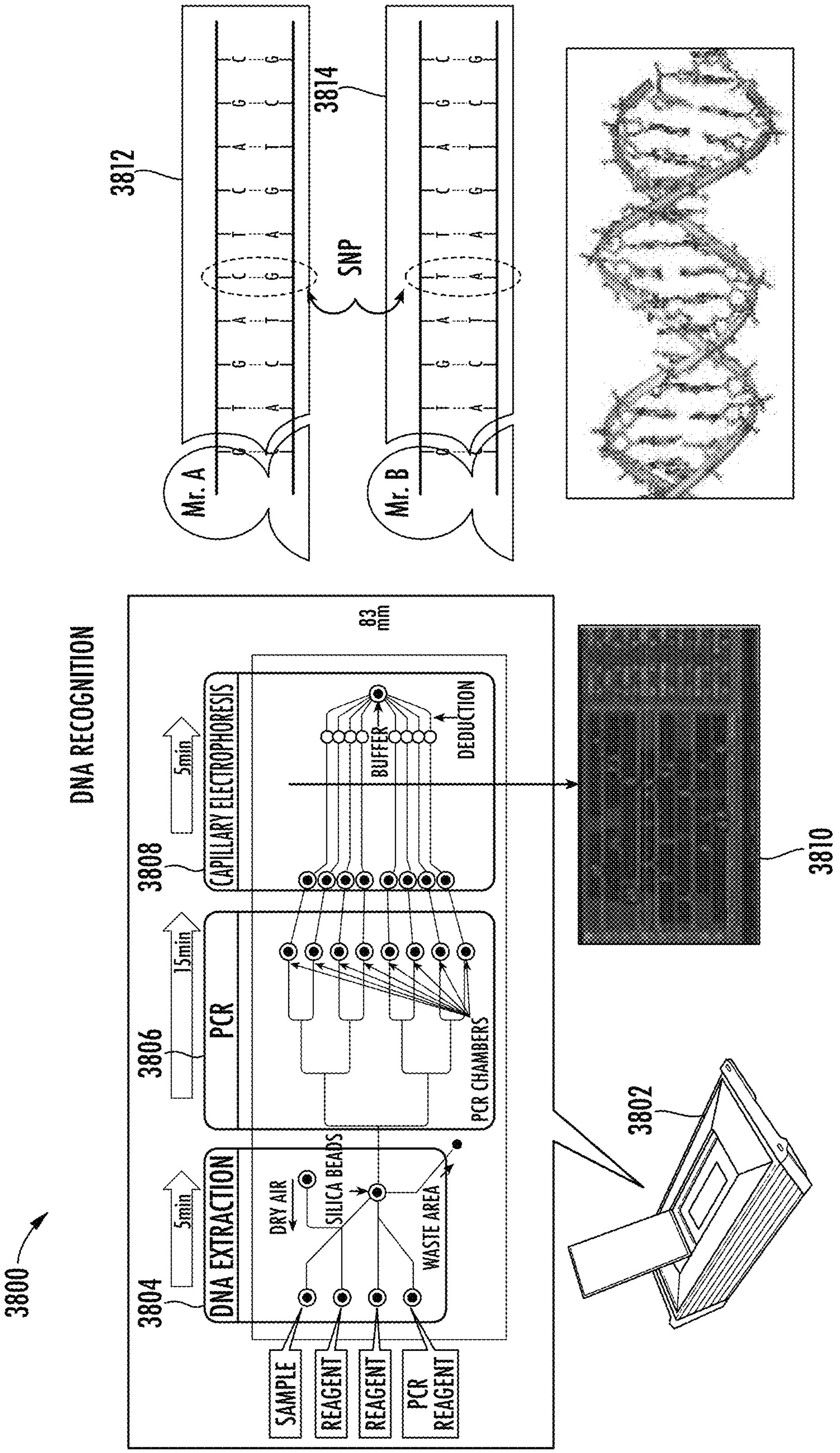
FIG. 38 is a schematic diagram illustrating various aspects of DNA recognition according to an embodiment of the present disclosure.

As another example and referring now also to method 3700 of FIG. 37, the system 100 may be configured to conduct pulse recognition as a way to obtain proof of presence and authenticate the user. The method 3700 may include obtaining a pulse of a user using a pulse monitoring device and may utilize a pulse response and frequency domain information to determine whether the user's pulse matches a pre-stored pulse. A decision regarding the matching may be outputted according to the method 3700. As another example and referring now also to method 3800 of FIG. 38, the system 100 may be configured to conduct DNA recognition as a way to obtain proof of presence and authenticate the user. At step 3802, a blood and/or other DNA sample may be obtained from a user. At step 3804, the method 3800 may extract DNA features, and, at step 3806, may conduct a polymerase chain reaction technique on the DNA features. At step 3808, the method 3800 may conduct capillary electrophoresis, and may output the results via a graphical user interface at step 3810. At steps 3812 and 3814, the features of the DNA may be compared to pre-stored features in the system 100. If there is a match, the DNA features may be recognized and the user may be authenticated.

Figure 39:
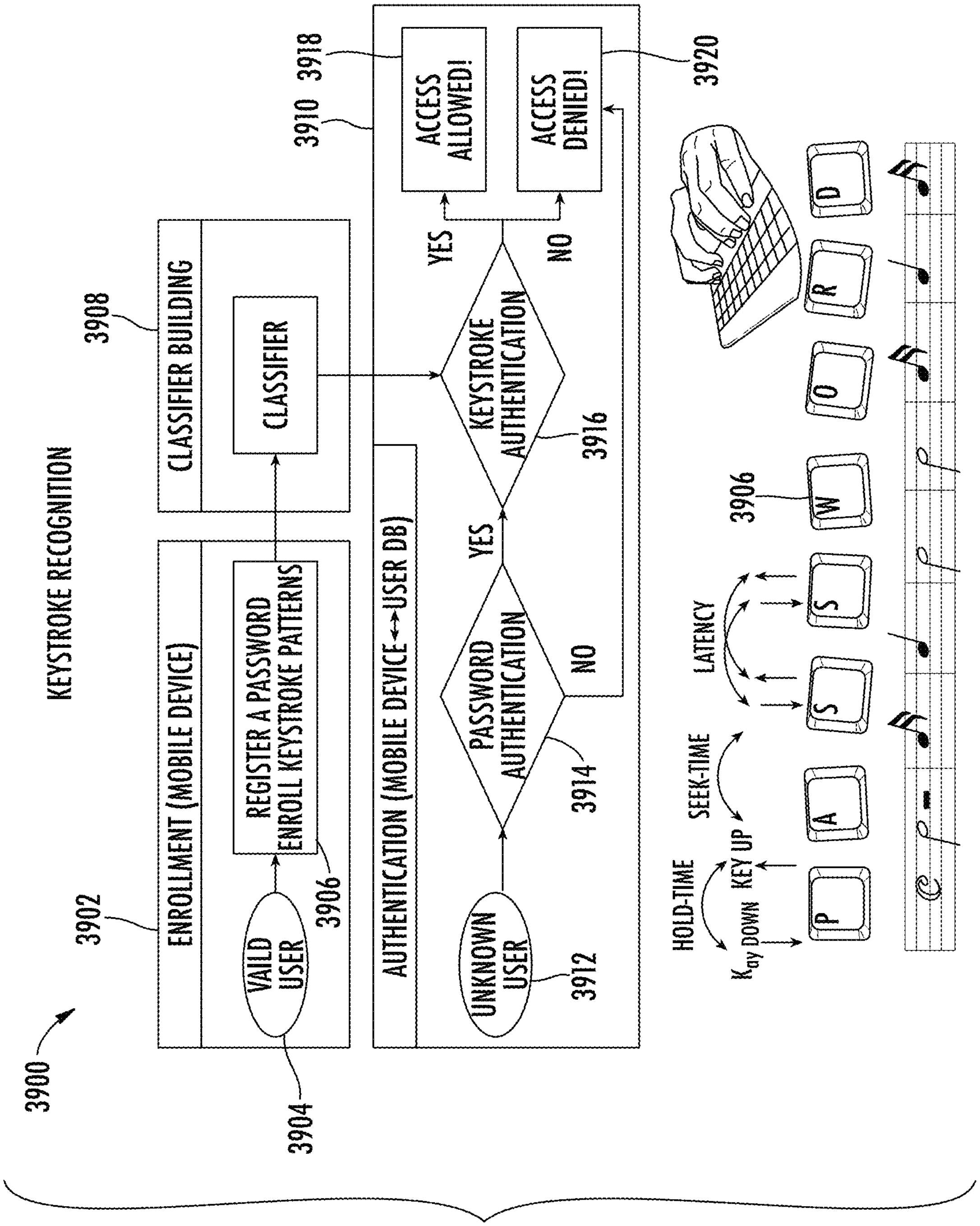
FIG. 39 is a schematic diagram illustrating various aspects of keystroke recognition according to an embodiment of the present disclosure.

As another example and referring now also to method 3900 of FIG. 39, the system 100 may be configured to conduct keystroke recognition as a way to obtain proof of presence and authenticate the user. At steps 3902, 3904, and 3906, a valid user may be enrolled in the system 100 and the user may register a password to be utilized to access the system 100 and input keystroke patterns via a keyboard and/or touchscreen interface. At step 3908, the keystroke patterns may be classified by a classifier and stored in the system 100. At sub-process 3910, an unknown user may attempt to access the system 100 at step 3912. At step 3914, the user may input a password and the password may be authenticated. If the password is incorrect, the user may be denied access at step 3920. If, however, the password is correct, the method 3900 may proceed to step 3916, which may include conducting keystroke authentication by comparing the user's keystrokes to the saved keystroke patterns. If there is a match, the user may be authenticated at step 3918, and, if there is no match, the user may be denied access at step 3920.

Figure 40:
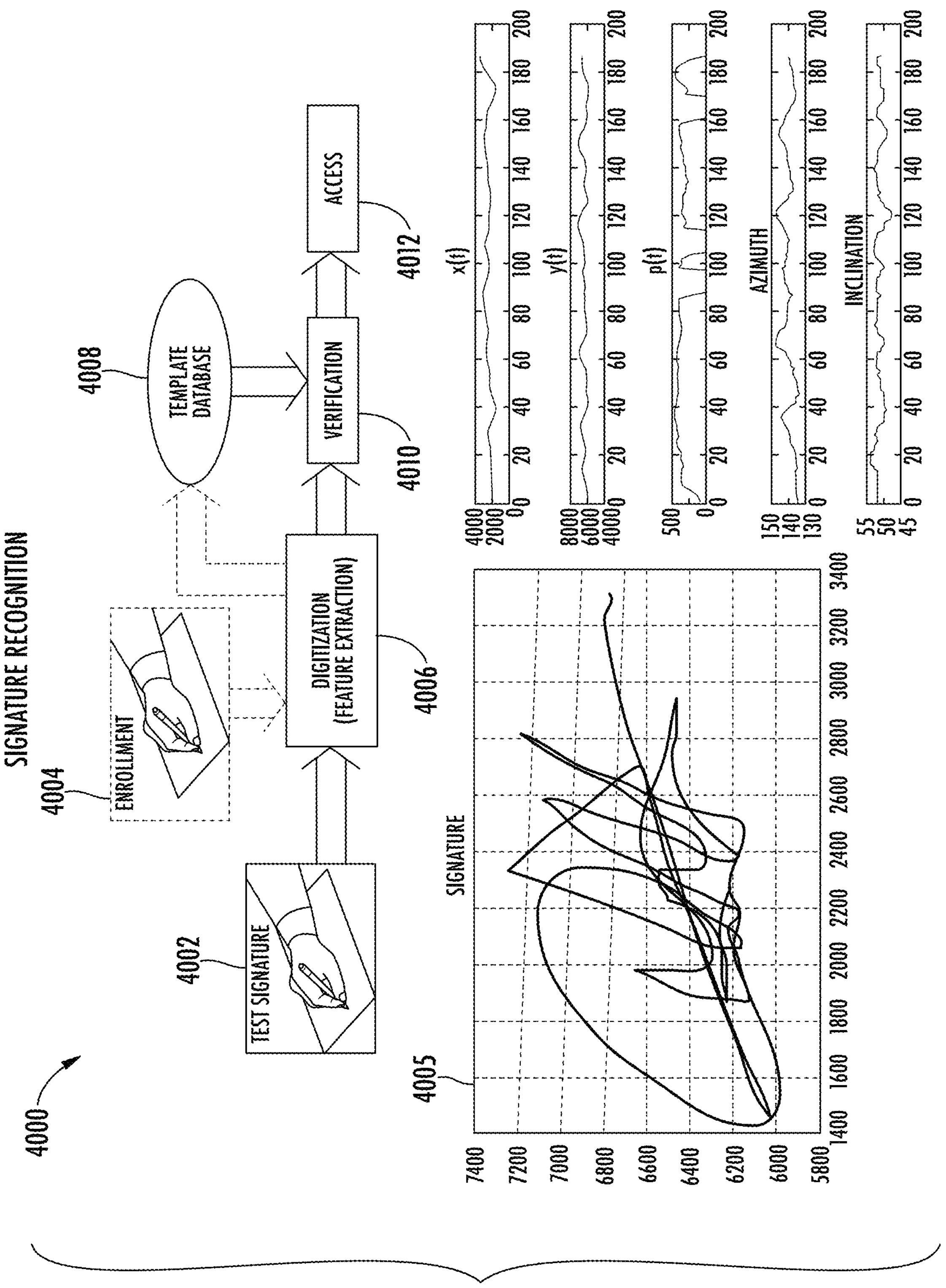
FIG. 40 is a schematic diagram illustrating various aspects of signature recognition according to an embodiment of the present disclosure.
Figure 41:
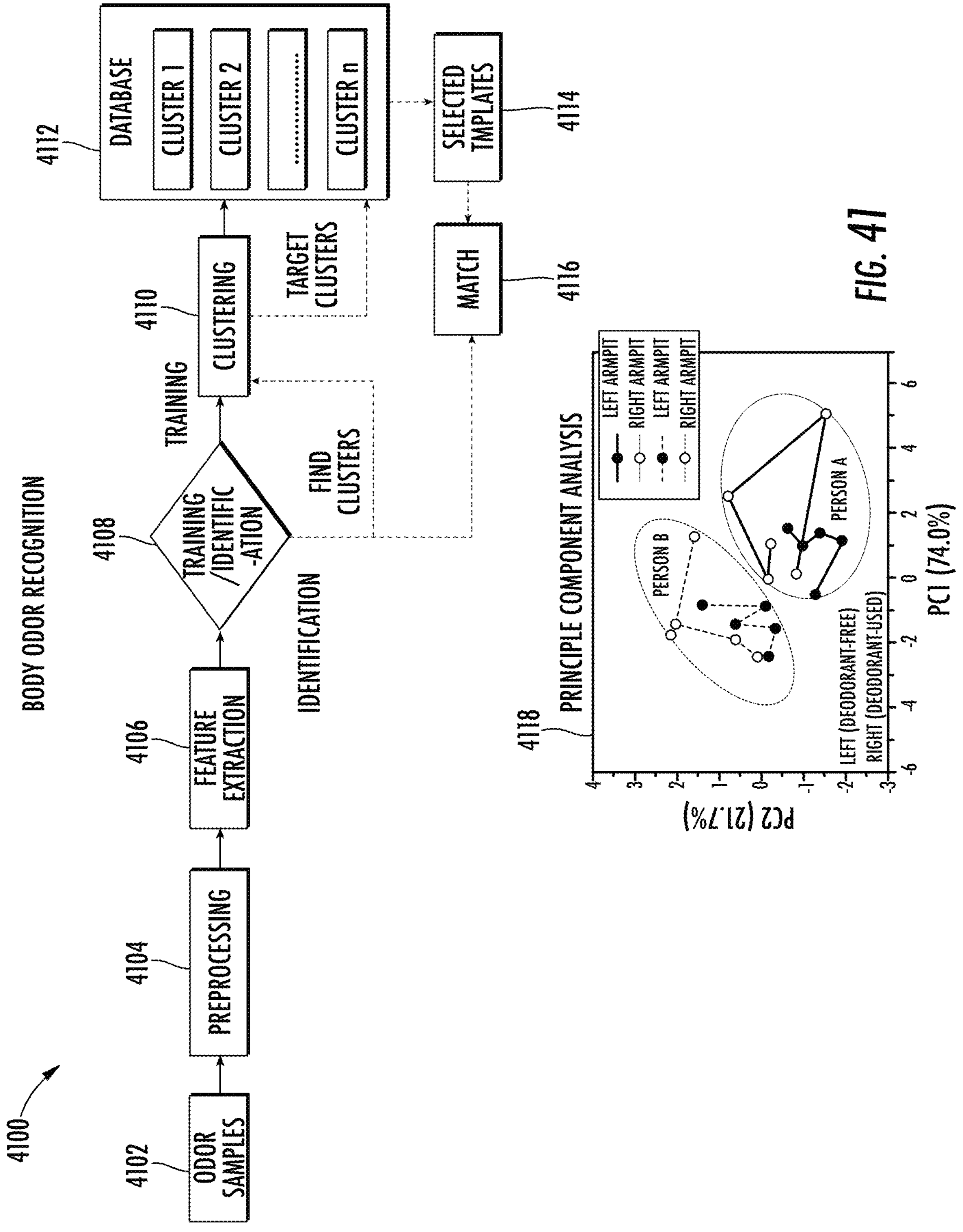
FIG. 41 is a schematic diagram illustrating various aspects of body odor recognition according to an embodiment of the present disclosure.

As another example and referring now also to method 4000 of FIG. 40, the system 100 may be configured to conduct signature recognition as a way to obtain proof of presence and authenticate the user. At steps 4002 and 4004, a user may be enrolled in the system 100 and a test signature may be obtained. The features of the signature may be extracted at step 4006, and stored in a database 155 at step 4008. At step 4005, a signature may be obtained at a different occasion and the system 100 may verify the signature at step 4010 by comparing the signature to the extracted features stored in the database 155. If the signature is verified, the user may be provided access at step 4012. As another example and referring now also to method 4100 of FIG. 41, the system 100 may be configured to conduct body odor recognition as a way to obtain proof of presence and authenticate the user. At step 4102, an odor sample of a user may be obtained using a sensor of the computing device 126, for example. At step 4104, the method 4100 may conduct preprocessing of the odor sample, and, at step, 4106 the method 4100 may include conducting feature extraction on the odor sample to extract features of the sample. At step 4108, the system 100 may include training the system 100 to recognize the sample and/or conducting identification of the sample if the system 100 is being utilized to identify and match the sample based on the extracted features. If the method involves training, at step 4110, the method 4100 may conduct clustering and generating target clusters, which may be stored in a database at step 4112. If identification is being conducted using the method 4100, the method 4100 may proceed to step 4116, which may include determining if there is a match to the odor sample by comparing the sample to templates selected from the database at step 4114. Illustration 4118 shows a sample chart illustrating component analysis for two odor samples obtain from the left and right armpits of two people.

Figure 42:
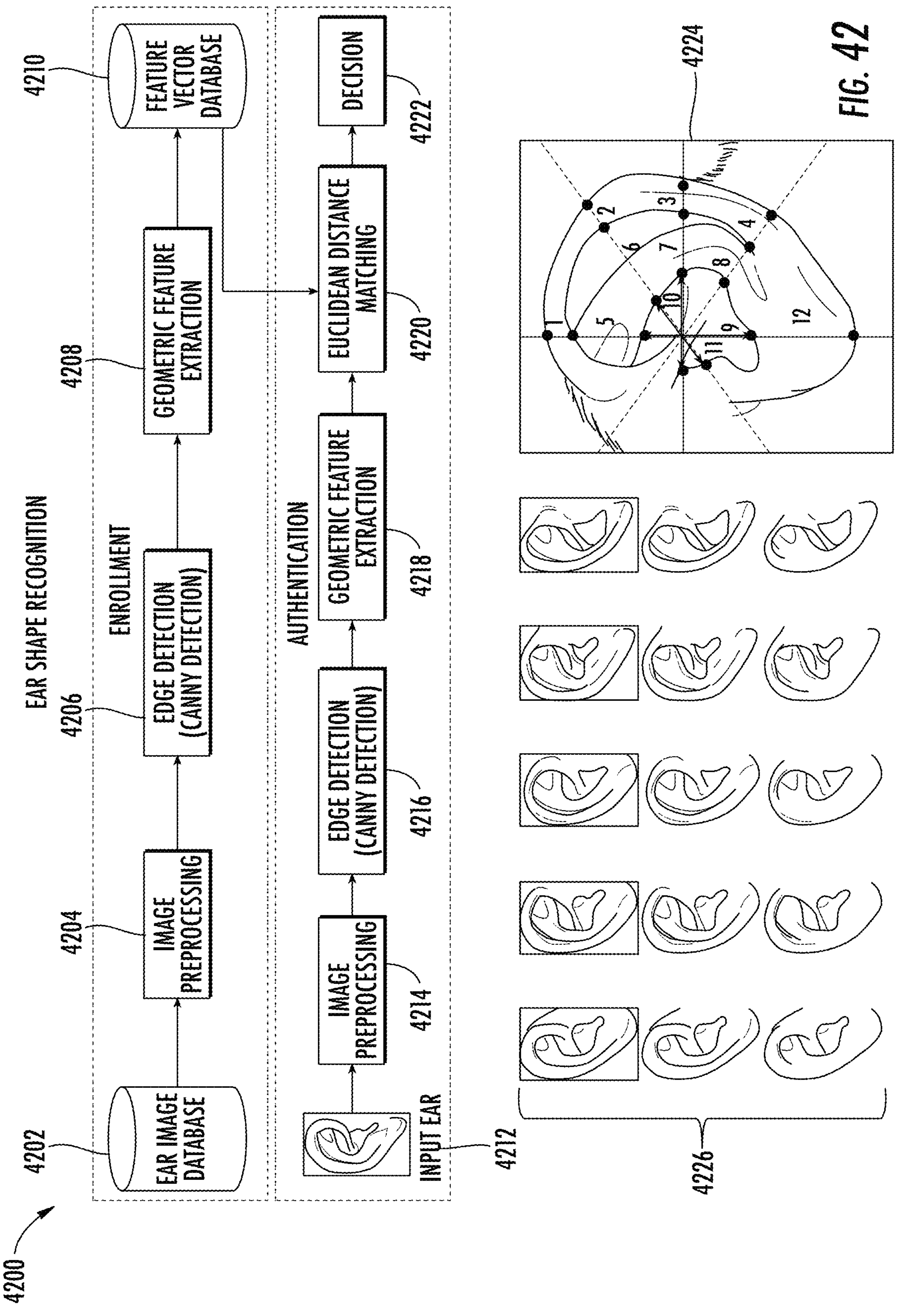
FIG. 42 is a schematic diagram illustrating various aspects of ear shape recognition according to an embodiment of the present disclosure.
Figure 43:
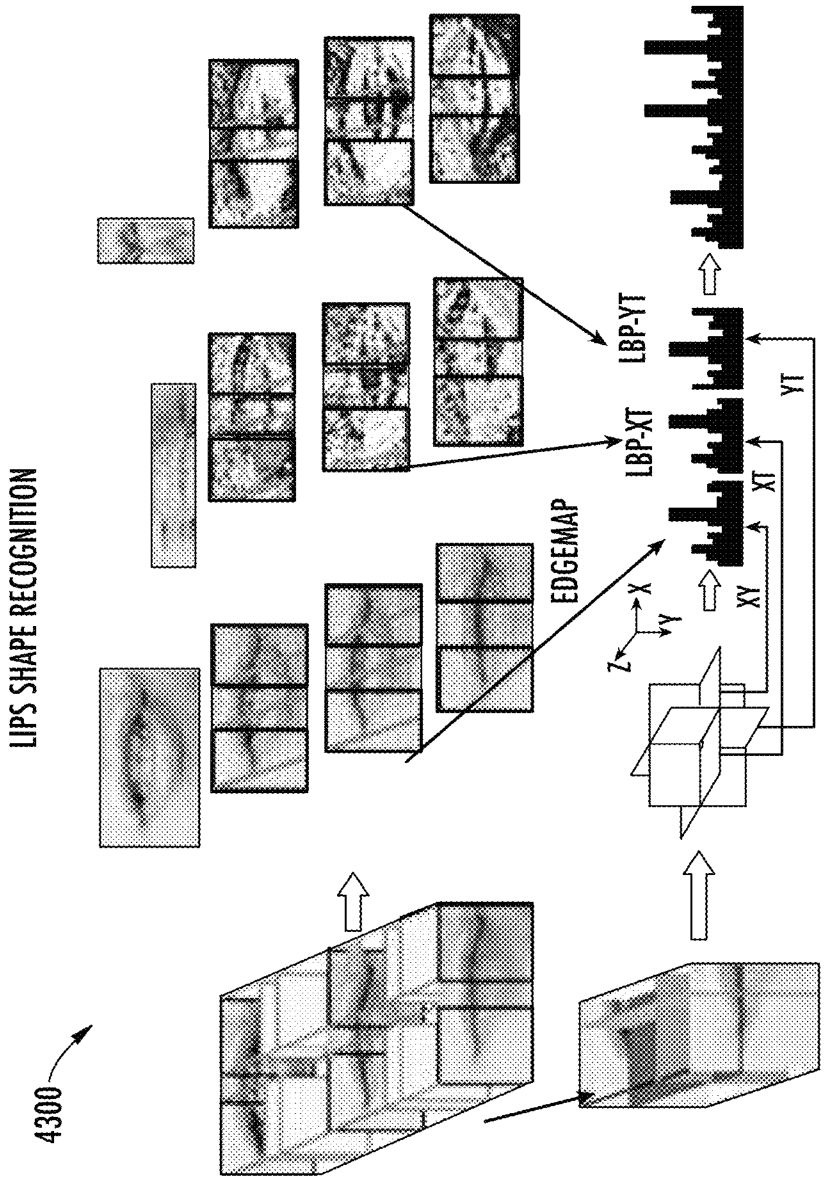
FIG. 43 is a schematic diagram illustrating various aspects of lips shape recognition according to an embodiment of the present disclosure.

As another example and referring now also to method 4200 of FIG. 42, the system 100 may be configured to conduct ear shape recognition as a way to obtain proof of presence and authenticate the user. At step 4202, a user may be enrolled into the system 100 and an image of the user's ear may be captured and stored in the database 155. At step 4204, image preprocessing may be conducted on the captured image of the user's ear. At step 4206, edge detection such as Canny detection, may be performed on the preprocessed image. At step 4208, the method 4200 may include conducting geometric feature extraction to extract ear shape features, and storing the features in a feature vector database at step 4210. At step 4212, on a subsequent occasion, a user may attempt to access the system 100 and the user's ear image may be obtained. At step 4214, the image of the ear may be preprocessed, and, at step 4216, edge detection may be performed on the image of the ear. At step 4218, the features pertaining to the features of the ear shape may be extracted, and, at step 4220 matching may be conducted by comparing the features of the ear shape to ear shape features stored in the feature vector database. For example, Euclidean distance matching may be performed to determine if there is a match. At step 4222, the method 4200 may include generating a decision as to whether or not to allow access to the system based on the matching conducted at step 4220. 4226 illustrates various images that may be stored of a user's ear and 4224, illustrates various features and/or distances recorded for the user's ear, which may be utilized as a means of comparison. As another example and referring now also to method 4300 of FIG. 43, the system 100 may be configured to conduct lips shape recognition as a way to obtain proof of presence and authenticate the user. In method 4300, an image of the lips of a user may be obtained and features of the lip shape may be extracted from the image. The extracted features may be stored in a biometric template for the user. Upon a subsequent attempt to authenticate into the system, another image of the lips of a user may be obtained and the features of the image may be compared to the features stored in the database 155. If there is a match, the user may be provided access, and, if not, the user may be rejected from accessing the system 100.

Figure 44:
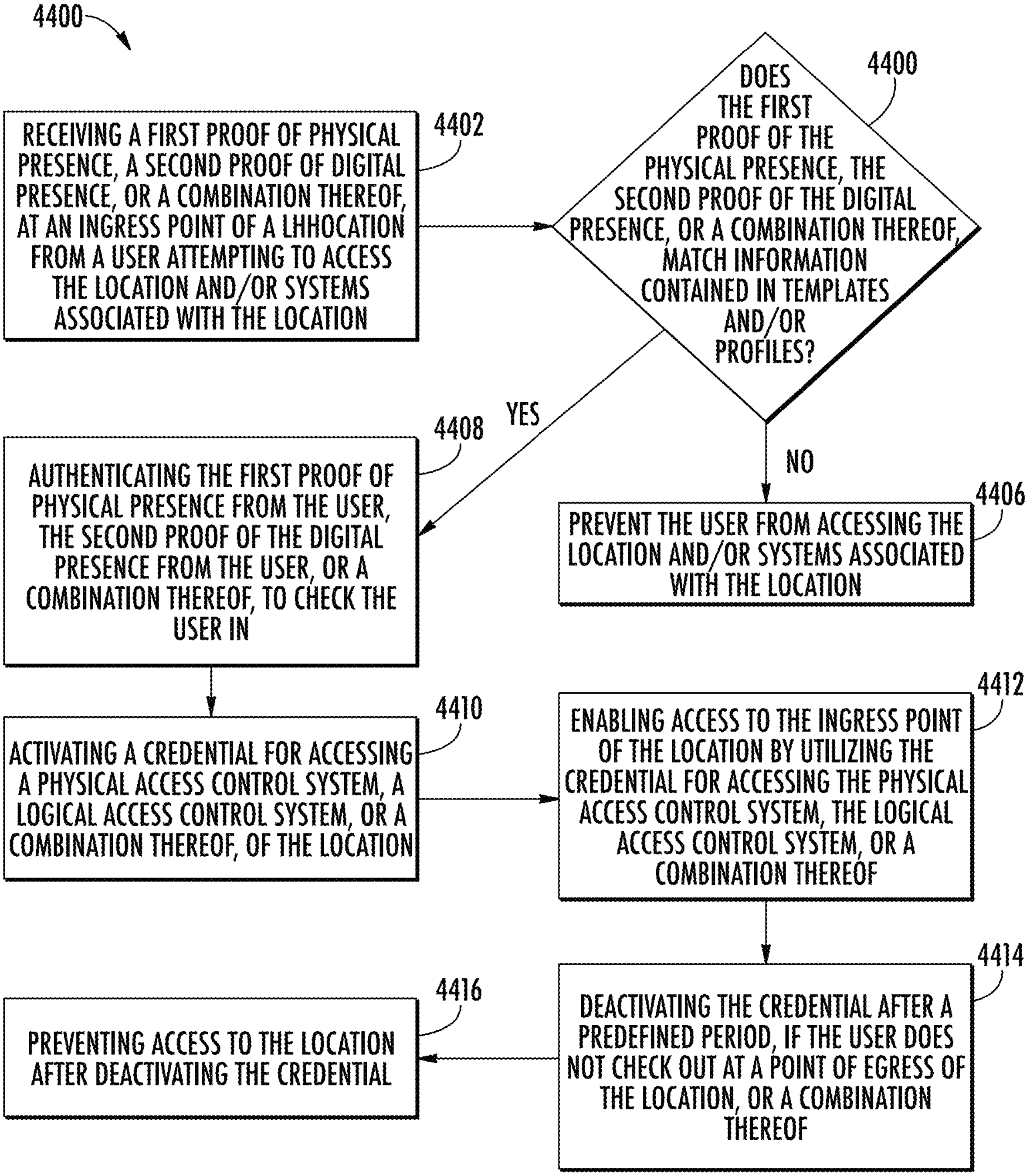
FIG. 44 is a flow diagram illustrating a sample method for providing credential activation layered security according to an embodiment of the present disclosure.

As shown in FIG. 44, an exemplary method 4400 for providing credential activation and/or deactivation is schematically illustrated. At step 4402, the method 400 may include receiving a first proof of physical presence, a second proof of digital presence, or a combination thereof, from a user. The data associated with the proof may be obtained at an ingress point 130 of a location 125, such as via computing device 126. At step 4404, the method 4400 may include determining if the first proof of physical presence, the second proof of digital presence, or a combination thereof, match information contained in biometric templates and/or profiles stored in the system 100. If there is no match, the method 4400 may proceed to step 4406 to prevent the user from accessing the location 125 and/or systems associated with the location 125. If, however, there is a match at step 4404, the method 4400 may proceed to step 4408, which may include authentication the first proof of physical presence, the second proof of digital presence, or a combination thereof, to check the user into the system 100. At step 4410, the method 4400 may include activating a credential for accessing a physical access control system, a logical access control system, any other system or component of the system 100, or a combination thereof. At step 4412, the method 4400 may include enabling the user to access the ingress point 130 by utilizing the activated credential. At step 4414, the method 4400 may include deactivating the credential after predefined time period expires, if the user does not check out at an egress point 131 of the location 125, or a combination thereof. At step 4416, the method 4400 may include preventing the user from accessing the location 125 after deactivating the credential. In certain embodiments, the functionality provided in the method 4400 may be performed and/or facilitated by utilizing any device, system, program, network, process, or any combination thereof, such as, but not limited to, those in system 100. Notably, the method 4400 may further incorporate any of the features and functionality described for the system 100, any other method disclosed herein, or as otherwise described herein.

The systems and methods disclosed herein may include additional functionality and features. For example, the operative functions of the system 100 and method may be configured to execute on a special-purpose processor specifically configured to carry out the operations provided by the system 100 and method. Notably, the operative features and functionality provided by the system 100 and method may increase the efficiency of computing devices that are being utilized to facilitate the functionality provided by the system 100 and the various methods discloses herein. For example, by training the system 100 based on the extracted features and/or verifications/authentications conducted in the system 100, a reduced amount of computer operations need to be performed by the devices in the system 100 using the processors and memories of the system 100 than compared to traditional methodologies. In such a context, less processing power needs to be utilized because the processors and memories do not need to be dedicated for processing. As a result, there are substantial savings in the usage of computer resources by utilizing the software, techniques, and algorithms provided in the present disclosure. In certain embodiments, various operative functionality of the system 100 may be configured to execute on one or more graphics processors and/or application specific integrated processors. For example, the rendering of the captured images of the user may be performed on the graphics processors, and, in certain embodiments, as the system 100 learns over time various actions conducted in the system 100, artificial intelligence and/or machine learning algorithms facilitating such learning may also be executed on graphics processors and/or application specific integrated processors.

Notably, in certain embodiments, various functions and features of the system 100 and methods may operate without any human intervention and may be conducted entirely by computing devices. In certain embodiments, for example, numerous computing devices may interact with devices of the system 100 to provide the functionality supported by the system 100. Additionally, in certain embodiments, the computing devices of the system 100 may operate continuously and without human intervention to reduce the possibility of errors being introduced into the system 100. In certain embodiments, the system 100 and methods may also provide effective computing resource management by utilizing the features and functions described in the present disclosure. For example, in certain embodiments, upon receiving a request from a user (e.g. first user 101) to authenticate into the system 100, any device in the system 100 may transmit a signal to a computing device receiving or processing the request that only a specific quantity of computer processor resources (e.g. processor clock cycles, processor speed, etc.) may be devoted to processing the authentication process, any other operation conducted by the system 100, or any combination thereof. For example, the signal may indicate a number of processor cycles of a processor may be utilized to process an authentication input, and/or specify a selected amount of processing power that may be dedicated to processing the input or any of the operations performed by the system 100. In certain embodiments, a signal indicating the specific amount of computer processor resources or computer memory resources to be utilized for performing an operation of the system 100 may be transmitted from the first and/or second user devices 102, 111 to the various components of the system 100.

In certain embodiments, any device in the system 100 may transmit a signal to a memory device to cause the memory device to only dedicate a selected amount of memory resources to the various operations of the system 100. In certain embodiments, the system 100 and methods may also include transmitting signals to processors and memories to only perform the operative functions of the system 100 and methods at time periods when usage of processing resources and/or memory resources in the system 100 is at a selected value. In certain embodiments, the system 100 and methods may include transmitting signals to the memory devices utilized in the system 100, which indicate which specific sections of the memory should be utilized to store any of the data utilized or generated by the system 100. Notably, the signals transmitted to the processors and memories may be utilized to optimize the usage of computing resources while executing the operations conducted by the system 100. As a result, such functionality provides substantial operational efficiencies and improvements over existing technologies.

Figure 45:
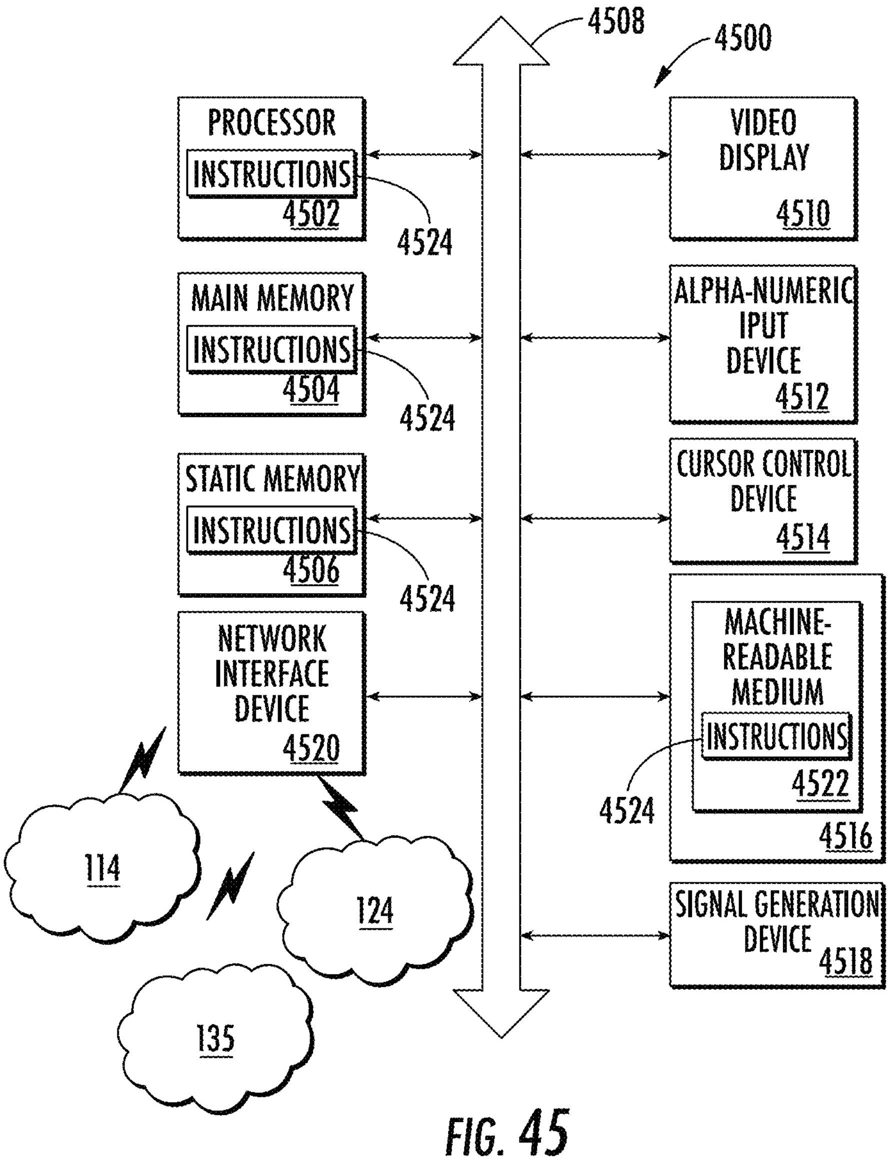
FIG. 45 is a schematic diagram of a machine in the form of a computer system within which a set of instructions, when executed, may cause the machine to perform any one or more of the methodologies or operations of the systems and methods for providing credential activation layered security.

Referring now also to FIG. 45, at least a portion of the methodologies and techniques described with respect to the exemplary embodiments of the system 100 can incorporate a machine, such as, but not limited to, computer system 4500, or other computing device within which a set of instructions, when executed, may cause the machine to perform any one or more of the methodologies or functions discussed above. The machine may be configured to facilitate various operations conducted by the system 100. For example, the machine may be configured to, but is not limited to, assist the system 100 by providing processing power to assist with processing loads experienced in the system 100, by providing storage capacity for storing instructions or data traversing the system 100, or by assisting with any other operations conducted by or within the system 100.

In some embodiments, the machine may operate as a standalone device. In some embodiments, the machine may be connected (e.g., using communications network 135, communications network 114, communications network 124, another network, or a combination thereof) to and assist with operations performed by other machines and systems, such as, but not limited to, the first user device 102, the second user device 106, the third user device 110, the communications network 114, the fourth user device 116, the fifth user device 120, the communications network 124, the computing device 126, the proximity card 129, the physical access control system 132, the logical access control system 134, the server 140, the server 145, the server 150, the database 155, the server 160, any other system, program, and/or device, or any combination thereof. The machine may be connected with any component in the system 100. In a networked deployment, the machine may operate in the capacity of a server or a client user machine in a server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 4500 may include a processor 4502 (e.g., a central processing unit (CPU), a graphics processing unit (GPU, or both), a main memory 4504 and a static memory 4506, which communicate with each other via a bus 4508. The computer system 4500 may further include a video display unit 4510, which may be, but is not limited to, a liquid crystal display (LCD), a flat panel, a solid state display, or a cathode ray tube (CRT). The computer system 4500 may include an input device 4512, such as, but not limited to, a keyboard, a cursor control device 4514, such as, but not limited to, a mouse, a disk drive unit 416, a signal generation device 4518, such as, but not limited to, a speaker or remote control, and a network interface device 4520.

The disk drive unit 4516 may include a machine-readable medium 4522 on which is stored one or more sets of instructions 4524, such as, but not limited to, software embodying any one or more of the methodologies or functions described herein, including those methods illustrated above. The instructions 4524 may also reside, completely or at least partially, within the main memory 4504, the static memory 4506, or within the processor 4502, or a combination thereof, during execution thereof by the computer system 4500. The main memory 4504 and the processor 4502 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine-readable medium 4522 containing instructions 4524 so that a device connected to the communications network 135, the communications network 114, the communications network 124, another network, or a combination thereof, can send or receive voice, video or data, and communicate over the communications network 135, the communications network 114, the communications network 124, another network, or a combination thereof, using the instructions. The instructions 4524 may further be transmitted or received over the communications network 135, the communications network 114, the communications network 124, another network, or a combination thereof, via the network interface device 420.

While the machine-readable medium 4522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that causes the machine to perform any one or more of the methodologies of the present disclosure.

The terms "machine-readable medium," "machine-readable device," or "computer-readable device" shall accordingly be taken to include, but not be limited to: memory devices, solid-state memories such as a memory card or other package that houses one or more read-only (non-volatile) memories, random access memories, or other re-writable (volatile) memories; magneto-optical or optical medium such as a disk or tape; or other self-contained information archive or set of archives is considered a distribution medium equivalent to a tangible storage medium. The "machine-readable medium," "machine-readable device," or "computer-readable device" may be non-transitory, and, in certain embodiments, may not include a wave or signal per se. Accordingly, the disclosure is considered to include any one or more of a machine-readable medium or a distribution medium, as listed herein and including art-recognized equivalents and successor media, in which the software implementations herein are stored.

The illustrations of arrangements described herein are intended to provide a general understanding of the structure of various embodiments, and they are not intended to serve as a complete description of all the elements and features of apparatus and systems that might make use of the structures described herein. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. This disclosure is intended to cover any and all adaptations or variations of various embodiments and arrangements of the invention.

Combinations of the above arrangements, and other arrangements not specifically described herein, will be apparent to those of skill in the art upon reviewing the above description. Therefore, it is intended that the disclosure not be limited to the particular arrangement(s) disclosed as the best mode contemplated for carrying out this invention, but that the invention will include all embodiments and arrangements falling within the scope of the appended claims.

The foregoing is provided for purposes of illustrating, explaining, and describing embodiments of this invention. Modifications and adaptations to these embodiments will be apparent to those skilled in the art and may be made without departing from the scope or spirit of this invention. Upon reviewing the aforementioned embodiments, it would be evident to an artisan with ordinary skill in the art that said embodiments can be modified, reduced, or enhanced without departing from the scope and spirit of the claims described below.

I claim:

1. A system, comprising:

a memory that stores instructions; and a processor that executes the instructions to perform operations, the operations comprising:

receiving a first proof of physical presence associated with a user, a second proof of digital presence associated with the user, or a combination thereof;

activating, based on authenticating the first proof, the second proof, or both, a credential for accessing a physical access control system, a logical access control system, or a combination thereof, wherein activating the credential comprises generating a token number to assign to a user identifier of the user for accessing the physical access control system, the logical access control system, or a combination thereof;

verifying that the credential has been activated based on verifying an activation status associated with the token number associated with the credential; and facilitating, after verifying that the credential has been activated based on verifying the activation status associated with the token number associated with the credential, access to an ingress point of a location by utilizing the credential for accessing the physical access control system, the logical access control system, or a combination thereof.

2. The system of claim 1, wherein the operations further comprise obtaining the first proof of the physical presence, the second proof of the digital presence, or a combination thereof, at the ingress point of the location.

3. The system of claim 1, wherein the operations further comprise authenticating the first proof, the second proof, or a combination thereof, by matching the first proof, the second proof, or a combination thereof, to information contained in a biometric template, a profile, or a combination thereof.

4. The system of claim 1, wherein activating the credential further comprises activating a token, activating a proximity card number, or a combination thereof.

5. The system of claim 4, wherein the operations further comprise activating the token, activating the proximity card number, or a combination thereof, in accordance with a user role associated with the user.

6. The system of claim 1, wherein the operations further comprise checking the user into the system based on authenticating the first proof, the second proof, or a combination thereof.

7. The system of claim 1, wherein the operations further comprise preventing the user from accessing the ingress point of the location if the first proof, the second proof, or both, is not authenticated.

8. The system of claim 1, wherein the operations further comprise deactivating the credential if the user does not check out of the location, if a time period expires, or a combination thereof.

9. The system of claim 1, wherein the operations further comprise activating or deactivating a biometric template utilized for authenticating the first proof, the second proof, or a combination thereof.

10. The system of claim 1, wherein the operations further comprise facilitating, after verifying that the credential has been activated, access to a portion of the physical access control system, a portion of the logical access control system, or a combination thereof, in accordance with a user role associated with the user.

11. The system of claim 1, wherein the operations further comprise encrypting the credential.

12. The system of claim 1, wherein the operations further comprise preventing the user from accessing the ingress point, the logical access control system, the physical access control system, or a combination thereof, after expiration of a time period after activating the credential.

13. The system of claim 1, wherein the operations further comprise generating the credential after authenticating the first proof, the second proof, or a combination thereof.

14. A method, comprising:

receiving a first proof of physical presence associated with a user, a second proof of digital presence associated with the user, or a combination thereof;

activating, by utilizing instructions from a memory that are executed by a processor and based on authenticating the first proof, the second proof, or both, a credential for accessing a physical access control system, a logical access control system, or a combination thereof, wherein activating the credential comprises generating a token number to assign to a user identifier of the user for accessing the physical access control system, the logical access control system, or a combination thereof;

verifying that the credential has been activated based on verifying an activation status associated with the credential; and facilitating, after verifying that the credential has been activated based on verifying the activation status associated with the credential, access to an ingress point of a location by utilizing the credential for accessing the physical access control system, the logical access control system, or a combination thereof.

15. The method of claim 14, further comprising monitoring the user after accessing the ingress point, the physical access control system, the logical access control system, or a combination thereof.

16. The method of claim 14, further comprising facilitating automatic issuance, assignment, or rotation of a proximity card number, the token number, or a combination thereof, associated with the credential.

17. The method of claim 14, further comprising receiving a request from the user to activate the credential.

18. The method of claim 14, further comprising providing a proximity card, token, or a combination thereof, after authenticating the first proof, the second proof, or a combination thereof.

19. The method of claim 14, further comprising updating a blockchain to include information associated with the authenticating, the credential, a consent, or a combination thereof.

20. A non-transitory computer-readable device comprising instructions, which when loaded and executed by a processor, cause the processor to perform operations comprising:

receiving a first proof of physical presence associated with a user, a second proof of digital presence associated with the user, or a combination thereof;

activating, based on authenticating the first proof, the second proof, or both, a credential for accessing a physical access control system, a logical access control system, or a combination thereof, wherein activating the credential comprises generating a token number to assign to a user identifier of the user for accessing the physical access control system, the logical access control system, or a combination thereof;

verifying that the credential has been activated based on verifying an activation status associated with the credential; and facilitating, after verifying that the credential has been activated based on verifying the activation status associated with the credential, access to an ingress point of a location by utilizing the credential for accessing the physical access control system, the logical access control system, or a combination thereof.

* * * * *